Nov. 15, 1966  G. O. FERM ETAL  3,286,091
VEHICLE TRAFFIC CONTROL SYSTEM
Filed June 3, 1963  16 Sheets-Sheet 4

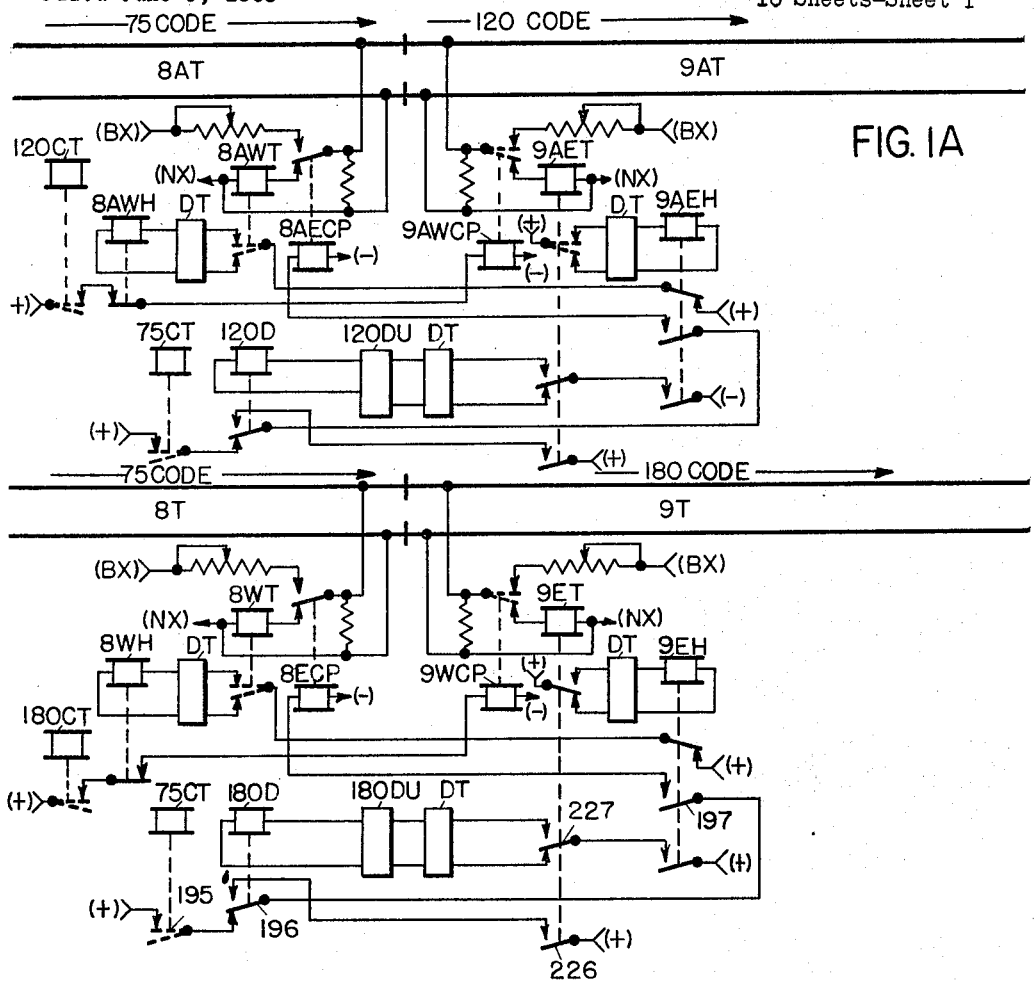
FIG. IA
LINE CIRCUIT TO WEST END OF SIDING TRACK STRETCH { 33 / 34
LINE CIRCUIT TO WEST END OF MAIN TRACK STRETCH { 14 / 15
INVENTORS
G.O. FERM AND
G.W. DAVISON
BY
THEIR ATTORNEY

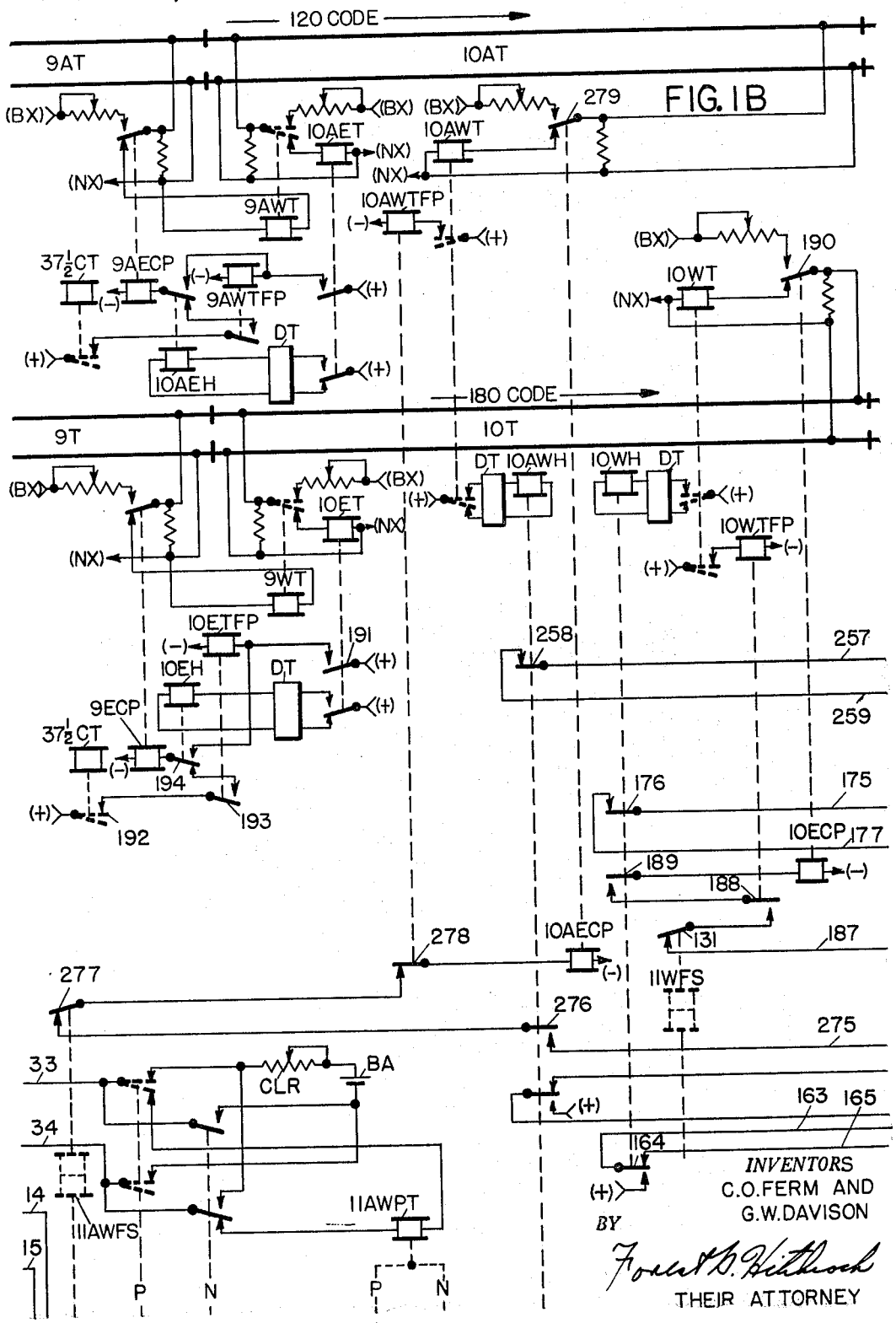

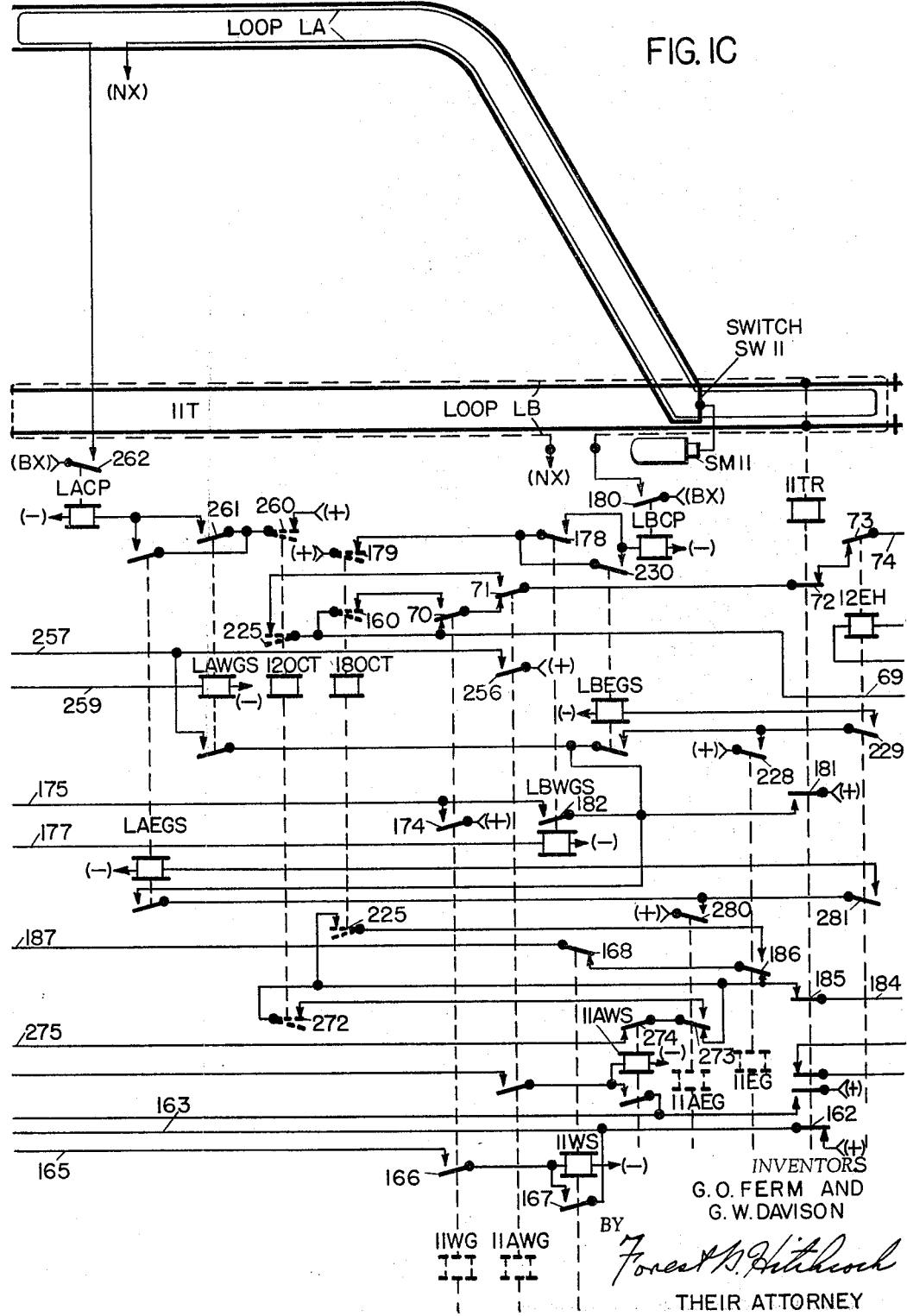

INVENTORS
G.O. FERM AND
G.W. DAVISON
BY Forest B. Hitchcock
THEIR ATTORNEY

Nov. 15, 1966   G. O. FERM ETAL   3,286,091
VEHICLE TRAFFIC CONTROL SYSTEM
Filed June 3, 1963   16 Sheets-Sheet 5
FIG. IE
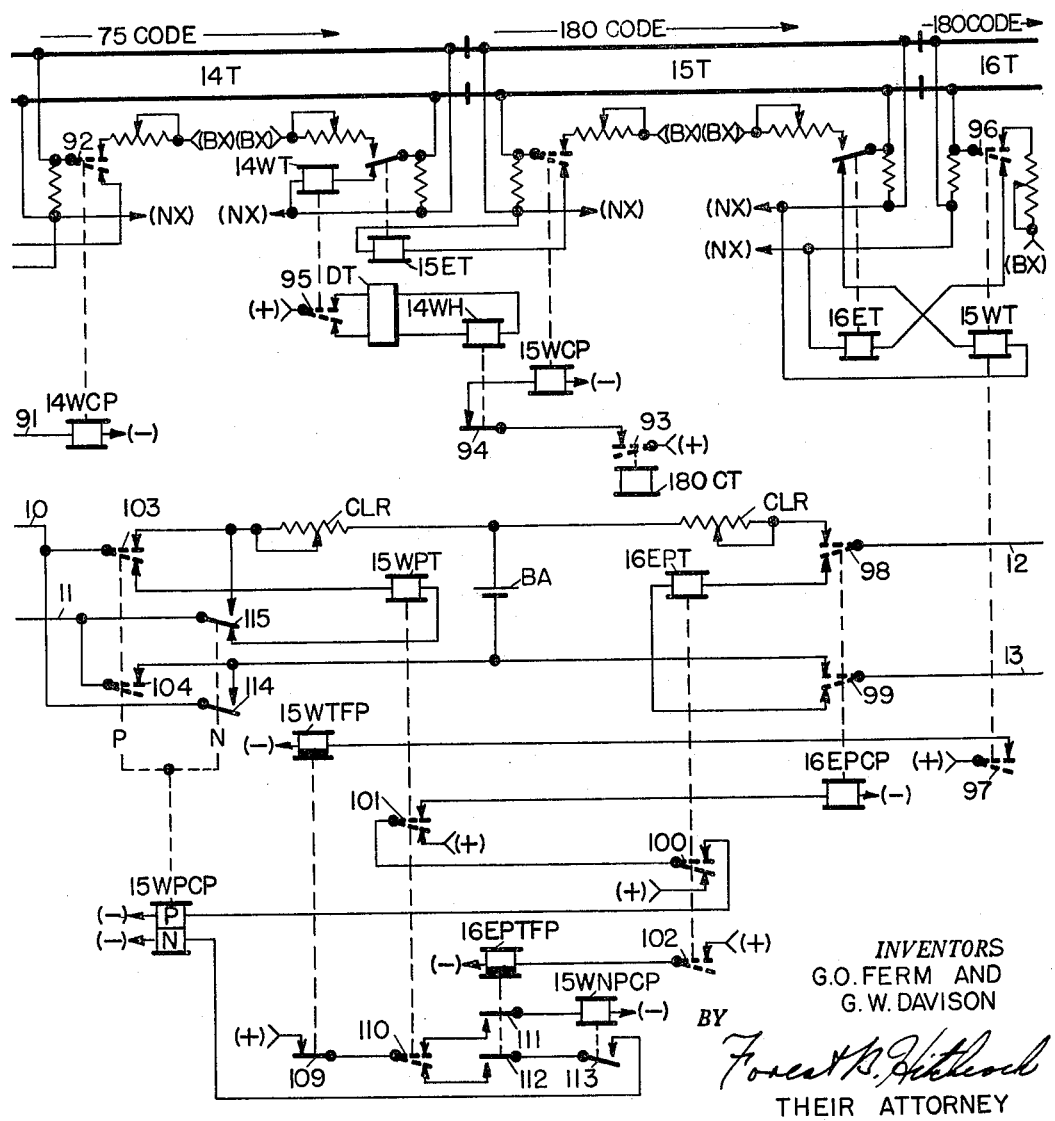

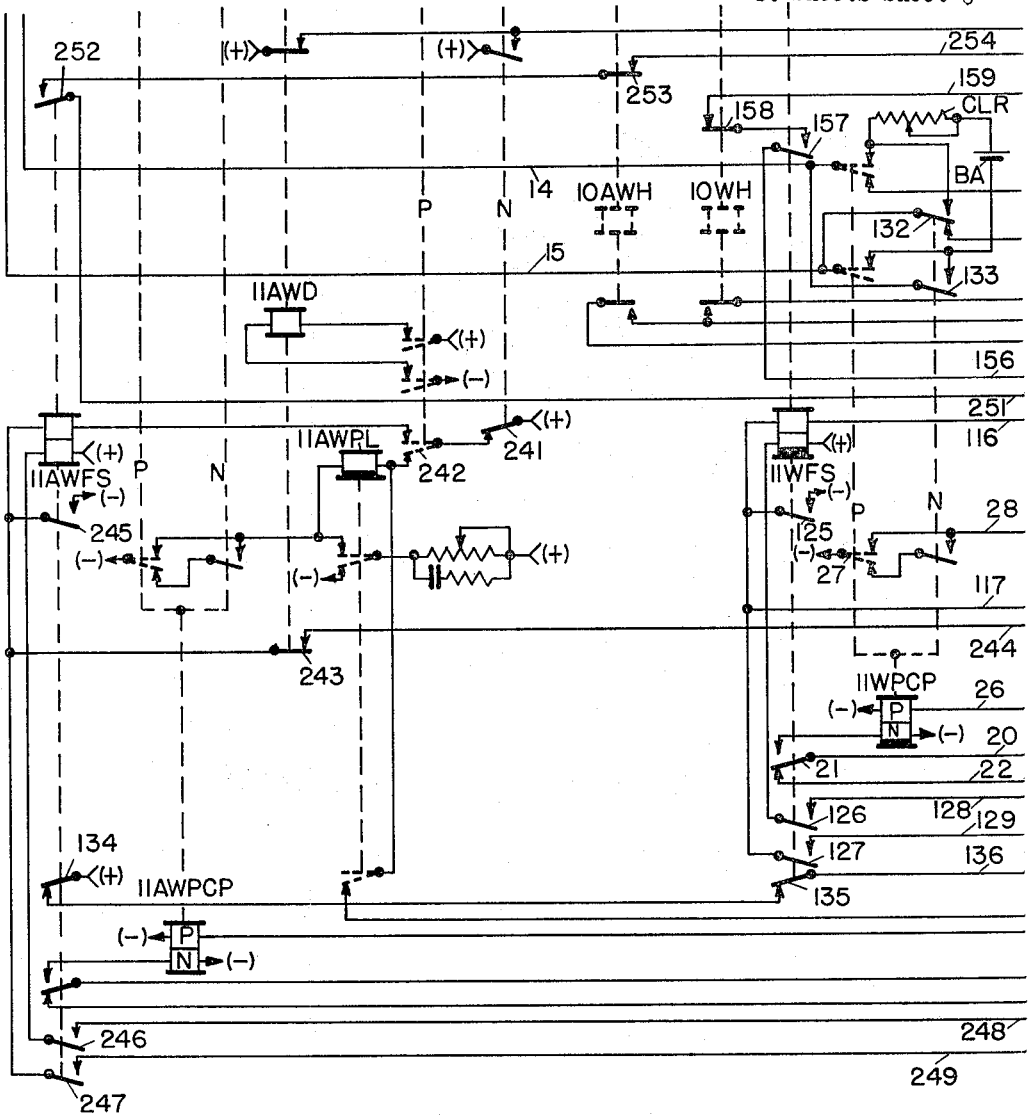
FIG. IF

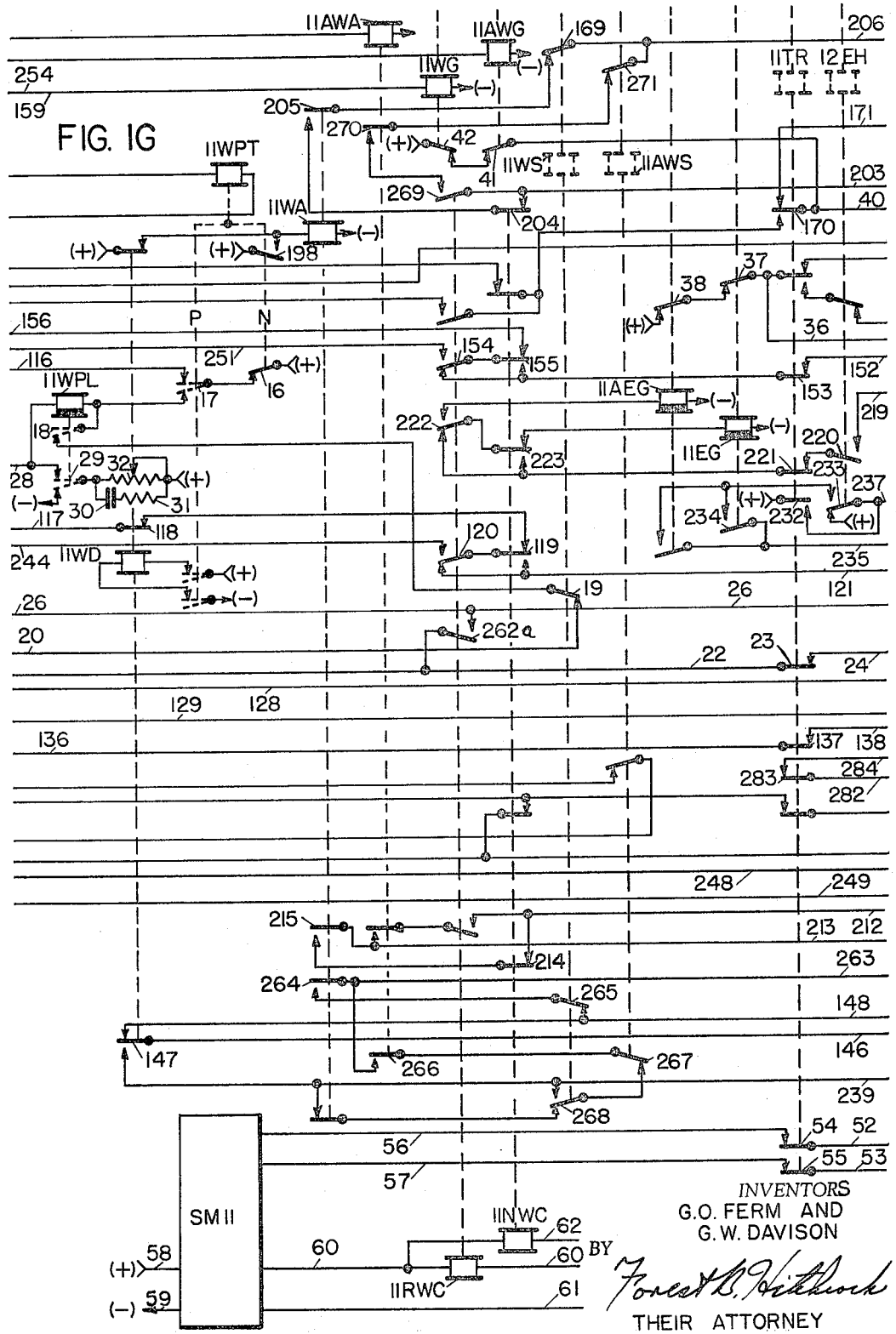

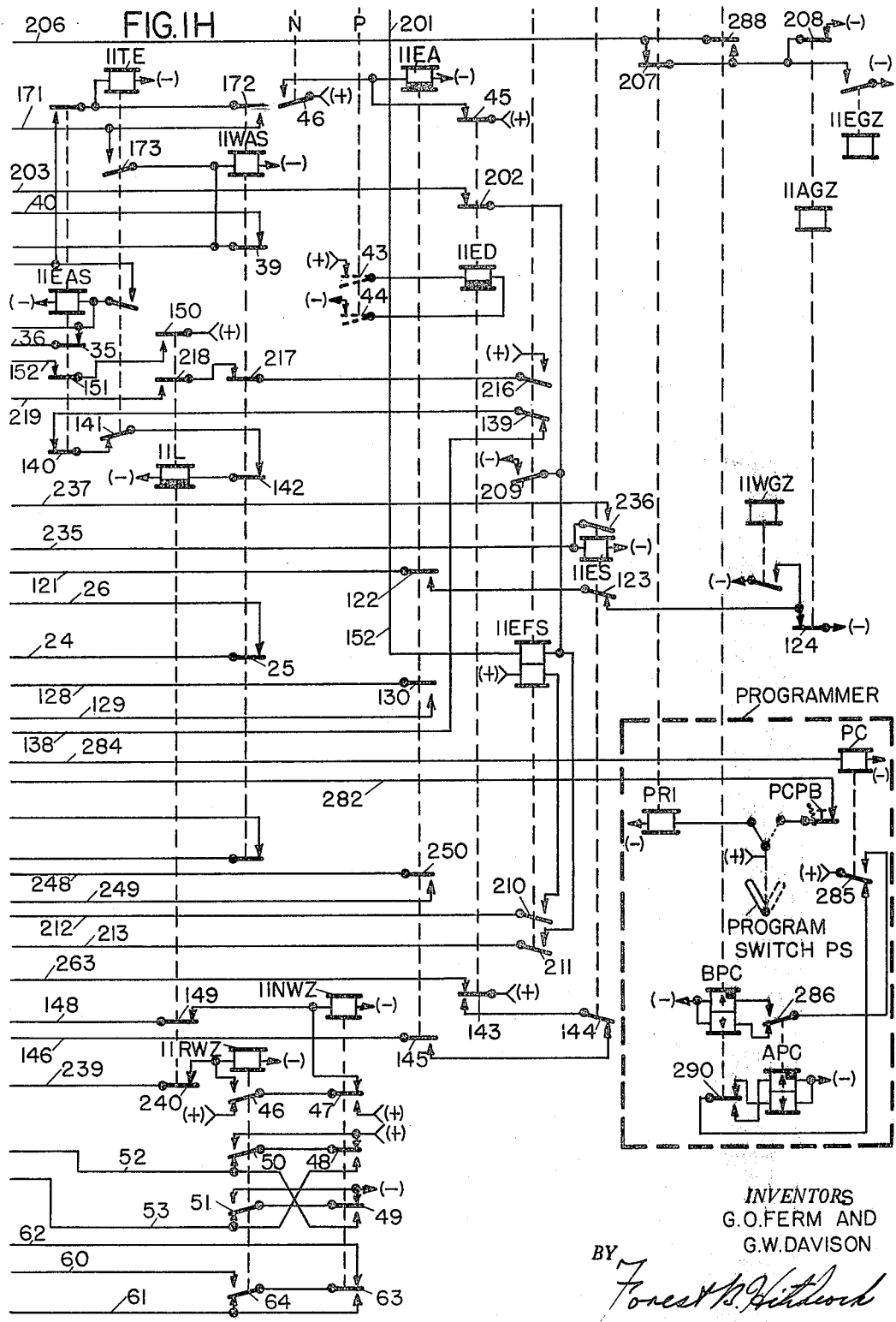

Nov. 15, 1966  G. O. FERM ET AL  3,286,091
VEHICLE TRAFFIC CONTROL SYSTEM
Filed June 3, 1963  16 Sheets-Sheet 9
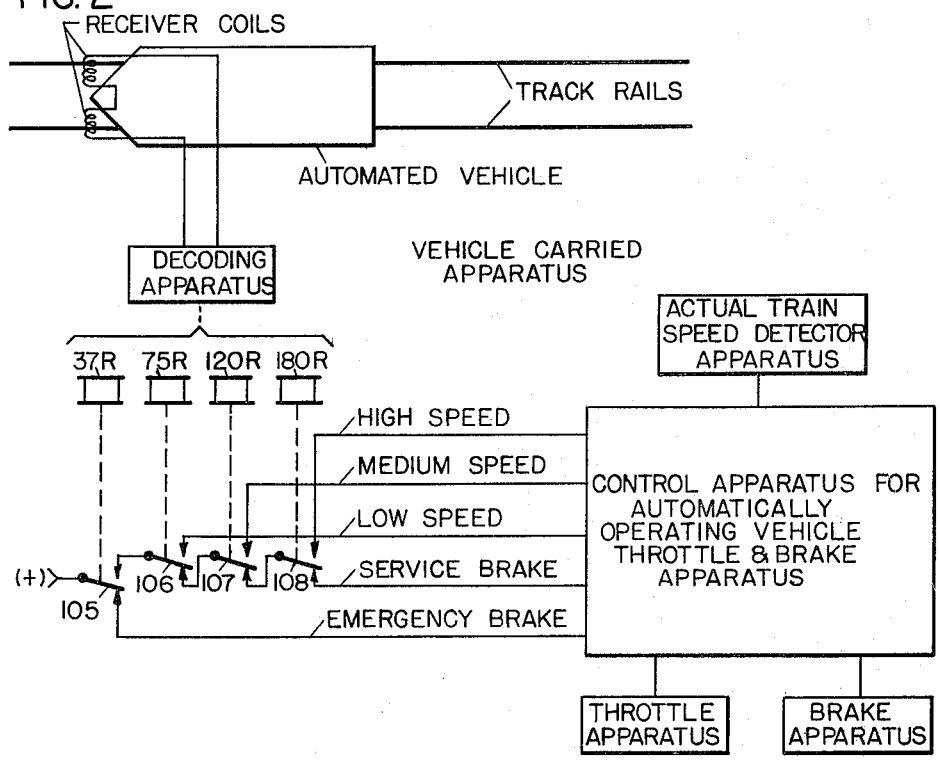
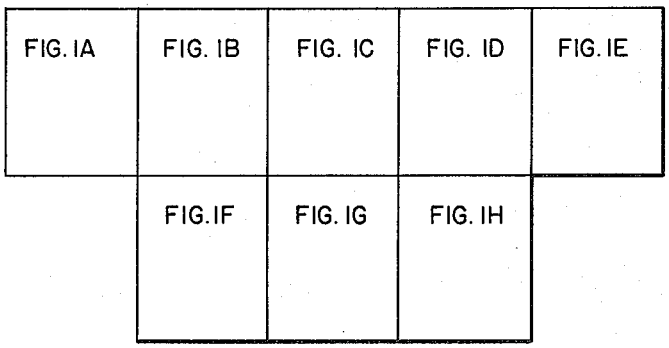
FIG. 3
ARRANGMENT DIAGRAM FOR FIGS. IA THROUGH IH
INVENTORS
G.O.FERM AND
G.W.DAVISON
BY
Forest R. Hitchcock
THEIR ATTORNEY Nov. 15, 1966  G. O. FERM ET AL  3,286,091

VEHICLE TRAFFIC CONTROL SYSTEM

Filed June 3, 1963  16 Sheets-Sheet 10

INVENTORS
G.O. FERM AND
G.W. DAVISON
BY
Forest N. Hitchcock
THEIR ATTORNEY

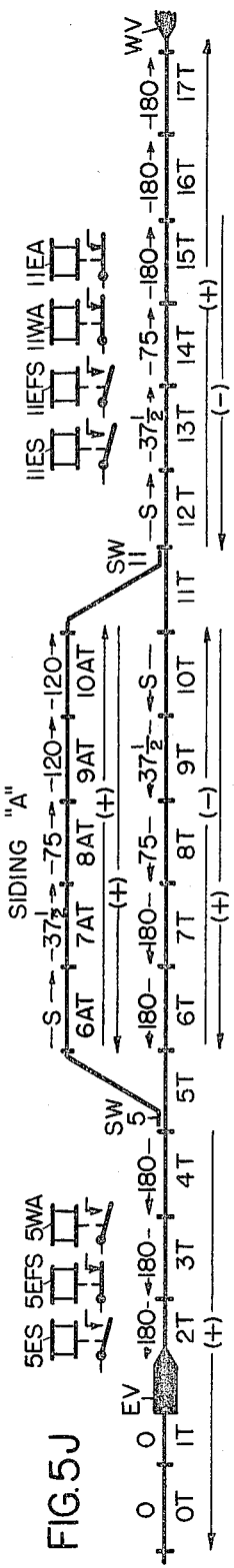
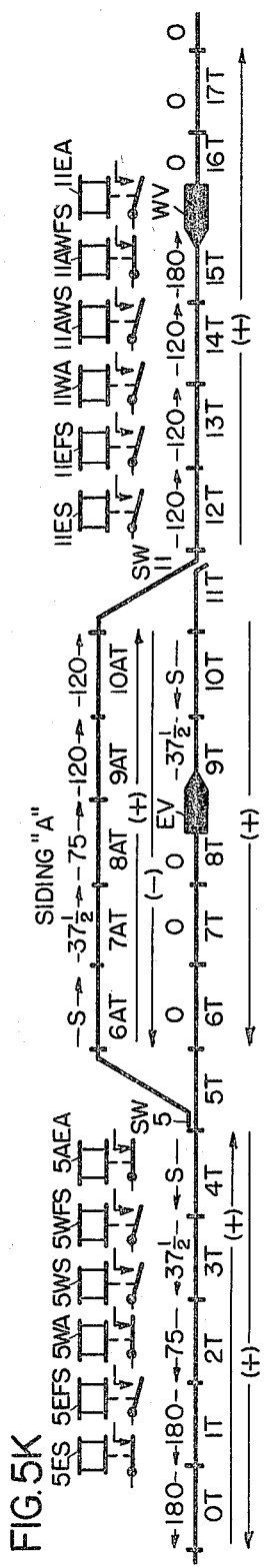
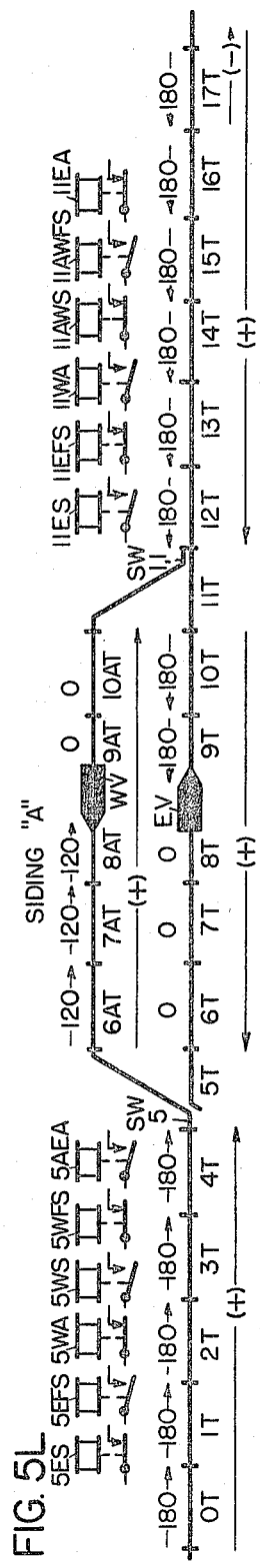
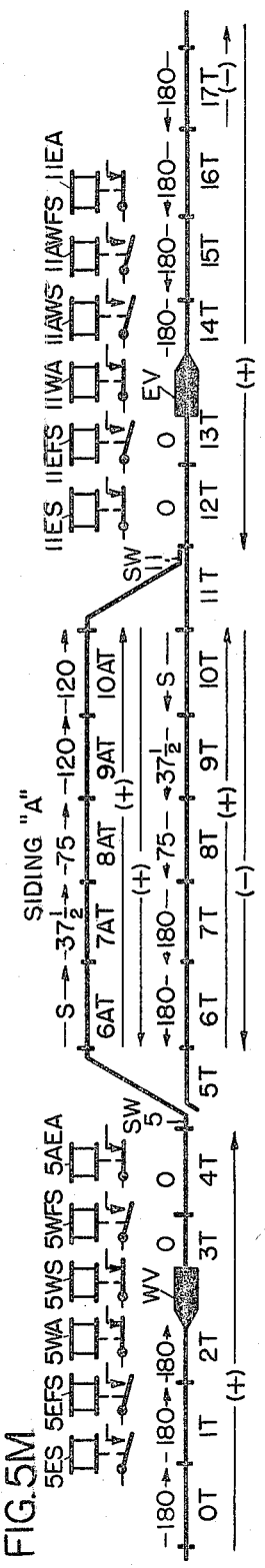

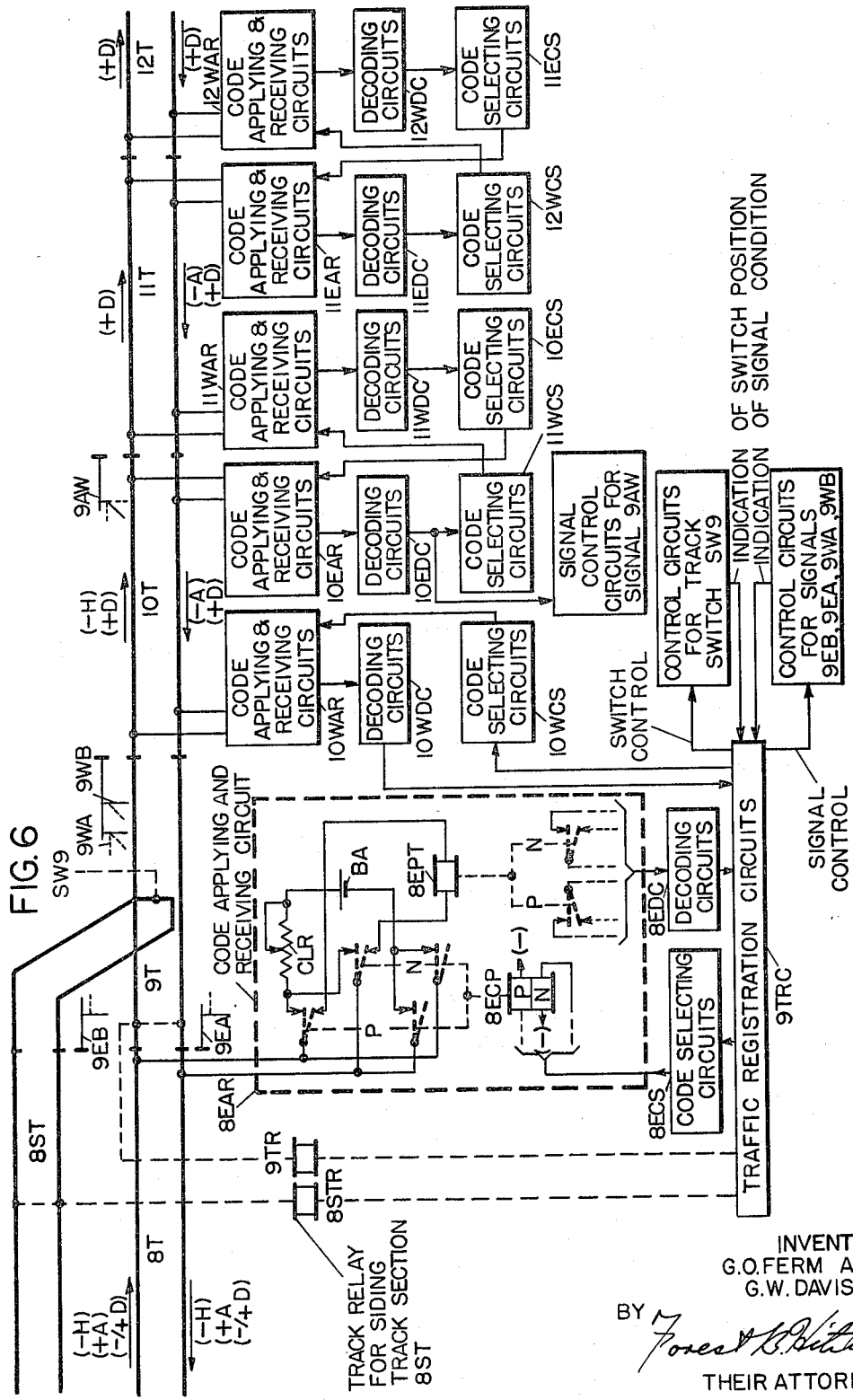

FIG. 7E, FIG. 7F, FIG. 7G, FIG. 7H, FIG. 7J

United States Patent Office 3,286,091
Patented Nov. 15, 1966

3,286,091
VEHICLE TRAFFIC CONTROL SYSTEM
Glenn O. Ferm and Gordon W. Davison, Rochester, N.Y., assignors to General Signal Corporation, Rochester, N.Y., a corporation of New York
Filed June 3, 1963, Ser. No. 285,129
23 Claims. (Cl. 246—2)

This invention generally relates to systems for controlling vehicular traffic, and, more particularly pertains to automatic traffic control whereby vehicles automatically approach clear their own routes along a right of way, dependent upon advance traffic conditions.

Various types of traffic control systems have been previously proposed whereby vehicular traffic may be more or less automatically controlled by the vehicles themselves as they progress along a right of way, such as for example, on a single track railroad made up of a stretch of single railway track having spaced passing sidings located therealong. In these previously proposed railway traffic control systems, when a railway train enters the approach to a control location (such as at the end of a passing siding), an indication control code is transmitted, via centralized traffic control (CTC) communication apparatus, back to the central control office where this indication code is utilized to select the proper control message to be applied to the communications apparatus for causing proper remote operation of the switches and signals at the field location; i.e. the previous systems require repeated communications between the control office and the various field locations in order to permit the vehicles to automatically set up and clear their own routes along the track layout, including the arrangement of a train meet when opposing trains are approaching the opposite ends of the same passing siding.

In accordance with the present invention, it is proposed to provide for having each train automatically and safely approach initiate its own route clearing operations as it progresses along a single track railroad, for example, without requiring that the vehicle initiate a communication cycle with a central control office as each control location is approached. Thus, the system of the present invention obviates the necessity of having separate communications apparatus extending between a central control office and the various field locations, and, provides control apparatus "in the field" to cause proper automatic operation of the track switches and signals.

More particularly, the system of the present invention proposes the use of polar coded line circuit apparatus, extending along the right of way over which the vehicles are travelling, which is supplied with code pulses of various polarities selected automatically in accordance with; the desired routing of a vehicle, the location of the vehicle in the track layout, and any advance traffic conditions existing ahead of the vehicle.

As will be pointed out in detail hereinafter, one embodiment of the present invention disclosed herein utilizes such polar coded line circuit, extending along the rails of a single track railroad, and associated traffic control circuit apparatus for the purposes of automatically controlling the traffic of unmanned or automated railway trains over the single track railroad; the unmanned vehicles being equipped with control apparatus for automatically operating the train throttle and brake mechanisms in accordance with train command information communicated from the wayside to the vehicle, for example, in the form of current applied to the track rails ahead of the train which is coded at a rate distinctive of the desired train operation or speed. More specifically, this traffic line cricuit (supplied with the polar code pulses) and the associated control apparatus is employed to control the proper routing of each unmanned train in accordance with advance traffic on the track layout, including; the arrangement of an automatic meeting of trains at a passing siding, and, the control of train movements on a stretch of single track between spaced passing siding; i.e. the traffic control apparatus not only provides for automatic operation of the track switches, but, also controls the application of the train control codes to the track rails and thereby determines when, where, and at what speed a train is to proceed.

In addition, a further embodiment of the present invention is disclosed herein for providing automatic traffic control for conventional or manned railway vehicles; i.e. the traffic control apparatus functions to automatically operate the various track switches and wayside signals encountered by the trains as they progress through a single track railroad layout. In this embodiment, no polar line circuit is required, extending along the track rails, since the polar code pulses utilized for controlling the track switches and wayside signals are applied directly to the track rails.

The present invention further proposes the use of programming means, whereby vehicles (either manned or unmanned) can be made to travel over a stretch of single lane right of way, such as is found in a single track railroad layout, in various traffic sequences. More particularly, the system may be programmed to accept the vehicles on a first come, first serve basis; i.e. the first train to enter a predetermined location on the track layout clears its own route and at the same time prevents an opposing train, at a corresponding advance layout location, from establishing an oppositely directed conflicting route. For example, the first train approaching one end of a stretch of single track between passing sidings would automatically clear its own route into the single track stretch, and, would at the same time prevent entrance of an oppositely directed train at the other end of the single track stretch. In preference to this first come, first serve type operation, the system of the present invention may be shifted to a second programming condition, wherein the traffic control circuit apparatus automatically causes the system to alternately accept trains from opposite directions. That is, if a first train travels over the single track stretch in a first direction, the traffic circuits require that the system will subsequently only accept an oppositely directed train, and so on.

Thus, in accordance with the present invention, the traffic control apparatus for the track layout can be programmed in various ways to make for the most efficient, yet automatic, handling of railway vehicle traffic, depending upon the manner in which the vehicles are normally presented to the system; i.e. the normal vehicle movements.

In view of the foregoing, a general object of the present invention is to provide for automatically controlling vehicle traffic along a right of way so that each vehicle automatically establishes and clears its own route as it progresses.

A further object of the present invention is to provide for making automatic meets between oppositely directed railway vehicles at a predetermined location such as a railway passing siding.

A further object of the present invention is to provide for controlling the traffic unmanned or automated railway vehicles on a single track railroad, including the automatic operation of track switches to arrange for meets between such vehicles.

A further object of the present invention is to provide a system for automatically controlling the traffic of unmanned or automated railway vehicles on a single track railroad, wherein the throttle and brake apparatus on the unmanned trains are automatically operated in accordance with command information communicated from the wayside to the vehicle.

A more specific object of the present invention is to provide such automatic traffic control for unmanned railway vehicles wherein this train command information is in the form of coded current applied to the track rails ahead of the train which is coded at a rate distinctive of the desired operation of the unmanned railway train.

A further object of the present invention is to provide programming apparatus whereby a stretch of single lane right of way is made to accept vehicle traffic in various sequences.

A more specific object of the present invention is to provide automatic traffic control for railway trains on a stretch of single track extending between spaced passing sidings whereby the stretch of single track can be made to accept trains on either a first come, first serve basis, or, in alternate directions; i.e. first in one direction and then the other.

Other objects, purposes and characteristic features of the present invention will be in part pointed out as the description of the present invention progresses, and in part obvious from the accompanying drawings, to which reference will be made, and in which:

FIGS. 1A through 1H illustrates a typical portion of a single track railroad and the detailed circuit apparatus associated therewith, when the system of the present invention is being used for providing automatic traffic control of unmanned or automated railway vehicles.

FIG. 2 is a simplified illustration of an automatic railway vehicle controlled in accordance with various control code rates communicated to the vehicle via the track rails.

FIG. 3 is an arrangement diagram showing the proper arrangement of FIGS. 1A through 1H.

Figure 4A:
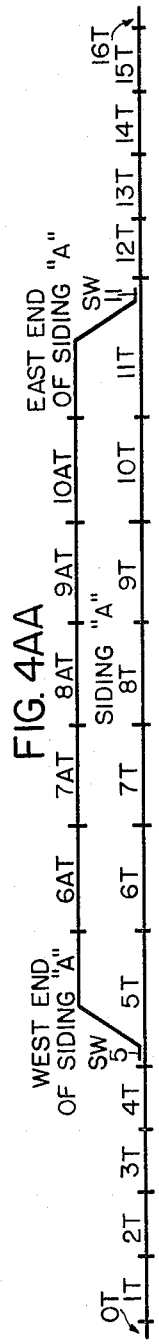
FIG. 4A is an arrangement diagram illustrating how the typical circuitry shown in FIGS. 1A through 1H is arranged to control automated vehicle traffic at a complete passing siding disposed along a stretch of track.
Figure 4B:
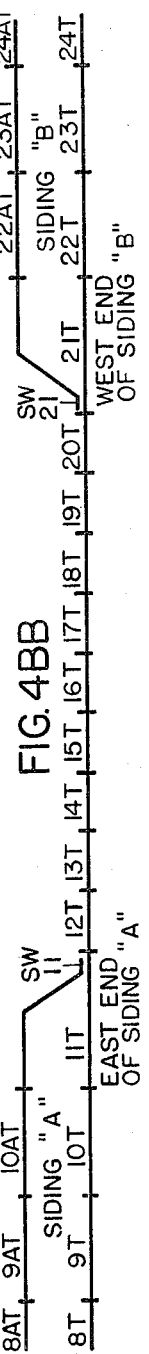

FIG. 4AA is a simplified illustration of a typical railway passing siding formed by arranging the circuitry of FIGS. 1A through 1H as shown in the arrangement diagram of FIG. 4A;

FIG. 4B is an arrangement diagram illustrating how the typical circuitry shown in FIGS. 1A through 1H is arranged to control automated vehicle traffic on a stretch of single track between spaced passing sidings;

FIG. 4BB is a simplified illustration of a typical stretch of single track extending between spacing passing sidings and formed by arranging the circuitry of FIGS. 1A through 1H as shown in the arrangement diagram of FIG. 4B;

FIGS. 5A through 5M (except that FIG. 5I has been omitted) are movement diagrams illustrating, in a simplified form, the various pulse polarities and code rates applied to the polar line circuit and track rails respectively for various movements of the unmanned vehicle traffic within the single track railroad being controlled by the embodiment of the present invention shown in detail in FIGS. 1A through 1H;

FIG. 6 illustrates in block form the traffic control apparatus for a typical portion of a single track railroad forming a further embodiment of the present invention, wherein a wayside line circuit is not required and the polar pulses are applied directly to the track rails for automatically controlling the wayside signals and the various track switches of the single track railroad; and FIGS. 7A through 7J (except that FIG. 7I has been omitted) are movement diagrams including illustration of polar coding conditions of the track rails when the apparatus of FIG. 6 is employed to automatically control the traffic of manned railway trains on a single track railroad.

For the purpose of simplifying the accompanying drawings and to facilitate in the explanation of the fundamental characteristics of the present invention, various parts and circuits have been shown diagrammatically in accordance with conventional symbols. For example, arrows with associated symbols (+) and (−) have been utilized to represent the opposite terminals of a suitable source of direct current for energization of the various relay circuits shown in the drawings; whereas, arrows together with the symbols BX and NX have been utilized in the drawings to represent the opposite terminals of a suitable source of alternating current of a preselected frequency such as, for example, one hundred cycles per second.

*Typical wayside apparatus shown in FIGS. 1A through 1H*

Figure 1D:
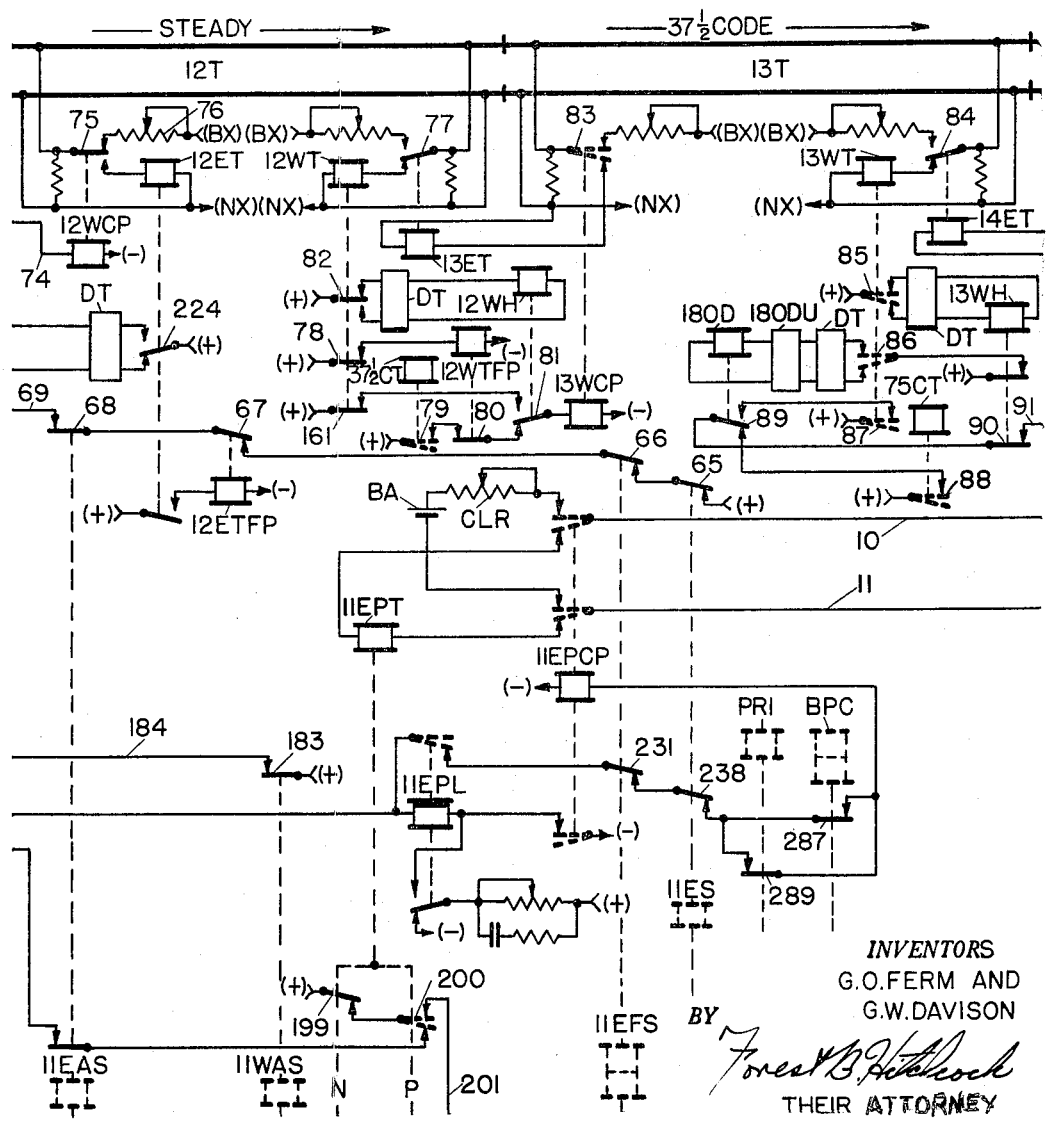

The typical portion of a single track railroad illustrated in FIGS. 1A through 1H of the accompanying drawings, when arranged as in FIG. 3, includes a stretch of single track comprising track sections 8T in FIG. 1A through 16T in FIG. 1E which is connected to the east or right-hand end of a siding track stretch, including track sections 8AT through 10AT, by track switch SW11. The track switch SW11 is provided with a conventional detector track circuit completely surounding the switch and including track relay 11TR of FIG. 1C which is normally energized by a suitable track battery (not shown) as long as the detector track section around switch SW11 is unoccupied, and, which becomes dropped away when a train enters the detector section, for example, to prevent operation of the switch while a train is travelling thereover. Hereinafter, this detector track circuit will be referred to as section 11T.

Since the vehicles being controlled in accordance with that embodiment of the present invention illustrated in FIGS. 1A through 1H, are unmanned or automated, loops LA and LB extend throughout the respective branches of the detector track section 11T so as to communicate the various train control codes (to be described later) to an unmanned vehicle while the vehicle is travelling over the track switch SW11. As will be discussed hereinafter, in the other track sections shown in FIGS. 1A through 1H, the train control codes distinctive of the desired automated train operation are applied directly to the track rails over which the vehicle is travelling.

Thus, and with reference to FIGS. 1A through 1H, apparatus is provided for applying rate codes to the rails of the illustrated track sections distinctive of the desired operation of the automated trains on these track sections. Without attempting to limit the spirit or scope of the invention, these control codes are transmitted through the rails in a direction opposite to the direction in which a vehicle is travelling; i.e. they are applied ahead of the train at the far or exit end of the track sections.

More specifically, conventional code transmitters CT (e.g. transmitter 75CT in FIG. 1D) are provided to generate the preselected code rates for the selective energization of code repeater relays (e.g. relay 13WCP in FIG. 1D) which apply these control codes to the track rails over which the vehicles are travelling, in accordance with the track and traffic conditions existing ahead of the unmanned vehicle. Each track section of the illustrated track layout (except detector track section 11T) is provided with two code responsive track relays, one at each end (e.g. relay 12WT in FIG. 1D) which are used along with conventional track decoding apparatus, to detect the code rate being supplied to that track section, for example, so as to properly select the code rate to be applied to the next track section to the rear. For example, this track code detecting apparatus includes home relays H (e.g. relay 12WH in FIG. 1D) and, for certain track sections, clear code detecting relays 180D which are energized provided only that the associated track sections are being supplied with a 180 code rate distinctive of the most permissive or high speed operation for an automated railway vehicle on the track sections, as will be pointed out.

Without attempting to limit the spirit or scope of the present invention, the following tabulation illustrates the various command code rates supplied to the rails of the illustrated track sections and/or wayside loops LA and LB in FIG. 1C, of the selected embodiment of the invention, for various desired operations of the automated railway trains.

| Code rate (pulses per minute): | Automatic train operation |
|---|---|
| Steady | Emergency brake application. |
| 37½ | Service brake application. |
| 75 | Slow speed. |
| 120 | Medium speed. |
| 180 | High speed. |

The automated railway vehicles (see FIG. 2) are then each equipped with suitable receiving coils mounted at the head end of the vehicle which inductively pick up the various track code rates being applied in the illustrated track layout, and with suitable decoding apparatus, including decoding relays 37R, 75R, 120R and 180R which selectively register the particular code rate being received from the wayside. In order to simplify the drawings, the registration provided by these decoding relays is utilized to selectively energize a plurality of train control wires in accordance with the desired automatic operation for the unmanned vehicle. The control wires, along with suitable actual speed detecting apparatus, control the brake and throttle automation apparatus, as is well-known in the art, to cause proper operation of the automated train as called for from the wayside.

More specifically, decoding relay 37R becomes picked up as long as a code rate equal to or greater than thirty-seven and one-half (37½) pulses per minute is being received; whereas, the decoding relays 75R, 120R and 180R are more selective and become picked up only when 75, 120 and 180 code rates respectively are received. Thus, if decoding relay 37R is dropped away to indicate that a STEADY or no code condition has been received on the vehicle, the EMERGENCY BRAKE control wire of FIG. 2 is energized and causes an automatic emergency application of the vehicle brakes. However, if a 37½ code rate is being received from the track rails, the decoding relay 37R only is picked up and thereby causes energization of the SERVICE BRAKE control wire of FIG. 2 which causes automatic service application of the train brakes. In the same manner, the HIGH, MEDIUM and LOW SPEED control wires of FIG. 2 are selectively energized to cause high, medium and low speed operation of the automated train upon reception of 180, 120 and 75 code rates respectively from the wayside.

As mentioned previously, the partial track layout shown in detail in FIGS. 1A through 1H of the accompanying drawings, represents a typical portion of a single track railroad layout at the east or right-hand end of a typical passing siding or control location (assuming that the east direction is to the right in the accompanying drawings). Thus, it should be understood at this time that traffic on an entire single track railroad layout made up of a stretch of single track with one or more passing sidings spaced thereupon, could be automatically controlled by the system of the present invention by merely providing circuitry similar to that shown in detail in FIGS. 1A through 1H at the various other control locations along the single track railroad. For example, FIG. 4A of the accompanying drawings illustrates how the circuit diagrams of FIGS. 1A through 1H would be arranged to completely control automated train movements at a typical complete passing siding "A," as shown in FIG. 4AA; whereas, if FIGS. 1A and 1H were arranged as shown in FIG. 4B, the complete circuitry would be realized for controlling automated train traffic in two directions over a stretch of single track between spaced passing sidings "A" and "B," shown in FIG. 4BB.

More specifically, and with reference to FIGS. 4AA: the west or left-hand ends of track sections 8T and 8AT would be equipped with apparatus exactly the same as that provided at the east or right-hand ends of these same track sections (see FIG. 1A); the east ends of track sections 7AT and 7T would be equipped with apparatus exactly the same as that provided at the west ends of track sections 9AT and 9T respectively (see FIG. 1A); the west ends of track sections 7AT and 7T would be equipped with apparatus exactly the same as that provided at the east ends of sections 9AT and 9T respectively (see FIG. 1B); and so on to the west end of siding "A." Similarly, in FIG. 4BB: both the left and right-hand ends of track section 16T are provided with exactly the same apparatus; the west end of track section 17T is equipped similar to the east end of section 15T; and so on to the east end of the single track stretch.

Figure 5A:
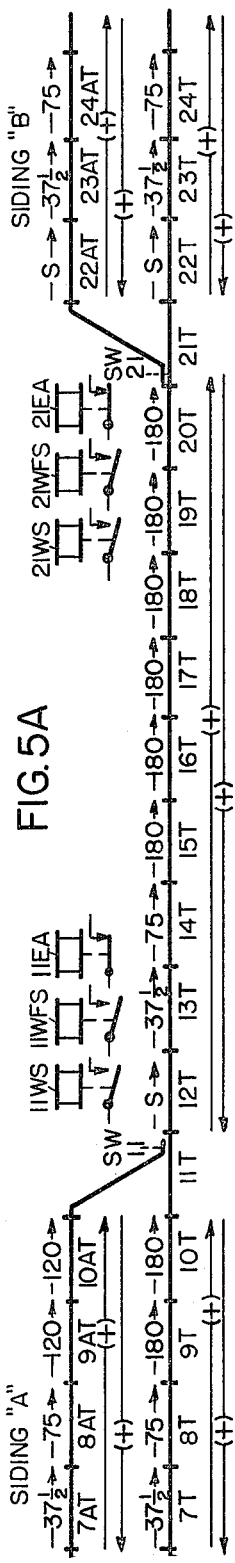

With reference now to FIGS. 1A through 1E, it will be noted that the various track code rates are depicted in these drawings as being transmitted in an eastward (to the right) direction along the various track sections shown in the partial track layout, and with reference to FIG. 5A, the track coding condition for a more complete section of a single track railroad is illustrated.

Thus, and for reasons presently to be explained; the left-hand end of track section 12T in FIG. 1D is normally supplied with a STEADY code rate; the left-hand end of track section 13T is supplied with a 37½ code rate; track section 14T is supplied with a 75 code rate; and, all track sections to the right of track section 14T are supplied with train control codes of 180 code rate. Similarly, referring for example, to FIG. 5A, the first track sections, on the main line and siding track stretch, to the right or east of the track switch at the west or left-hand end (switch location SW12) of a passing siding are supplied with STEADY code rates, the next track sections to the east are supplied with 37½ code rates, and the remaining track section up to the opposite end of the passing siding are supplied with proceed code rate (75, 120 or 180) as illustrated. With reference to FIGS. 1A and 1B, it should be noted that the most permissive code rate supplied to the siding track stretch is a 120 or medium speed code rate since it is usually desirable to limit the permitted speed of the automated railway vehicles to their nominal medium speed when such vehicles are travelling over a track switch in its reverse position.

In view of the above, if a westbound train were approaching track switch SW11 in FIG. 1C, with the track sections being coded as shown in FIGS. 1A through 1E, it would travel at high speed until it reached track section 14T, at which time it would be slowed to its nominal slow speed, and, subsequently, receive a service brake application upon entering at the right-hand end of track section 13T.

In order to permit this westbound vehicle to proceed over the track switch SW11, the rate coding in track sections 12T and 13T must be changed from the brake application code rates to one of the proceed control codes. In the illustrated embodiment of the present invention, the application of proceed control code rates to the track sections surrounding the switch location shown in FIG. 1C is governed by the code control relays 11WG, 11AWG, 11AEG and 11EG respectively of FIG. 1G. More specifically, relays 11WG and 11AWG determined when a westbound train may proceed over switch SW11 in its normal and reversed positions respectively; whereas, relays 11AEG and 11EG respectively control the movement of eastbound trains onto the stretch of single track from the passing siding track and main line track west of the switch.

More specifically, these proceed code control relays G are provided at each control location (end of siding) along the track layout and act in a manner somewhat like the signal clearing relays normally utilized in conventional wayside signalling control circuits to indicate when it is proper for a vehicle approaching the control location to proceed past the control location, by controlling the application of the proceed control code rates to the track sections (and wayside loops) adjacent to the location.

As will be discussed in detail hereinafter, the traffic control system of the present invention is also capable of arranging automatic meets when necessary between oppositely directed vehicles, whether manner or unmanned, when the system detects that two such vehicles are approaching at opposite ends of a passing siding. More specifically, the switch control circuitry utilized in accordance with the illustrated embodiment of the present invention at each switch location includes: a switch lock relay L (e.g. relay 11L of FIG. 1H) which must be in its picked up position before the associated track switch can be operated, and, which when deenergized, locks the track switch in its existing position; switch control relays RWZ and NWZ (e.g. relay 11RWZ and 11NWZ of FIG. 1H) which when picked up selectively call for the associated track switch to be operated to its reverse or normal position respectively; and, switch correspondence relays RWC and NWC (e.g. relays 11RWC and 11NWC in FIG. 1G) which then indicate respectively when correspondence exists between the actual position of the switch and the position called for by the associated switch control relays.

The traffic of the automated railway vehicles on the single track railroad assumed as being controlled in accordance with the illustrated embodiment of the present invention is primarily registered by polar coded line circuits which extend throughout the various portions of the track layout, between central locations, and, which are selectively energized with code pulses of various polarities dependent upon the location, direction of travel, and routing of each railway vehicle within the track layout. By detecting the polarity of the code pulses in each line circuit, the system is able to automatically sense the location, direction and route for each automated train and thereby automatically control the movement of the vehicles on the track layout.

More specifically, each of the various portions of the illustrated single track railroad is provided with a line circuit (e.g. line wires 10 and 11 between FIGS. 1D and 1E) having suitable pulse applying and receiving apparatus at either end thereof, such as, for example, code repeater relays 11EPCP in FIG. 1D and relay 15WPCP in FIG. 1E, which selectively apply polar code pulses to the opposite ends of the line wires 10 and 11, and, polar pulse responsive relays, such as relay 11EPT in FIG. 1D and 15WPT in FIG. 1E, for selectively receiving the polar code pulses being applied at the opposite ends of this line circuit. With reference to FIG. 1E, it will be noted that similar line circuit apparatus, including line wires 12 and 13, extend to the right in the drawings from wires 10 and 22, towards the passing siding (not shown) assumed to be located at the east end of the single track stretch and forming part of a complete single track railroad layout.

As already mentioned, the apparatus shown in FIGS. 1A through 1H is for a typical portion of such a single track railroad, and therefore, it should be understood that line circuit apparatus equivalent to line wires 10, 11, 12 and 13 in FIGS. 1D and 1E, for example, would also be provided at this passing siding assumed to be situated to the east of that partially shown in FIGS. 1A, 1B, 1C and 1D, similar line circuit apparatus, including line wires 14 and 15, for example, extend from the illustrated control or switch location to the left or west in the drawings towards the opposite or west end of the passing siding partially shown in FIGS. 1A through 1H, for the purpose of registering traffic conditions along the main and siding track stretches between the siding ends, as will be described.

The various polar code pulses are formed on the line circuits by causing the polar code repeater relays PCP to intermittently connect suitable batteries (for example, see battery BA in FIG. 1D) to the line circuit wires in one polarity or the other, and, suitable current limiting resistors CLR are connected between each battery and the associated line wires for the purpose of controlling the magnitude of the polar code pulses. Furthermore the length of pulse transmitted by the polar code repeater relays PCP located at the control location ends of the various polar line circuits is determined by associated pulse length determining relays PL (e.g. relay 11EPL in FIG. 1D).

As mentioned previously, the particular polarity of the pulses applied to the various line circuits is determined automatically in accordance with the location, direction of travel and routing of each vehicle within the single track railroad layout, and, the various code pulse polarities employed in the illustrated embodiments of the present invention are realized by pole changing the connection of the batteries BA to the associated line wires. The particular polarities of the polar code pulses applied to the various line circuits is then detected by suitable detecting apparatus provided at the ends of each polar line circuit, which thereby register the actual traffic conditions existing throughout the track layout so that the automated train traffic may be properly and automatically controlled.

More specifically, FIGS. 1A through 1H illustrate the circuitry provided at a typical control location (end of siding) and includes directional stick relays WS and ES (such as relays 11WS and 11ES in FIGS. 1C and 1H respectively) for registering that a railway train travelling in a certain direction has passed the switch location and entered one of the predetermined blocks of the illustrated track layout. A plurality of traffic stick relays WFS and EFS (e.g. relays 11EFS and 11WFS in FIGS. 1H and 1F respectively) are also provided at each control location to register the direction of each vehicle approaching the control location so as to prevent, for example, the clearing of opposing routes throughout the track layout.

Approach stick relays WAS and EAS, such as relays 11EAS and 11WAS in FIG. 1H, are provided at each control or switch location and are utilized in a conventional manner to prevent immediately changing the switch position, for example, after a vehicle approaching the switch has once been given permission to travel over the switch, either by reception of a proceed control code rate or the clearing of a wayside signal. Approach relays WA and EA (e.g. relay 11EA in FIG. 1H) are also provided at each control location to register the approach of any railway vehicles towards the control location, and, in the illustrated embodiment of the present invention are utilized to provide approach indication, so that a proceed control can be applied to the track rails for permitting an automated railway train to pass the location and/or to approach initiate operation of track switches, if necessary, to cause automatic meeting between opposing trains. In addition, distant relays ED and WD (e.g. relay 11ED in FIG. 1H) are also provided at each control location and are also utilized, as will be discussed, to register traffic conditions throughout the track layout being controlled.

In the illustrated embodiment of the present invention, various route clearing relays GZ are provided at each control location (e.g. relays 11AGZ, 11EGZ and 11WGZ of FIG. 1H) and determined whether the railway vehicle traffic is to be manually or automatically controlled over the illustrated track layout. Thus, if the system is to provide automatic traffic control for the railway vehicles, the automation relay 11AGZ in FIG. 1H of the accompanying drawings (as well as the corresponding automation relays at the other control locations) would be picked up, for example, by a control signal transmitted from a central control office, to put the system into that condition wherein the routes for the trains are automatically cleared as the trains progress through the track layout, without further action on the part of the control office. On the other hand, if the relay AGZ at a given control location is dropped away, the manual route clearing relays EGZ and WGZ at that location would be manually controlled, for example, by an operator as part of a conventional centralized traffic control (CTC) system, to govern the traffic on the single track railroad. More specifically, the relay 11EGZ in FIG. 1H would be energized or picked up if the operator desired to permit an eastbound train to proceed over the track switch SW11; whereas, the signal clearing relay 11WGZ in FIG. 1H would be picked up if the operator desired to permit a westbound train to pass over the track switch SW11 in FIG. 1C.

With reference now to FIG. 1H, a simplified programmer organization is illustrated capable of causing the automated railway vehicles to move over a single track stretch between passing sidings in various traffic sequences. More particularly, this programmer apparatus includes a program switch PS operable to a plurality of programming positions; i.e. while switch PS is in its left-hand position (as shown) relay PR1 is picked up and causes the stretch of single track to accept trains on the first come, first serve basis, as will be explained hereinafter. However, when the programmer switch PS is in its right-hand position, the relays APC and BPC are operated in such a manner that the system is conditioned to accept the trains, first in one direction, and then in the other for movement over the single track stretch. For reasons to be described hereinafter, these relays APC and BPC shown in FIG. 1H are of the magnetic stick type provided with both pick up and knockdown windings, which are selectively energized to cause the relays to close their front and back contacts respectively, and, which remain in their last operated position (after deenergization) until the opposite winding is energized.

*Normal conditions of apparatus shown in FIGS. 1A through 1H*

As previously pointed out, the partial track layout shown in FIGS. 1A through 1H represents a typical portion of a single track railroad assumed as being controlled in accordance with the automatic traffic control system provided by the present invention. Assuming now that this partial track layout is unoccupied and furthermore that no railway vehicles are approaching the siding end illustrated in FIG. 1C, the polar line circuit apparatus is normally in condition for having (+) polar code pulses alternately transmitted in opposite directions from the respective ends of each polar line circuit.

It should be understood at this time, that the polar relays PT employed at each end of the polar line circuits are provided with positive (P) and negative (N) armatures which are selectively actuated dependent upon whether the opposite end of the associated line circuit is being supplied with (+) or (−) polar code pulses respectively. Furthermore, certain of the polar code repeater relays PCP employed for energizing the polar line circuits with the various polar code pulses, are provided with both positive (P) and negative (N) windings which are selectively energized to determine the polarity of the polar code pulses to be applied to the associated polar line circuit.

With reference to FIG. 1F, for example, the upper or positive (P) winding of polar code repeater relay 11WPCP, at the right-hand or east end of the line wires 14 and 15, is normally energized by a circuit which extends from (+) in FIG. 1G and includes the negative (N) back contact 16 of polar relay 11WPT, positive (P) back contact 17 of polar relay 11WPT, back contact 18 of pulse length determining relay 11WPL, back contact 19 of directional stick relay 11SW, wire 20 between FIGS. 1G and 1F, back contact 21 of traffic stick relay 11WFS, wire 22 between FIGS. 1F and 1G, front contact 23 of detector track relay 11TR, wire 24 between FIGS. 1G and 1H, front contact 25 of approach stick relay 11WAS, wire 26 between FIGS. 1H, 1G and 1F, and to (−).

When energized by this circuit, the polar code repeater relay 11WPCP operates its positive (P) polar contacts and thereby causes (+) polar code pulses to be transmitted in a westbound direction along line wires 14 and 15 which extend between FIGS. 1G, 1B and 1A to the left-hand or west end (not shown) of the passing siding partially illustrated in FIGS. 1A through 1C for detecting traffic on the main track stretch between the ends of this siding.

More specifically, the pulse length determining relay 11WPL in FIG. 1G determines the length of each pulse transmitted by polar code repeater relay 11WPCP in that it is energized by a circuit including front positive contact 27 of this polar code repeater relay, along wire 28 between FIGS. 1F and 1G, and back contacts 16 and 17 of relay 11WPT, whereby the pulse length determining relay is picked up to open its back contact 18 shortly after each pulse is transmitted by the code repeater relay 11WPCP. This pulse length determining relay 11WPL is made somewhat slow releasing by a stick circuit including its own front contact 29, capacitor 30, fixed resistor 31 and variable resistor 32, whereby the setting of variable resistor 32 determines the rate at which polar code repeater relay 11WPCP will transmit polar code pulses in line wires 14 and 15.

Similarly, the west or left-hand end (not shown) of the illustrated passing siding is furthermore provided with polar line circuit apparatus including a polar code repeater relay equivalent to relay 11WPCP which operates to apply a return (+) polar pulse on wires 14 and 15 during each "off" time of the relay 11WPCP. In this manner, the line wires 14 and 15 are selectively supplied at their respective ends with alternately directed positive (+) polar pulses whenever the illustrated track layout is unoccupied.

Line wires 33 and 34 shown in FIGS. 1B and 1A similarly serve to detect traffic on the siding track stretch and are also supplied with oppositely directed (+) polar pulses when the track layout is unoccupied, by similar polar coding apparatus including the polar code repeater relay 11AWPCP of FIG. 1F and a corresponding code repeater relay (not shown) associated with the left-hand or west end of line wires 33 and 34. The rate of pulse transmission by relay 11AWPCP is controlled by relay 11AWPL in FIG. 1F.

With reference to FIG. 1D of the accompanying drawings, the polar code pulses are applied to the west or left-hand end of line wires 10 and 11 by polar code repeater relay 11EPCP which is provided with only a single winding so that it only transmits (+) polar code pulses along the line wires 10 and 11; the rate of this pulse transmission being controlled by the operating characteristics of pulse length determining relay 11EPL in a manner previously described. With reference to FIG. 1E of the accompanying drawings, the line wires 10 and 11 are connected to line wires 12 and 13 leading to the opposite end of the stretch of single track, by suitable polar code repeating apparatus including polar relays 15WPT and 16EPT, and, polar code repeater relays 15WPCP and 16EPCP, the purpose of which will be discussed in detail hereinafter.

In view of the foregoing discussions, it should be understood that under the assumed normal unoccupied traffic conditions, each of the illustrated line circuits has positive (+) polar pulses alternately transmitted in opposite directions through it so that each of the illustrated polar relays PT in FIGS. 1A through 1H is normally in that condition wherein its positive (P) armature is intermittently operated at a rate determined by the rate at which the polar pulses are being transmitted through the associated line circuits.

Without attempting to limit the spirit or scope of the present invention, the polar code apparatus at the east or right-hand end of each polar line circuit is assumed here to be conditioned to serve as a so-called driver circuit whereby the polar pulses applied to the east end of each line circuit might be, for example, at a rate of thirty-three pulses per minute; whereas, the corresponding polar coding apparatus at the west or left-hand end of the line circuits would be conditioned to act as a so-called follower circuit normally set, for example, for transmission of twenty-nine pulses per minute. However, when the track layout is unoccupied, the polar line circuit apparatus operates in a dependent coding condition, as is well known to those skilled in the art, whereby pulses are transmitted in the line circuit at a rate determined by the driver end of the line circuit; i.e. at thirty-three pulses per minute. However, when dependent coding is terminated upon detecting of a train in the track layout, as will be discussed, the follower end of the line circuit transmits polar code pulses independently at the somewhat slower rate of twenty-nine pulses per minute, for example. The reason for having two different pulsing rates for the line circuit is to prevent so-called code fights when the line circuits are returned from independent to a dependent coding condition, as is also well known by those skilled in the art.

Under the assumed traffic conditions, the approach stick relays EAS and WAS shown in the illustrated circuits of FIGS. 1A through 1H are normally picked up to register that no approaching trains have cleared a route over the associated track switch SW11. For example, the eastbound approach stick relay 11EAS in FIG. 1H is normally maintained in its picked up position by a stick circuit including its own front contact 35, wire 36 between FIGS. 1H and 1G, and back contacts 37 and 38 of eastbound code control relays 11EG and 11AEG respectively. Similarly, the westbound approach stick relay 11WAS of FIG. 1H is also normally stuck in its picked up position by a circuit including its own front contact 39, wire 40 extending between FIGS. 1H and 1G, and back contacts 41 and 42 of westbound code control relays 11WAG and 11WG respectively. From the above, it should be noted that the approach stick relay associated with a given traffic direction is maintained in a picked up position until a train is given permission to proceed in this direction at the switch location.

With the polar relays PT at the ends of the line circuits 10-11, 14-15, and 33-34 in FIGS. 1A through 1H, each receiving positive (+) polar code pulses, the distant relays D in these drawings are normally picked up to register the assumed unoccupied traffic conditions. For example, distant relay 11ED in FIG. 1H is normally picked up as long as the positive (P) front contacts 43 and 44 of relay 11EPT are intermittently closed, and, with relay 11ED picked up, the associated approach relay 11EA of FIG. 1H is also normally maintained in a picked up position by a circuit including the front contact 45 of distant relay 11ED, to register that the east approach to track switch SW11 is unoccupied. It will also be noted in FIG. 1H that the east approach relay 11EA is provided with an alternate energizing circuit including negative (N) front contact 46 of the polar relay 11EPT, whereby the approach relay 11EA is picked up if relay 11EPT is receiving negative (−) polar code pulses along line wires 10 and 11.

As previously pointed out, the automatic traffic control relay 11AGZ of FIG. 1H is also normally picked up while the control system typically shown in FIGS. 1A through 1H of the drawings is in its automatic traffic controlling condition, and furthermore, the programmer switch PS will initially be assumed in its illustrated left-hand position wherein relay PR1 of FIG. 1H is picked up and thereby conditions the single track stretch to accept trains on a first come, first serve basis, as will be described hereinafter. Although the energizing circuits for relay 11AGZ have not been shown, it is assumed here that this relay (as well as the corresponding automation relays at the other control locations) is, for example, remotely controlled from a suitable central control office, in accordance with whether or not the railway vehicle traffic is to be automatically controlled.

The track switch SW11 shown in FIG. 1C of the accompanying drawings is controlled by a switch machine SM11 shown in both FIGS. 1C and 1G. Under the assumed illustrated normal conditions, this track switch SW11 is in its normal or straight line position in accordance with the energization of normal switch control relay 11NWZ of FIG. 1H by a circuit including back contact 46 of reverse control relay 11RWZ, and its own stick contact 47. In accordance with this pick up of relay 11NWZ, the switch machine SM11 (see FIG. 1G) is supplied with operating energy of the polarity required to operate the track switch SW11 to its normal position. More specifically, the switch machine SM11 receives the proper polarity of energization for the normal position of track switch SW11, over front contacts 48 and 49 of relay 11NWZ in FIG. 1H, back contacts 50 and 51 of relay 11RWZ, wires 52 and 53 between FIGS. 1H and 1G, front contacts 54 and 55 of detector track relay 11TR, and along wires 56 and 57 in FIG. 1G.

As mentioned previously, correspondence relays 11NWC and 11RWC in FIG. 1G are selectively actuated to register, respectively, when correspondence occurs between the actual switch position and the position called for by the switch control relays 11NWZ and 11RWZ. More specifically, with the track switch SW11 in its normal position, in agreement with the position called for by the pick up of relay 11NWZ in FIG. 1H, the normal switch correspondence relay 11NWC is energized by suitable energy supplied to the switch machine SM11 over wires 58 and 59, through switch machine SM11 to detect the existing position of the switch SW11, along wires 60, 61 and 62 in FIGS. 1G and 1H, and through front contact 63 and back contact 64 of switch control relays 11WNZ and 11RWZ respectively.

With reference now to FIGS. 1A through 1H of the accompanying drawings, the various track code rates applied to the illustrated track sections for the assumed normal traffic conditions are shown above the respective sections. More particularly, the left-hand end of track section 12T in FIG. 1D is normally supplied with a STEADY code rate indicative of an automatic emergency brake application on this track section, in accordance with the steady energization of track code repeater relay 12WCP by a circuit extending from (+) in FIG. 1D, back contacts 65, 66 and 67 of directional stick relay 11ES, traffic stick relay 11EFS and relay 12ETFP respectively, front contact 68 of approach stick relay 11EAS, wire 69 between FIGS. 1D and 1C, back contact 70 and 71 of code control relays 11WG and 11AWG respectively, front contact 72 of detector track relay 11TR, back contact 73 of home relay 12EH, wire 74 between FIGS. 1C and 1D and to (−). With code repeater relay 12WCP thus steadily energized, its closed front contact 75 steadily connects the source of alternating current represented by the reference symbols BX and NX in the accompanying drawings to the left-hand end of track section 12T, through current limiting resistor 76.

This steady energization (STEADY code) applied at the left-hand end of track section 12T causes track relay 12WT, connected across the right-hand end of the same track section, to be steadily energized over back contact 77 of track relay 13ET. Therefore, its track repeater relay 12WTFP in FIG. 1D is picked up, over front contact 78 of track relay 12WT, and, causes code repeater relay 13WCP associated with the left-hand end of the next track section 13T to be energized at a 37½ code rate by a circuit including front contact 79 of code transmitter 37½CT, front contact 80 of repeater relay 12WTFP, and back contact 81 of home relay 12WH. It should be pointed out at this time, that the home relay 12WH is controlled by contact 82 of track relay 12WT energizing a conventional decoding transformer DT in such a manner that it (relay 12WH) will be picked up whenever the track relay 12WT is operated at any of the other codes above STEADY; i.e. for 37½, 75, 120 or 180 code rates.

In accordance with this intermittent energization of code repeater relay 13WCP, the left-hand end of track section 13T is thus supplied with a 37½ (service brake) code rate due to the intermittent operation of contact 83 of the code repeater relay 13WCP, which intermittently connects the source of alternating current (terminals BX and NX) to the left-hand end of the track section at this same rate.

With reference to the right-hand end of track section 13T, the track relay 13WT is thus energized at a 37½ code rate, over back contact 84 of track relay 14ET, and, thereby intermittently operates its contacts 85, 86 and 87 at the same rate, to thus cause the associated home relay 13WH to become picked up. On the other hand, the operation of contact 86 of track relay 13WT at this 37½ code rate does not cause pick up of the associated high speed or clear code detector relay 180D of FIG. 1D, since this relay is only picked up when track relay 13WT receives a 180 code rate, as detected by decoding unit 180DU.

Therefore, the code repeater relay 14WCP, associated with the left-hand end of track section 14T in FIG. 1E is energized at a 75 code rate by a circuit including front contact 88 of code transmitter 75CT, back contact 89 of relay 180D, front contact 90 of home relay 13WH, and wire 91 extending between FIGS. 1D and 1E, and a 75 code rate is thus applied to the left-hand end of track section 14T, due to the resulting opening and closing of front contact 92 of relay 14WCP. This coding of section 14T is received by the track relay 14WT, at the right-hand end of track section 14T, and, the next track section 15T is then supplied (at its left-hand end) with a 180 code rate due to the intermittent energization of code repeater relay 15WCP by a circuit including front contact 93 of code transmitter 180CT and front contact 94 of home relay 14WH which is picked up due to the intermittent operation of contact 95 of track relay 14WT at the received 75 code rate.

The 180 code rate now being applied to the left-hand end of track section 15T causes the associated track relay 15WT of FIG. 1E to be operated at this same code rate, and, the resulting opening and closing of front contact 96 of the track relay 15WT causes the left-hand end of the next track section 16T to also receive a 180 code rate. Furthermore, the intermittent operation of track relay 15WT, at the received 180 code rates, causes its front repeater relay 15WTFP to be energized over a circuit including front contact 97 of the track relay 15WT.

As pointed out previously, the circuitry illustrated in FIGS. 1A through 1H of the accompanying drawings would also be provided for that stretch of single track and siding end assumed to be located to the east or right of track section 16T (see arrangement diagram of FIG. 4B and track diagram of FIG. 4BB). Thus, the right-hand end of track section 16T (not shown in detail) would be equipped with a code responsive track relay corresponding to relay 16ET in FIG. 1E which, when receiving this 180 code rate applied to the west or left-hand end of track section 16T, would cause this same 180 code rate to be repeated into the next track section to the east. Similarly, each of the remaining track sections on the stretch of single track located between spaced passing siding ends on the single track railroad layout would also be provided with a 180 code rate transmitted in an eastbound direction through it as is shown in FIG. 5A.

Therefore, the home relay corresponding to relay 12EH of FIG. 1C, but provided at the next control location to the east; i.e. at the right-hand end of the stretch of single track partially shown in FIGS. 1A through 1H (for example, at passing siding "B" of FIG. 4BB) becomes picked up to register that track coding is being received from the west or left-hand end of the stretch of single track (end of passing siding "A" in FIG. 4BB). In addition to the track repeater relay at the east end of the single track stretch, corresponding to repeater relay 12ETEP in FIG. 1D, would also be picked up to register that the associated track relay is receiving the 180 code rate. This picking up of the home and track repeater relays at the right-hand end of the single track stretch prevents any westbound track coding on the single track stretch, in substantially the same manner as would the opening of back contacts 73 and 67 of relays 12EH and 12ETEP respectively, in FIGS. 1C and 1D respectively, prevent eastbound track coding upon reception of westbound track coding at the west or left-hand end of track section 12T.

With reference to FIG. 1C, the detector track circuit surrounding track switch SW11 is also provided with means for communicating train control codes to railway vehicles while traversing detector track section 11T. More specifically, loop LB extends the length of the main track portion of the detector track circuit 11T and is utilized, as will be described, to provide continuous communication of the train control codes to all trains traversing track switch SW11 in its normal position; whereas, loop LA extends throughout the portion of siding track stretch included in the detector track section 11T and similarly serves to communicate train control codes to all vehicles travelling over track switch SW11 in its reversed position.

The loop LB is supplied with the train control coding by relay LBCP; whereas, the relay LACP serves to supply the train control coding to the siding loop LA. With reference to FIG. 1C, the energization of relay LBCP is more particularly controlled by stick relays LBWGS and LBEGS which are normally dropped away (as illustrated) and which become selectively energized for west and eastbound traffic respectively, over track switch SW11 in its normal position, whenever the corresponding code control relays 11WG and 11EG respectively are picked up. Similarly, the stick relays LAWGS and LAEGS associated with the loop circuit LA become energized, when the corresponding code control relays 11AWG and 11AEG become picked up, to apply a proceed control to loop LA for west or eastbound traffic respectively, when the vehicle is to travel over the track switch SW11 in its reversed position. These relays LAEGS, LAWGS, LBWGS and LBEGS are furthermore each provided with a stick circuit to insure that the train continually receives its control message from either loop LA or loop LB as long as the head end of the vehicle is travelling over the detector track circuit; i.e. the circuits for these relays include a common back contact of the detector track relay 11TR.

With reference to FIGS. 1B and 1A, the typical portion of the main track stretch extending between the ends of the partially illustrated passing siding is furthermore divided into track sections 8T through 10T; whereas, the corresponding typical siding track stretch is divided into track sections 8AT through 10AT. Each of these track sections is provided with track coding apparatus, similar to that previously discussed for the single track stretch between spaced passing sidings, effective to selectively apply various code rates to the associated track sections indicative of the desired automated train speed over the track sections. This track coding apparatus will be discussed in more detail hereinafter, when describing how the illustrated circuitry automatically sets up and controls the automated train traffic on a single track railroad layout.

1. Operation of the apparatus shown in FIGS. 1A through 1H

As previously mentioned, the apparatus shown in FIGS. 1A through 1H of the accompanying drawings is typical for a portion of a single track railroad, assumed as being controlled in accordance with the present invention, and therefore, only the detailed circuit apparatus for this portion will be discussed at length, with the overall system operation being considered by making use of the train movement diagrams of FIGS. 5A through 5M (except that FIG. 5I has been omitted). It has also been previously pointed out that the circuitry shown in FIGS. 1A through 1H would be arranged, as shown in arrangement diagrams FIGS. 4A and 4B, in order to provide the complete wayside circuitry for an entire single track railroad layout formed by a stretch of single track with one or more passing sidings spaced therealong (see track diagrams FIGS. 4AA and 4BB).

Assuming first that no railway vehicles are either occupying the partial track layout shown in FIGS. 1A through 1H or approaching this siding end (see FIG. 5A), the polar relay 16EPT in FIG. 1E (equipped with single armature operated by positive polar pulse) would then be receiving such (+) code pulses at the west or left-hand end of the line wires 12 and 13, over back contacts 98 and 99 of polar code repeater relay 16EPCP. In accordance with the resultant intermittent opening and closing of contact 100 of relay 16EPT, the polar code repeater relay 15WPCP would be energized, at its positive or (P) winding, each time the polar relay 16EPT closes its front contact 100, over a circuit including this contact 100 and back contact 101 of polar relay 15WPT (located at the east end of line wires 10 and 11). At the same time, the front repeater relay 16EPTFP would be retained in its picked up position, as long as relay 16EPT were receiving polar code pulses, by the obvious circuit including front contact 102 of the relay 16EPT.

In accordance with the intermittent energization of the positive (P) winding of relay 15WPCP, the right or east end of the line wires 10 and 11 are supplied with positive (+) polar code pulses in accordance with the intermittent opening and closing of front contacts 103 and 104 of code repeater relay 15WPCP. With reference to FIG. 1D, the reception of these (+) polar code pulses at the west end of line wires 10 and 11 causes polar relay 11EPT to intermittently operate its positive (P) contacts 43 and 44 (in FIG. 1H) and thereby cause energization of the distant relay 11ED, as previously described. With the distant relay 11ED thus normally picked up, the approach relay 11EA is also normally energized over front contact 45 of distant relay 11ED. As will be discussed, the relay 11EA in its picked up position (as shown), registers that no westbound train is occupying the east approach to the track switch SW11.

In order to describe typical operation of the circuits shown in FIGS. 1A through 1H, it will now be assumed that a westbound train is situated on the stretch of single track partially shown in FIGS. 1A through 1H, and, that this westbound train has more particularly, just entered at the east end of track section 16T in FIG. 1E, so that it is currently receiving a 180 code rate which causes the automated train to be operating at its nominal high speed which might be, for example, thirty miles per hour in accordance with the energization of the HIGH SPEED control wire shown in FIG. 2, by a circuit including front contact 105 of decoding relay 37R which is closed as long as a code rate equal to or greater than thirty-seven and one-half pulses per minute is being received on the automated vehicle, back contact 106 of decoding relay 75R which only becomes picked up when a 75 code rate is received on the vehicle, back contact 107 of decoding relay 120R, and front contact 108 of decoding relay 180R which is now closed since the receiver coils on the automated vehicle are now receiving a 180 code rate from the rails of track section 16T in FIG. 1E.

As will be pointed out in more detail hereinafter, when this westbound train first cleared its own route into the single track stretch upon which it is now situated (see FIG. 5B), it terminated the westbound (+) polar code pulse transmission in the line wires extending along the stretch of single track between the siding end shown in FIG. 1C (east end of siding "A" in FIG. 5B for example) and the west or left-hand end of the passing siding (west end of passing siding "B" in FIG. 5B for example) assumed to be located to the east of the passing partially shown in FIGS. 1A through 1H, i.e. the polar relays 16EPT and 11EPT in FIGS. 1E and 1D respectively no longer receive (+) polar code pulses.

In accordance with the termination of the (+) polar pulse reception at relay 16EPT, this relay opens its front contact 102 and thereby causes drop away of its front repeater relay 16EPTFP. Therefore, as long as this westbound train is located to the right or east of the track section 15T, the relay 15WNPCP is picked up by a circuit including front contact 109 of track repeater relay 15WTFP, front contact 110 of relay 15WPT which is still receiving (+) polar code pulses from the west or left-hand end of the line wires 10 and 11, back contact 111 of relay 16EPTFP, and to (−). In accordance with the picking up of relay 15WNPCP, the negative (N) winding of relay 15WPCP becomes energized, to transmit a negative (−) polar code pulse in a westbound direction through line wires 10 and 11, each time that the relay 15WPT closes its back contact 110 at the end of each eastbound (+) polar code pulse being transmitted on line wires 10 and 11. More specifically, the circuit by which the negative (N) winding of relay 15WPCP becomes energized includes front contact 109 of relay 15WTFP, back contact 110 of relay 16WPT, back contact 112 of relay 16EPTFP, and front contact 113 of relay 15WNPCP.

Therefore, while this westbound train is situated on the stretch of single track to the east of track section 15T, the east or right-hand end of the line wires 10 and 11 is supplied with negative (−) polar code pulses in accordance with the operation of the negative (N) contacts 114 and 115 of polar code repeater relay 15WPCP, at a rate determined by the rate at which the relay 15WPT is receiving (+) polar code pulses from the left or west end of the line wires 10 and 11.

With reference to FIG. 1D, the reception of these negative polar code pulses at relay 11EPT causes this relay to intermittently operate its negative (N) contacts, and therefore, even though the distant relay 11ED is now dropped away (since the relay 11EPT is no longer receiving positive polar code pulses), the approach relay 11EA in FIG. 1H is retained in its picked up position in accordance with the intermittent operation of the negative contact 46 of the polar relay 11EPT. Obviously, this approach relay 11EA is made somewhat slow releasing so that it can be maintained in its picked up position while the polar relay 11EPT is intermittently operating its negative front contact 46.

Figure 5B:
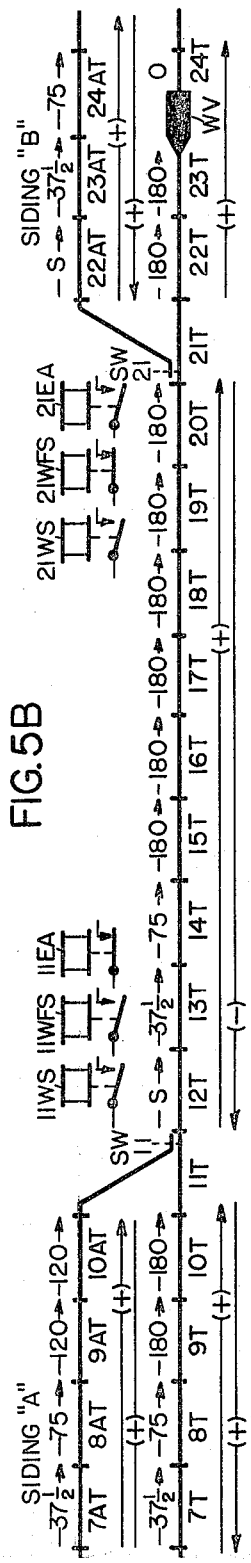
Figure 5C:
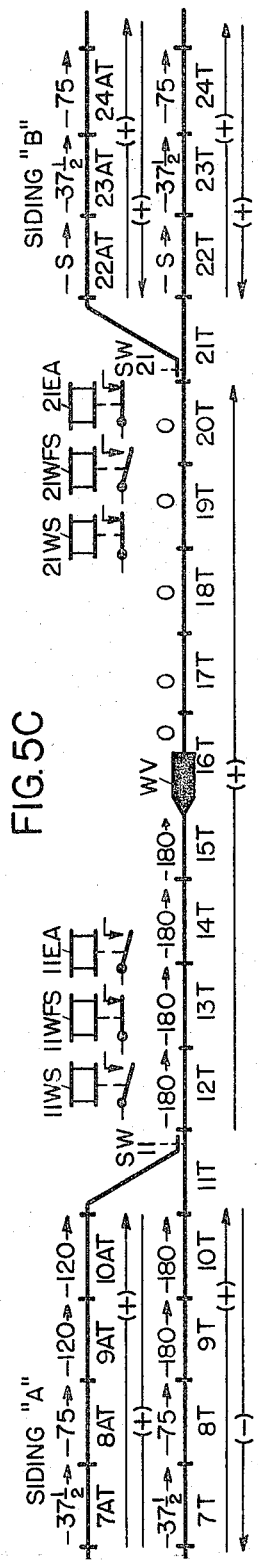

Subsequently, when the westbound train enters at the right-hand end of track section 15T (as shown in FIG. 5C), the relays 15WT and 15WTFP in FIG. 1E are both dropped away, since the railway vehicle shunts out the track coding, and thus, the relay 15WNPCP is now steadily dropped away to terminate the transmission of the negative (−) polar code pulses in a westbound direction along line wires 10 and 11 to the polar relay 11EPT in FIG. 1D. Therefore, the approach relay 11EA of FIG. 1H now becomes dropped away to register the presence of the westbound vehicle at the east approach to the passing siding end shown in FIGS. 1A through 1H.

In accordance with the dropping away of approach relay 11EA, the westbound traffic stick relay 11WFS in FIG. 1F is now picked up by a circuit including the negative (N) back contact 16 of polar relay 11WPT in FIG. 1G, positive (P) front contact 17 of this same polar relay (which checks that (+) polar code pulses are being received from the west end of the traffic control line circuit including wires 14 and 15 in FIGS. 1F, 1B, and 1A), along wire 116 between FIGS. 1G and 1F, along wire 117 between FIGS. 1F and 1G, front contact 118 of distant relay 11WD, front contact 119 of normal switch correspondence relay 11NWC, back contact 120 of reverse correspondence relay 11RWC, wire 121 between FIGS. 1G and 1H, back contact 122 of approach relay 11EA, backcontact 123 of directional stick relay 11ES, front contact 124 of automation relay 11AGZ, and to (—). Once this westbound traffic stick relay 11WFS becomes picked up, it is thereafter retained by a stick circuit including its own front contacts 125, 126 and 127, wires 128 and 129 between FIGS. 1F, 1G and 1H, and back contact 130 of approach relay 11EA, whereby the traffic stick relay remains up as long as the east approach relay 11EA remains dropped away.

With reference to FIG. 1B, the opening of back contact 131 of traffic stick relay 11WFS interrupts the energizing circuit for code repeater relay 10ECP, and thereby prevents any westbound track coding in the track sections forming the main line stretch between the ends of the passing siding partially shown in FIGS. 1A through 1H. Obviously, this would prevent any eastbound train from entering this main line stretch in conflict to the westbound train now on the approach to the normal track switch SW11 in FIG. 1C.

Furthermore, picking up of the westbound traffic stick relay 11WFS closes its front contact 21 in FIG. 1F and thereby completes an energizing circuit to the negative (N) winding of polar code repeater relay 11WPCP in FIG. 1F, extending from (+) in FIG. 1G, through negative (N) and positive (P) back contacts 16 and 17 respectively of relay 11WPT, back contact 18 of pulse length determining relay 11WPL, back contact 19 of directional stick relay 11WS, wire 20 between FIGS. 1G and 1F, front contact 21 of traffic stick relay 11WFS, and to (—). This energization of the negative (N) winding of relay 11WPCP then causes negative (—) polar code pulses to be applied to the right or east end of the line wires 14 and 15 in accordance with the intermittent closure of front contacts 132 and 133 of relay 11WPCP, each time the relay 11WPT in FIG. 1G closes both its positive and negative back contacts 16 and 17 respectively to indicate that the line wires 14 and 15 are clear; i.e. that a so-called "off" time exists between positive (+) polar code pulses currently being transmitted in an eastwardly direction along the line wires 14 and 15 to the relay 11WPT. This negative (—) polar code pulse transmission to the west along line wires 14 and 15 serves to provide an indication to the circuit apparatus at the west or left-hand end of the passing siding partially shown in FIGS. 1A throught 1H (switch location SW5 in FIG. 4AA) that a westbound train has entered the approach to track switch SW11.

With reference to FIG. 1H, the switch lock relay 11L is normally maintained in a picked up position by a circuit extending from (+) in FIG. 1F, through back contacts 134 and 135 of traffic stick relays 11AWFS and 11WFS respectively, along wire 136 between FIGS. 1F and 1G, front contact 137 of detector track relay 11TR, wire 138 between FIGS. 1G and 1H, back contact 139 of directional stick relay 11EFS, front contact 140 of approach stick relay 11EAS, back contact 141 of time element relay 11TE, front contact 142 of approach stick relay 11WAS, and to (—). Thus, when the traffic stick relay 11WFS becomes picked up, as just described, to register that the westbound vehicle is on the approach to track switch SW11, it (relay 11WFS) opens it back contact 135 and thereby causes drop away of the slow releasing switch lock relay 11L in FIG. 1H, so that the track switch SW11 is now locked in its normal or straight line position for routing this westbound train onto the main line stretch at the passing siding partially illustrated in FIGS. 1A through 1H.

With reference to the accompanying drawings, it should be noted that the track switch SW11 was assumed as already being in its normal position (as illustrated), as called for by the normally closed front contacts 48 and 49 of switch control relay 11NWZ in FIG. 1H. Therefore, no further operation of this track switch SW11 was necessary to route the assumed westbound train onto the main track stretch including track sections 10T, 9T and 8T. However, if this switch SW11 has been in its reverse position (relay 11RWZ picked up), the entrance of the westbound train onto the east approach for this switch (relay 11EA dropped away) would have caused picking up of the relay 11NWZ over a circuit including back contacts 143, 144 and 145 of relays 11ED, 11ES and 11EA respectively, wire 146 between FIGS. 1H and 1G, front contact 147 of relay 11WD, wire 148 between FIGS. 1G and 1H, and front contact 149 of lock relay 11L, and, thereby called for the normal or straight line position of track switch SW11. Subsequently, when the lock relay 11L is dropped away, as previously described, the switch SW11 would be locked in this normal position.

Furthermore, with lock relay 11L now dropped away, the code control relay 11WG of FIG. 1G is picked up to change the code applied to the left-hand end of track section 12T from a STEADY code rate to a 180 proceed code rate which permits the automated vehicle approaching the track switch SW11 to continue at its nominal high speed over the switch. More particularly, the circuit by which code control relay 11WG is now picked up extends from (+) in FIG. 1H, through back contact 150 of lock relay 11L, front contact 151 of relay 11EAS, wire 152 between FIGS. 1H and 1G, front contact 153 of detector track relay 11TR, back contact 154 of correspondence relay 11RWC, front contact 155 of correspondence relay 11NWC, along the wire 156 between FIGS. 1G and 1F, front contact 157 of traffic stick relay 11WFS, front contact 158 of home relay 10WH (which checks that track coding is being received from the west along the main line track stretch), along wire 159 between FIGS. 1F and 1G, and to (—).

The resultant picking up of code control relay 11WG thus causes the code repeater relay 12WCP of FIG. 1D to be energized at a 180 code rate by a circuit including the energized wire 69 in FIGS. 1C and 1D, front contact 160 of code transmitter 180CT in FIG. 1C, front contact 70 of code control relay 11WG, back contact 71 of code control relay 11AWG, front contact 72 of track relay 11TR, back contact 73 of home relay 12EH, and along wire 74 between FIGS. 1C and 1D.

In accordance with this 180 code rate energization of code repeater relay 12WCP, the left-hand end of track section 12T is now supplied with a high speed train control code rate which causes the track relay 12WT (connected across the right-hand or east end of the track section 12T) to also be operated at a 180 code rate. As previously mentioned, with the track relay 12WT now being energized at more than a STEADY code rate, the home relay 12WH in FIG. 1D is now picked up and causes code repeater relay 13WCP to also be energized at a 180 code rate by a circuit including the now intermittently closed front contact 161 of track relay 12WT, and front contact 81 of home relay 12WH. The left-hand end of track section 13T is thus also energized at the 180 high speed train control code rate which is then repeated from track section 13T eastwardly towards the train along track sections 14T and 15T, so that the train may now proceed at its nominal high speed over the track switch SW11 in its normal position.

When this westbound train enters at the right-hand end of the detector track circuit 11T, the associated detector track relay 11TR is dropped away to close its back contact 162 in FIG. 1C and thereby completes an energizing circuit for directional stick relay 11WS in FIG. 1C extending along wire 163 between FIGS. 1C and 1B, through front contact 164 of home relay 10WH, along wire 165 between FIGS. 1B and 1C, through front contact 166 of code control relay 11WG, and to (-). Thereafter, the directional stick relay 11WS is provided with a stick circuit including its own front contact 167, and back contacts 162 and 164 of the detector track relay 11TR and home relay 10WH respectively (connected in multiple to wire 163), so that relay 11WS will be maintained in its picked up position as long as the westbound vehicle is occupying the main track stretch between the ends of the passing siding partially shown in FIGS. 1A through 1H; i.e. it will only be dropped after this westbound train has passed the west or left-hand end of the siding and returned the track coding apparatus to its illustrated condition (as will be discussed), so as to cause home relay 10WH in FIG. 1B to again open its back contact 164. As previously mentioned, this directional stick relay 11WS registers that a westbound train has entered at the right-hand end of the detector track section 11T and is utilizing the main track stretch extending between the ends of the passing siding partially shown in FIGS. 1A through 1H. Accordingly, this picking up of the directional stick relay 11WS opens its back contact 168 in the energizing circuit for track coding repeater relay 10ECP of FIG. 1B and thereby insures that an eastbound train cannot enter this main track stretch.

Furthermore, the picking up of directional stick relay 11WS opens its back contact 19 in FIG. 1G and thereby terminates the transmission of negative (—) polar code pulses in a westbound direction along the line circuit including wires 14 and 15 in FIG. 1F, and thus, causes an approach indication to be registered at the west end (e.g. switch location SW5 in FIG. 5E) of the illustrated passing siding; i.e. the approach relay would drop away, so that appropriate action may be taken at this siding end to permit the westbound train to proceed throughout the track layout, as will be described hereinafter. In addition, the opening of back contact 169 of directional stick relay 11WS opens the energizing circuit of the traffic stick relay 11EFS in FIG. 1H, to be described, so as to prevent clearing an opposing eastbound route when the westbound train is receding through the detector track section 11T in FIG. 1C.

With reference to FIGS. 1G and 1H of the accompanying drawings, the approach stick relay 11KAS is dropped away as the relay 11WG is picked up to cause a proceed control code to be transmitted to the automated vehicle approaching from the east in FIG. 1E; i.e., when the relay 11WG is picked up it opens its back contact 42 and thereby causes release of the approach stick relay 11WAS. As mentioned previously, this approach stick relay is provided, along with time element relay 11TE in FIG. 1H, to prevent improper operation of the track switch SW11 ahead of a westbound train which is approaching the switch after having received a proceed command and may not have sufficient time in which to come to a complete stop if the proceed command were then terminated, for example, by manual operation of the system. Thus, once the relay 11WAS becomes dropped away, the relay 11TE is energized and requires a predetermined time interval before it can be picked up to allow reenergization of the approach stick relay 11WAS as is necessary to pickup the lock relay 11L and permit operation of the switch control relays 11RWZ and 11NWZ of FIG. 1H. More specifically, front contact 142 of relay 11WAS must be closed before the lock relay 11L can be energized to close the pick up circuits to the switch control relays 11RWZ and 11NWZ.

Thus, if the code control relay 11WG is returned to its deenergized position, after once being picked up, the relay 11TE must be picked up before relay 11WAS can be returned to its normal picked up position. More specifically, the circuit by which the time element relay 11TE becomes energized includes back contacts 42 and 41 of relays 11WG and 11AWG respectively, front contact 170 of detector track relay 11TR, wire 171 between FIGS. 1G and 1H, back contact 172 of approach stick relay 11WAS, and to (—). After the time element relay 11TE is picked up, the approach stick relay 11WAS can then be reenergized (to permit changing the switch position), by a circuit including front contact 173 of the time element relay 11TE.

Similarly, the approach stick relay 11EAS of FIG. 1H also requires that the time element relay 11TE must be picked up before the relay 11EAS can be returned to its normal picked up position, after once being dropped away, in order to prevent changing the position of track switch SW11 in front of an eastbound train approaching track switch SW11 from either the main or siding track stretches.

Returning to the westbound train now travelling over the normal track switch SW11, when code control relay 11WG is picked up to communicate a proceed command to the vehicle, as previously described, the relay LBWGS (see FIG. 1C) is also picked up to cause code application to the loop circuit LB, by a circuit extending through front contact 174 of control relay 11WG, wire 175 between FIGS. 1C and 1B, front contact 176 of home relay 10WH, and along the wire 177 between FIGS. 1B and 1C. This picking up of relay LBWGS closes its front contact 178 and thus connects the code repeater relay LBCP to the front contact 179 of code transmitter 180CT, whereby the loop LB is selectively energized at a 180 code rate by the intermittent opening and closing of the front contact 180 of code repeater relay LBCP.

In order to maintain this coding on the loop LB after the code control relay 11WG has dropped away (due to the opening of front contact 153 of detector track relay 11TR in FIG. 1G), the relay LBWGS is thereafter maintained by a stick circuit including back contact 181 of detector track relay 11TR and its own front contact 182. Thus, the loop circuit LB is supplied with the 180 code rate until such time as the relay LBWGS is dropped away due to the opening of front contact 176 of relay 10WH when the westbound train enters the main line track stretch to the left of detector track section 11T (see FIG. 5D), at which time no track coding would be detected by track relay 10WT in FIG. 1B.

As previously pointed out, when the directional stick relay 11WS is picked up to open its back contact 19 in FIG. 1G, the negative (—) polar code pulse transmission to the west in line wires 14 and 15 (see FIG. 1F) is terminated to provide indication to the west or left-hand end of this passing siding that a westbound railway vehicle has cleared a westbound route along the main line track stretch for this passing siding. Although the circuit apparatus has not been shown in detail for the west or left-hand end of the passing siding shown partially in FIGS. 1A through 1H, the effect of this termination of the (—) polar code pulse transmission to the west via line wires 14 and 15, can be readily understood by referring to train movement diagram FIG. 5B which illustrates just what happens at the west or left-hand end of the typical passing siding "B" when a westbound railway vehicle is occupying the main line track stretch adjacent this passing siding "B." More particularly, it will be noted that the presence of the illustrated westbound vehicle WV on the main line track stretch at passing siding "B" causes the approach relay 21EA to be dropped away and the westbound traffic stick relay 21WFS to be picked up which terminates the westbound (+) polar code pulse transmission in the line circuit extending along the stretch of single track between passing siding "B" and passing siding "A," and thereby initiates the transmission of the negative (—) polar code pulses in that portion of the single track line circuit corresponding to the line wires 10 and 11 in FIGS. 1E and 1D, as previously described, to give indication to the east or right-hand end of the passing siding "A" that the westbound vehicle has called for use of the single track stretch between the passing sidings. The particular manner in which this negative (—) polar code pulse transmission is initiated towards the east or right-hand end of a typical passing siding has already been set forth (see FIG. 1E).

Having thus described the typical circuit operation of the apparatus shown in FIGS. 1A through 1H for a westbound train movement over the track switch SW11 in its normal position, a further operational discussion will now be set forth for a typical eastbound train move- ment over the partial track layout shown in FIGS. 1A through 1H, also making use of the train movement diagrams 5E through 5H which diagrammatically illustrates an entire passing siding "A" which is of course assumed here to be equipped at each of its ends with apparatus substantially the same as that shown for a typical east or right-hand end of a passing siding by the drawings FIGS. 1A through 1H.

As previously pointed out, when discussing the movement of a westbound train entered at the east approach to the siding end shown in FIG. 1C, the east approach relay 11EA of FIG. 1H was dropped away and caused subsequent pick up of the westbound traffic stick relay 11WFS of FIG. 1F, and, this picking up of relay 11WFS opened its back contact 131 in FIG. 1B and thereby prevented energization of the code repeater relay 10ECP (so that no westbound track coding could take place in the main line stretch of this passing siding). In a similar manner, when an eastbound train EV enters the west approach to the track switch SW5 at the west end of the passing siding "A" shown in FIG. 5F, it would terminate the negative (−) polar code pulsing toward this switch location (see FIG. 5E) and correspondingly drop away the west approach relay 5WA to subsequently cause pick up of the east traffic stick relay 5EFS for this west or left-hand end of the passing siding "A." With the relay 5EFS now picked up, it would accordingly terminate any track coding in eastwardly direction through the main track stretch of the illustrated passing siding "A"; whereas, the siding track stretch for this passing siding would still remain in its normal track coding condition wherein these track codes would be transmitted through the rails of track sections 6AT through 10AT in the eastbound direction as shown in FIGS. 5E and 5F.

With reference to FIG. 1B, in accordance with this termination of the eastbound track coding along the main line stretch of the passing siding, the home relay 10WH associated with the east or right-hand end of the track section 10T, along with the track repeater relay 10WTFP, would both be dropped away and thereby complete an energizing circuit for the code repeater relay 10ECP in FIG. 1B extending from (+) in FIG. 1D, through front contact 183 of relay 11WAS, wire 184 between FIGS. 1D and 1C, front contact 185 of detector track relay 11TR, back contact 186 of code control relay 11EG, back contact 168 of directional stick relay 11WS, wire 187 between FIGS. 1C and 1B, back contact 131 of traffic stick relay 11WFS, back contact 188 and 189 of relays 10WTFP and 10WH respectively, and to (−).

The code repeater relay 10ECP would thus be steadily energized to close its front contact 190 and thereby apply a STEADY code rate to the right-hand end of the track section 10T. When this STEADY code rate is detected at the left-hand end of track section 10T by the steady picking up of track relay 10ET, its repeater relay 10ETP would be steadily energized over front contact 191 of track relay 10ET and would thereby complete a 37½ code rate energizing circuit to the code repeater relay 9ECP, extending over front contact 192 of code transmitter 37½CT, front contact 193 of repeater relay 10ETFP, and back contact 194 of home relay 10EH which is now dropped away since the track relay 10ET must be receiving a code rate other than STEADY before this home relay can be picked up.

In accordance with this 37½ code rate energization of relay 9ECP, the right-hand end of the track section 9T (shown in FIGS. 1B and 1A) would be supplied with a 37½ code rate which, when received at the left-hand end of track section 9T by track relay 9ET, would cause the home relay 9EH to be picked up and thereby complete a 75 code rate energizing circuit to the code repeater relay 8ECP extending over front contact 195 of code transmitter 75CT, back contact 196 of relay 180D, front contact 197 of home relay 9EH, and to (−). Therefore, the right-hand end of track section 8T would be supplied with a 75 code rate which would then cause a 180 code rate to be supplied to the right-hand ends of the track sections to the west of track section 8T (for example, track sections 7T and 6T in FIG. 5F). For reasons previously considered, when this 180 code rate transmission is detected at the west or left-hand end of passing siding "A" in FIG. 5F, the track coding in the track sections 4T, 3T and 2T would be changed from that coding condition shown in FIG. 5E to a proceed or 180 track coding condition as illustrated in FIG. 5F, so as to permit this eastbound vehicle EV to travel over the track switch SW5 at its nominal high speed.

With reference to FIG. 5F, it will also be noted that with the eastbound vehicle EV occupying the approach to the track switch SW5, approach or negative (−) polar code pulses would be transmitted in an eastbound direction through the line circuit for the main track of the passing siding "A" (the line wires 14 and 15 partially shown in FIGS. 1A, 1B and 1F). As mentioned previously, the reception of these negative (−) polar code pulses by the polar relay 11WPT in FIG. 1G causes this relay to intermittently close its front contact 198, so as to maintain approach relay 11WA in its normal picked up position.

However, as soon as this eastbound vehicle EV passes the detector track section 5T (see FIG. 5G) it would cause pick up of the directional stick relay 5ES, at the west or left-hand end of the passing siding "A," and would thereby terminate this negative (−) polar code pulse transmission to the east end of the passing siding, along the line wires 14 and 15. Consequently, the approach relay 11WA in FIG. 1G would then be dropped away to complete an energizing circuit for the east traffic stick relay 11TFS at this east end of the passing siding "A." More particularly, the east traffic stick relay 11EFS would be picked up over a circuit illustrated in FIGS. 1A through 1H and extending from (+) in FIG. 1D, through the negative (N) back contact 199 of relay 11EPT, positive (P) front contact 200 of this same relay (which checks that no westbound traffic has been called for on the stretch of single track to the east of siding "A"), wire 201 between FIGS. 1D and 1H, front contact 202 of distant relay 11ED, wire 203 between FIGS. 1H and 1G, front contact 204 of correspondence relay 11NWC, back contact 205 of approach relay 11WA, back contact 169 of directional stick relay 11WS, wire 206 between FIGS. 1G and 1H, front contact 207 of programming relay PR1, front contact 208 of automation relay 11AGZ, and to (−). Once this relay 11EFS becomes picked up, it is thereafter maintained by a stick circuit including its own front contacts 209, 210 and 211, wires 212 and 213 extending between FIGS. 1G and 1H, front contact 214 of correspondence relay 11NWC, and back contact 215 of approach relay 11WA.

In accordance with this picking up of the eastbound traffic stick relay 11EFS (see also FIG. 5G), the east or right-hand end of the illustrated passing siding thus registers that an eastbound train has requested use of the single track stretch to the right of the passing siding, and, if traffic conditions are proper for this eastbound train movement, the code control relay 11EG in FIG. 1G will now be picked up to cause a proceed control code rate to be transmitted to the approaching eastbound train via the track rail of the main track stretch for the passing siding.

More specifically, the energizing circuit for code control relay 11EG extends from (+) in FIG. 1H and includes front contact 216 of traffic stick relay 11EFS, front contact 217 of approach stick relay 11WAS, back contact 218 of lock relay 11L, wire 219 between FIGS. 1H and 1G, front contact 220 of home relay 12EH, front contact 221 of detector track relay 11TR, back contact 222 of relay 11RWC, front contact 223 of relay 11NWC, and to (−). However, before home relay 12EH can be picked up, the track relay 12ET in FIG. 1D connected to the left-hand end of the track section 12T must be receiving a code rate transmitted from the right-hand end of the track section so as to intermittently operate its contact 224.

As previously pointed out, during the normal illustrated track coding conditions, each of the track sections of the stretch of single track to the right of the illustrated passing siding end have track code information transmitted through them in an eastbound direction; i.e., the track coding is applied to the left-hand end of the track sections and it is received at the right hand ends of the sections. Accordingly, in order to cause relay 12EH to be picked up, the track coding in the stretch of single track to the east of the illustrated passing siding end of FIG. 1C must be reversed; i.e., the track coding must be shifted to a westbound track coding condition so that the left-hand end of track section 12T will receive a track code rate effective to cause track relay 12ET to provide pick up of the home relay 12EH in FIG. 1C. Therefore, the code repeater relay 12WCP in FIG. 1D must be now dropped away to terminate the eastbound track coding in the stretch of single track so that the track coding apparatus at the opposite or east end of this single track stretch may initiate the required westbound track coding.

More specifically, the deenergization of this code repeater relay 12WCP in FIG. 1D is accomplished by the opening of back contact 66 of the eastbound traffic stick relay 11EFS (see FIG. 1D), when this eastbound traffic stick relay is picked up to register that an eastbound vehicle desires to operate over the stretch of single track, as previously described. With the code repeater relay 12WCP now dropped away, the track coding apparatus at the opposite end of the single track stretch (at switch location SW21 in FIG. 5A) would initiate a westbound track code transmission through the rails of the various track sections forming this single track stretch so as to cause pick up of the home relay 12EH in FIG. 1C. The particular code rates supplied to these track sections for the assumed eastbound train movement is illustrated in train movement diagram in FIG. 5G. Thus, the track section 12T is supplied, at its right-hand end, with a 180 code rate transmitted by the track relay 13ET in FIG. 1D which causes the home relay 12EH in FIG. 1C to be picked up to close its front contact 220 (see FIG. 1G) in the pick up circuit for code control relay 11EG, and furthermore, opens its back contact 73 in FIG. 1C to thereby insure that the code repeater relay 12WCP can no longer be energized. In this manner, the illustrated wayside circuits have been conditioned to permit an eastbound train movement onto the stretch of single track partially shown in FIGS. 1A through 1H.

In accordance with the picking up of code control relay 11EG, as just described, this relay closes its front contact 186 in FIG. 1C and thereby inserts front contact 225 of code transmitter 180CT in series with the energizing circuit to the code repeater relay 10ECP associated with the right-hand end of track section 10T. Therefore, this right-hand end of track section 10T is now supplied with a 180 code rate which, after being received at track relay 10ET connected to the left-hand end of this track section, is then repeated to the right-hand end of the track section 9T in accordance with the 180 code rate energization of relay 9ECP by a circuit including front contact 191 of relay 10ET and front contact 194 of home relay 10EH. Similarly, the reception of this 180 code rate at the left-hand end of track section 9T, by track relay 9ET, causes home relay 9EH to be picked up as well as relay 180D, so that code repeater relay 8ECP is now energized at a 180 code rate over a circuit including front contact 197 of home relay 9EH, front contact 196 of relay 180D, and front contact 226 of track relay 9ET which is operating at the received 180 code rate. As previously mentioned, this relay 180D associated with the left-hand end of track section 9T only becomes picked up when the track relay 9ET is operating its contact 227 at a 180 code rate, in accordance with conventional decoding practice. With reference to FIG. 2 of the accompanying drawings, when this 180 code rate is received on the automated vehicle, it causes energization of the HIGH SPEED control wire which commands the vehicle to travel at its nominal high speed over the track switch SW11.

With reference to FIG. 1C of the accompanying drawings, it should furthermore be noted that when code control relay 11EG closes its front contact 228, it thereby completes an energizing circuit to the relay LBGS including front contact 229 of home relay 12EH, whereby the relay LBCP is energized at a 180 code rate over a circuit including front contact 230 of relay LBGS so as to apply a 180 proceed code rate to the wayside loop LB extending along the main line portion of the detector track section 11T. As previously mentioned, this 180 code rate applied to the loop LB provides for communicating the proceed command to the automated vehicle while such vehicle is travelling over detector track section 11T.

For reasons previously discussed, when the traffic stick relay 11EFS is picked up, upon detection of the eastbound vehicle approaching the track switch SW11, the polar code repeater relay 11EPCP in FIG. 1D is deenergized in accordance with the opening of back contact 231 of traffic stick relay 11EFS, to thereby terminate transmission of the (+) polar code pulses in an eastbound direction along the line circuit apparatus for the single track stretch, and, would cause initiation of the negative (—) polar code pulse transmission in that portion of the single stretch line circuit at the approach to the passing siding end assumed to be located at the east or righthand end of the stretch of single track (see FIG. 5G), in substantially the same manner as this negative polar code pulse transmission was initiated in the line circuit including wires 10 and 11 in FIGS. 1D and 1E, as previously mentioned.

Assuming now that the eastbound train has entered the detector track circuit 11T and has thereby dropped away the detector track relay 11TR in FIG. 1C, the eastbound directional stick relay 11ES in FIG. 1H would then be picked up over a circuit including back contact 232 of detector track relay 11TR (see FIG. 1G), front contact 233 of home relay 12EH, front contact 234 of the slow drop away code control relay 11EG, wire 235 between FIGS. 1G and 1H, and to (—). Subsequently, this directional stick relay 11ES is maintained in a picked up position by a stick circuit including its own front contact 236, wire 237 between FIGS. 1H and 1G, and back contacts 232 and 233 of relays 11TR and 12EH respectively, connected in multiple. Therefore, the relay 11ES will remain in its picked up position so as to prevent any traffic change over the illustrated stretch of single track, until the home relay 12EH opens its back contact 233 in FIG. 1G and thereby interrupts the stick circuit for the relay 11ES. It should be understood at this time, that this releasing of the directional stick relay 11ES can thus be only accomplished after the eastbound vehicle has vacated the illustrated stretch of single track and has returned the track coding apparatus for the single track stretch to its now westbound coding condition so as to cause pick up of home relay 12EH.

The picking up of directional stick relay 11ES furthermore prevents any traffic change over the illustrated stretch of single track in that its back contact 238 is included in the energizing circuit for polar code repeater relay 11EPCP in FIG. 1D, and furthermore in that its back contact 123 is included in the energizing circuits for the westbound traffic stick relays 11WFS and 11AWFS in FIG. 1F.

Figure 5D:
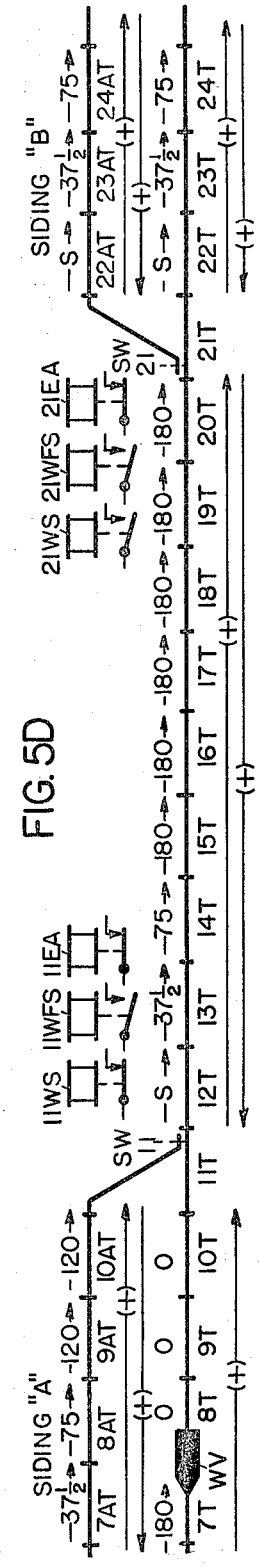
Figure 5E:
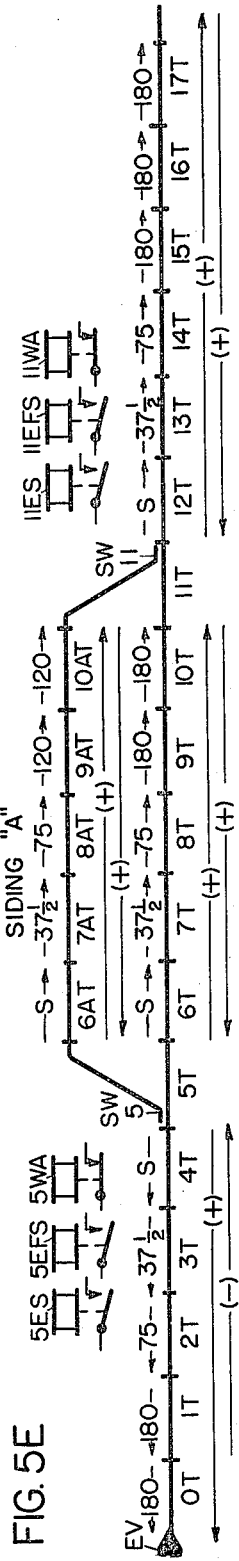
Figure 5F:
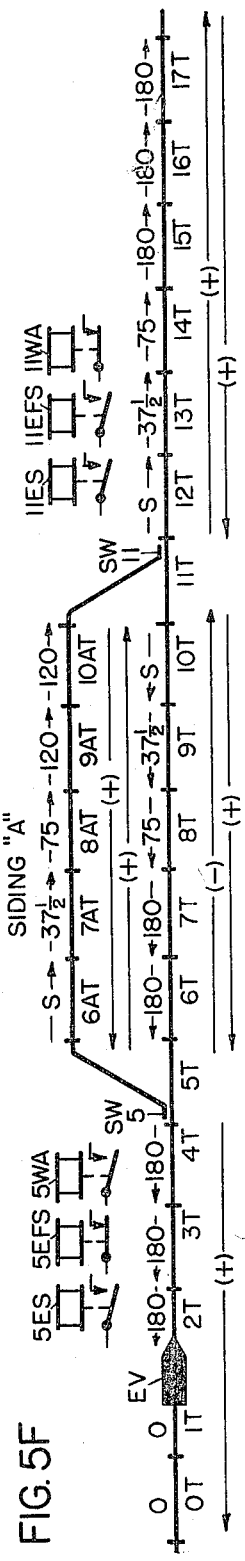
Figure 5G:
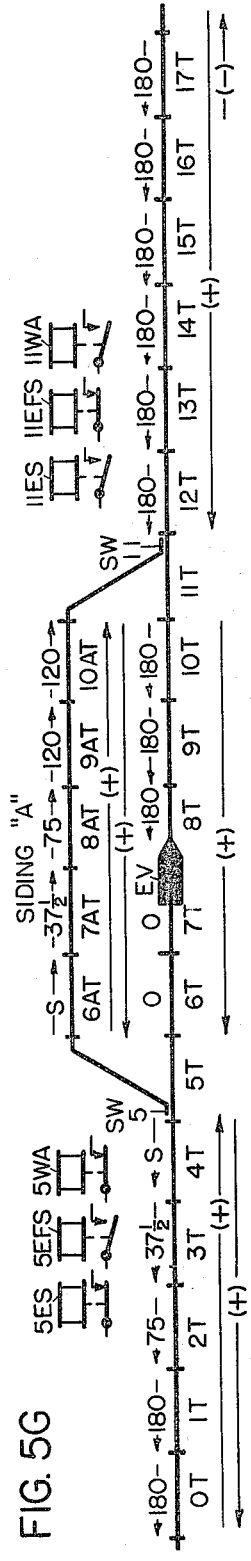
Figure 5H:
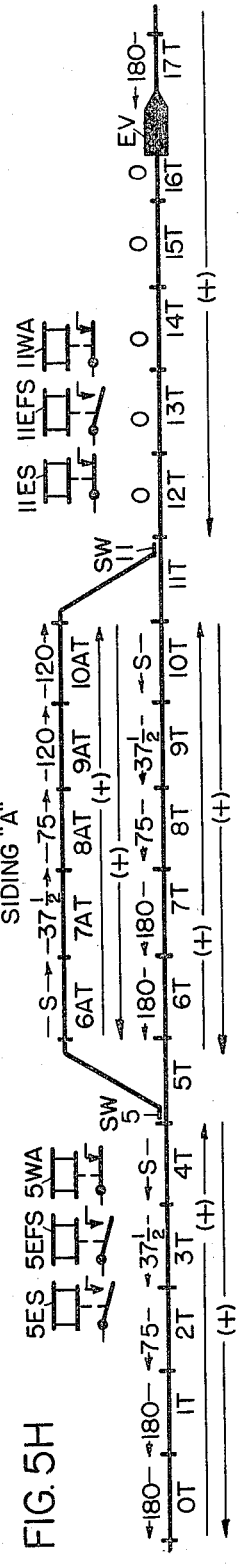

With reference to train movement diagram FIG. 5H, for example, it will thus be noted that the directional stick relay 5ES associated with the west or left-hand end of the illustrated passing siding "A" only becomes dropped away when the track coding on the main line stretch for this passing siding is returned to its eastbound track coding condition wherein a 180 code rate would be received at the left-hand end of track section 6T and thereby cause pick up of the home relay at this end of track section 6T so as to open the stick circuit for the eastbound traffic stick relay 5ES.

Having now considered both east and westbound train movements over the partial track layout shown in FIGS. 1A through 1H, a discussion will now be set forth to illustrate how the illustrated embodiment of the present invention automatically arranges for the meeting of unmanned or automated railway vehicles at a passing siding. In discussing the operation of the illustrated circuit apparatus shown in FIGS. 1A through 1H when arranging automatic meets for the railway vehicles, reference will also be made to the train movement diagrams of FIGS. 5J through 5M.

Referring to FIG. 5J, it will be assumed that an eastbound vehicle EV and a westbound vehicle WV are simultaneously approaching the opposite ends of the illustrated passing siding "A," and, that the eastbound vehicle EV is the first to reach a point on the approach to siding "A" whereby it terminates the (—) polar code pulse transmission towards the west or left-hand end of this passing siding and causes drop away of the approach relay 5WA and pickup of the eastbound traffic stick relay 5EFS for the west end of passing siding "A." Therefore, the track coding on the main line stretch between the ends of passing siding "A" would be as illustrated in FIG. 5J, for permitting this eastbound vehicle EV to operate over the track switch SW5 normal towards the east or right-hand end of the passing siding, and furthermore, the transmission of negative (—) polar code pulses would be initiated in the line circuit apparatus for this main line stretch (line wires 14 and 15 in FIGS. 1A, 1B and 1F).

However, since a westbound vehicle WV is now occupying the stretch of single track to the east of passing siding "A," the distant relay 11ED (see FIG. 1H) would be dropped away as previously described, to thereby open its front contact 202 which prevents pickup of the eastbound traffic stick relay 11EFS for the east or right-hand end of the passing siding "A." Therefore, the front contact 216 of traffic stick relay 11EFS in FIG. 1H cannot be closed and therefore the code control relay 11EG in FIG. 1G cannot be picked up to cause a proceed control code rate to be transmitted to the eastbound vehicle EV, via the track wheels of sections 10T, 9T and 8T, so that these track sections on the main line stretch of passing siding A remain coded as shown in train movement diagram FIG. 5J.

Accordingly, when the eastbound vehicle EV enters track section 8T, it would receive a 75 code rate so that its LOW SPEED control wire shown in FIG. 2 would become energized, over front contact 106 of decoding relay 75R to command this automated eastbound vehicle to reduce its speed to its nominal low speed range. Subsequently, when the eastbound vehicle entered at the left-hand end of track section 9T, the LOW SPEED control wire of FIG. 2 would again become deenergized and the SERVICE BRAKE control wire for the automated vehicle would become energized to call for an automatic service brake application on the unmanned vehicle, in accordance with which the eastbound vehicle EV would come to a stop while occupying the track section 9T. Obviously, if this eastbound vehicle failed to stop properly on track section 9T and entered at the left-hand end of track section 10T, the receiver coils on the automated train would receive a STEADY code rate to thereby drop away the decoding relay 37R and cause energization of the EMERGENCY BRAKE control wire to call for an automatic emergency application of the brakes on the vehicle.

Since the eastbound vehicle EV is occupying the main line stretch of siding "A" (as shown in FIG. 5K), the negative (—) polar code transmission along the line wires 14 and 15 partially shown in FIGS. 1A, 1B and 1F would be terminated to cause drop away of the west approach relay 11WA in FIG. 1G, since front contact 198 of polar relay 11WPT is no longer being intermittently operated. Furthermore, the distance relay 11WD in FIG. 1G would also be dropped away at this time, since the relay 11WPT is not reciving (+) polar code pulses at the east end of the line wires 14 and 15. As pointed out previously, the eastbound transmission of positive (+) polar code pulses in the line wires 14 and 15 would have been previously terminated when the eastbound traffic stick relay 5EFS (see FIG. 1J) is picked up to register that an eastbound vehicle has entered the approach to the west end of the passing siding "A."

With relays 11WA and 11WD thus both dropped away, when the east approach relay 11ES becomes dropped away to register that the westbound vehicle WV has entered at the right-hand end of track section 15T (see FIG. 5K), so as to terminate the westbound negative (—) polar code transmission in the line wires 10 and 11 of FIGS. 1D and 1E, an energizing circuit will then be completed for the reverse switch control relay 11RWZ in FIG. 1H so as to operate the track switch SW11 to its reverse position for routing the westbound vehicle WV into the passing siding track at siding "A" (as shown in FIG. 5L). More specifically, the circuit by which the reverse switch control relay 11RWZ becomes picked up extends from (+) in FIG. 1H, over back contact 143 of distance relay 11ED, back contacts 144 and 145 of relays 11ES and 11EA respectively, wire 146 between FIGS. 1H and 1G, back contact 147 of distance relay 11WD, wire 239 between FIGS. 1G and 1H, front contact 240 of switch lock relay 11L, and to (—). As soon as this relay 11RWZ becomes picked up, it would interrupt the existing stick circuit for relay 11NWZ and thereby complete its own stick circuit extending over its own front contact 46 and back contact 47 of the now dropped away relay 11NWZ. In accordance with this picking up of relay 11RWZ and the subsequent dropping away of relay 11NWZ, the polarity of energization to wires 52 and 53 in FIG. 1H is now reversed to call for operation by switch machine SM11 to move track switch SW11 to its reverse position, in accordance with the pole changing provided by the now closed front contacts 50 and 51 of relay 11RWZ and the now closed back contacts 48 and 49 of relay 11NWZ. As soon as the position of the track switch agrees with the reverse position called for by relay 11RWZ, reverse correspondence relay 11RWC in FIG. 1G would be picked up by a circuit including the (+) and (—) terminals in FIG. 1G, wires 58 and 59 leading to switch machine SM11, wires 60 and 61 between FIGS. 1G and 1H, back contact 63 of relay 11NWZ, and front contact 64 of relay 11RWZ.

With correspondence relay 11RWC now picked up, the westbound traffic stick relay 11AWFS in FIG. 1F becomes picked up to register that a westbound vehicle has called for use of the siding track stretch of passing siding "A" as shown in FIG. 5K, for example. More specifically, the circuit by which this westbound traffic stick relay becomes energized includes the negative (N) back contact 241 of relay 11AWPT, the positive (P) front contact 242 of the same relay, front contact 243 of distance relay 11AWD, wire 244 between FIGS. 1F and 1G, front contact 120 of correspondence relay 11RWC, back contact 119 of relay 11NWC, and along wire 121 between FIGS. 1G and 1H. Once this traffic stick relay 11AWFS becomes picked up, it is thereafter retained with a stick circuit including its own front contacts 245, 246 and 247, wires 248 and 249 between FIGS. 1F, 1G and 1H, and back contact 250 of approach relay 11EA. Furthermore, once this traffic stick relay 11AWFS becomes picked up, it opens its back contact 134 and thereby causes drop away of the switch lock relay 11L as shown in FIG. 1H, whereby the track switch SW11 is now locked in its reversed position.

Code control relay 11AWG in FIG. 1G is now provided with a pick up circuit and subsequently causes a proceed control code transmission to the westbound vehicle WV which permits such vehicle to travel over track switch SW11 in its reverse position onto the passing siding track, for example, as shown in FIG. 5L. More specifically, the code control relay 11AWG is energized at this time over a circuit including back contact 150 of lock relay 11L in FIG. 1H, front contact 151 of approach stick relay 11EAS, wire 152 between FIGS. 1H and 1G, front contact 153 of detector track relay 11TR, back contact 155 of relay 11NWC and front contact 154 of relay 11RWC, wire 251 between FIGS. 1G and 1F, front contact 252 of traffic stick relay 11AWFS, front contact 253 of home relay 10AWH, and along wire 254 between FIGS. 1F and 1G.

Since the westbound vehicle is to travel over track switch SW11 in its reverse position, the proceed command transmitted to this vehicle is in the form of a 120 track code rate which tells the train that it is to proceed at its nominal medium speed, in accordance with the energization of the MEDIUM SPEED control wire of FIG. 2 when front contact 107 of decoding relay 120R is closed (see also FIG. 5L). Thus, when this westbound vehicle is to travel over track switch SW11 in its reverse position, its speed is limited to the medium vehicle speed since it is sometimes advisable to restrict the speed at which the railway vehicles travel over a reversed track switch.

More particularly, in accordance with the picking up of code control relay 11AWG in FIG. 1G, the code repeater relay 12WCP in FIG. 1D is now energized at a 120 code rate in accordance with the closing of front contact 71 of relay 11AWG (see FIG. 1C) which connects front contact 255 of code transmitter 120CT in series in the energizing circuit for the code repeater relay 12WCP. Accordingly, a 120 code rate is applied to the left-hand end of track section 12T, and is subsequently repeated to the east into the track sections 13T and 14T of FIGS. 1D and 1E, whereby the automated westbound vehicle WV would receive the 120 code rate upon entering section 14T, instructing it to proceed over the track switch at its medium speed. Furthermore, the picking up of code control relay 11AWG causes subsequent pick up of relay LAWGS in FIG. 1C by a circuit including front contact 256 of relay 11AWG, wire 257 between FIGS. 1C and 1B, front contact 258 of home relay 10AWH, and wire 259 between FIGS. 1B and 1C. Therefore, the relay LACP is energized at a 120 code rate, over front contacts 260 and 261 of code transmitter 120CT and relay LAWGS respectively, to operate its own front contact 262, and thereby apply the 120 code rate to the wayside loop LA for the purpose of communicating the medium speed control to the westbound vehicle WV while it is occupying the detector track section 11T. Therefore, with reference to FIGS. 5K and 5L of the accompanying drawings, the westbound vehicle WV would proceed into the siding track stretch at passing siding "A," in accordance with the desired train speed being called for by the various track code rates applied to the rails of each of the illustrated sections for this siding track stretch.

While this vehicle is occupying the detector track section 11T, the front contact 23 of detector track relay 11TR is opened (see FIG. 1G) in the previously described energizing circuit to the positive (P) winding of polar code repeater relay 11WPCP in FIG. 1F. However, in order to maintain the westbound (+) polar code pulse transmission, under these conditions, the now closed front contact 262a of relay 11RWC is connected in multiple with the front contact 23 of relay 11TR and front contact 25 of relay 11WAS in FIG. 1H.

When the tail end of this westbound train WV clears the detector track circuit 11T, so as to permit the detector track relay 11TR in FIG. 1C to return to its normal picked up position, the circuitry shown in FIGS. 1A through 1H is now automatically conditioned to permit the waiting eastbound vehicle EV (on track section 9T) to proceed over the track switch SW11 in its normal position; i.e. the switch SW11 is returned to its normal position and a proceed command is subsequently sent to the eastbound train. However, before this eastbound train EV can be permitted to travel over the track switch SW11, the eastbound traffic stick relay 11EFS in FIG. 1H must be picked up, and, referring to the pick up circuit for this traffic stick relay, the polar relay 11EPT at the west end of the line wires 10 and 11 in FIG. 1D must first be receiving (+) polar code pulses so as to operate its front contact 200.

However, since the westbound directional stick relay WS at the west end of the passing siding assumed to be connected to the east end of the illustrated stretch of single track (at switch location SW21 in FIG. 5A, for example) is maintained in its picked up position until track coding is returned to normal in the single track stretch, no westbound positive (+) polar code pulse transmission can occur in the line circuit for the stretch of single track, and therefore, the traffic relay 11EFS in FIG. 1H cannot be picked up.

However, as soon as the westbound vehicle WV clears the detector track section 11T in FIG. 1C, the code repeater relay 12WCP is once again steadily energized to apply a STEADY code rate to the left-hand end of track section 12T, over the previously decribed energizing circuit including back contacts 71 and 70 of code control relays 11AWG and 11WG respectively (the code control relay 11AWG becomes dropped away upon opening of front contact 153 of detector track relay 11TR). With this STEADY code rate now applied to track section 12T in an eastbound direction, the remaining track sections of the stretch of single track shown, for example, in train movement diagram FIG. 5A, are returned to their normal track coding conditions wherein the 180 code rate would be applied to the last track section at the east end of the single track stretch (track section 20T in FIG. 5A). Therefore, the stick circuit for the westbound directional stick relay WS associated with this east end of the single track stretch (for example, relay 21WS in FIG. 5A), would be interrupted and thereby cause drop away of the directional stick relay as shown, for example, in FIG. 5D.

Therefore, the westbound positive (+) polar code pulse transmission would be returned in the line circuit apparatus for this stretch of single track between passing sidings (as is also shown in FIG. 5D), and, when these (+) polar code pulses are received by the polar relay 11EPT in FIG. 1D, the relay would operate its front contact 200 and thereby complete the energizing circuit for the eastbound traffic stick relay 11EFS in FIG. 1H, as previously discussed. In addition, the reception of these positive (+) polar code pulses at polar relay 11EPT would cause relays 11ED and 11EA in FIG. 1H to also be returned to their normal picked up positions (as illustrated).

With the distant relay 11ED now picked up to close its front contact 143, the normal switch operating relay 11NWZ in FIG. 1H is now energized to return the track switch SW11 to its normal position by a circuit including wire 263 between FIGS. 1H and 1G, over back contact 264 of approach relay 11WA (which checks that an eastbound vehicle is waiting to the west of track switch SW11), back contact 265 of directional stick relay 11WS, wire 148 between FIGS. 1G and 1H, and front contact 149 of switch lock relay 11L. As previously mentioned, once the track switch SW11 has been returned to its normal position, the switch correspondence relay 11NWC becomes picked up and relay 11RWC is dropped away.

In the above, it will be noted that the lock relay 11L must be picked up before the switch SW11 can be returned to its normal position, and, it should furthermore be noted, by referring to the pick up circuit for lock relay 11L, that the westbound traffic stick relay 11AWFS must first be dropped away. More specifically, this dropping away of relay 11AWFS is initiated upon return of the approach relay 11EA to its normal picked up position wherein it opens its back contact 250 (see FIG. 1H) and thereby interrupts the existing stick circuit for relay 11AWFS, to permit pickup of switch lock relay 11L. Initially, after eastbound track coding is resumed in the track sections to the east of track switch SW11, as previously discussed, the approach relay 11EA becomes picked up in accordance with the reception, at relay 11EPT in FIG. 1D, of negative (—) polar code pulses (contact 46 in FIG. 1H operates) transmitted to the west along line wires 10 and 11 by polar code repeater relay 11WPCP in FIG. 1E. Subsequently, when distant relay 11ED becomes picked up, as previously described, to register that the westbound directional stick relay WS associated with the east end of the single track stretch has been released, the approach relay 11EA is retained over front contact 45 of relay 11ED. In view of the above discussion, it should be pointed out at this time, that each of the traffic stick relays WFS and EFS employed in the illustrated embodiment of the present invention is assumed to be of the quick-acting type which can be picked up, for example, during the "on" time for a single polar code pulse transmitted through the polar line circuits, and which requires therefore a stick circuit to maintain this relay in its picked up position during the "off" time interval between the polar code pulses.

As soon as the track switch SW11 has been operated to its normal position, so that correspondence relay 11NWC in FIG. 1G is returned to its picked up position, the eastbound traffic relay 11EFS in FIG. 1H can now be energized over the previously described pick up circuit including negative (N) back contact 199 of polar relay 11EPT, positive (P) front contact 200 of this same relay, wire 201 between FIGS. 1D and 1H, front contact 202 of distant relay 11ED, wire 203 between FIGS. 1H and 1G, front contact 204 of correspondence relay 11NWC, back contact 205 of approach relay 11WA, back contact 169 of directional stick relay 11WS, wire 206 between FIGS. 1G and 1H, front contact 207 of programming relay PR1, and front contact 208 of automation relay 11AGZ.

With the eastbound traffic stick relay 11EFS now in its picked up position, code control relay 11EG in FIG. 1G is now energized by a circuit including front contact 216 of relay 11EFS (see FIG. 1H), and causes a 180 code rate to be applied to the right-hand end of track section 10T in FIG. 1B, which is repeated into track section 9T and thereby communicates to the eastbound train EV that it is now permissible to operate over the track switch SW11. The manner in which this 180 proceed code rate is applied to the track rails of section 10T and 9T, as well as to the wayside loop LB in FIG. 1C, has already been described in detail. With reference to FIG. 2 of the accompanying drawings, the reception of this 180 code rate aboard the unmanned eastbound vehicle EV causes energization of the HIGH SPEED control wire which commands the vehicle to operate it at its nominal high speed in an eastbound direction over the track switch SW11 and onto the stretch of single track to the east of the passing siding "A" (see FIG. 5M).

In substantially the same manner as that just described, the circuitry associated with the west or left-hand end of the passing siding "A" would automatically operate track switch SW5 to its reverse position and communicate a proceed command to the westbound vehicle WV permitting this vehicle to exit from the siding track stretch at passing siding "A" and onto the single track stretch to the west of siding "A" (see FIG. 5M).

Since the west or left-hand end of the passing siding "A" shown in the train movement diagrams FIGS. 5J through 5M is equipped with circuit apparatus substantially the same as that illustrated for the east or right-hand end of the siding (by the circuit diagrams of FIGS. 1A through 1H), the manner in which track switch SW5 is operated to its reverse position to permit the westbound vehicle WV to exit from the passing siding track stretch can be readily understood by discussing the operation of the circuit apparatus shown in FIGS. 1A through 1H, assuming that a westbound vehicle is occupying the main track stretch to the west of track switch SW11, and, that an eastbound train is on the passing siding track stretch partially shown in FIGS. 1A and 1H.

With reference to train movement diagram FIG. 5D, for example, the passage of the westbound vehicle at switch location SW11 would cause the westbound directional stick relay 11WS (see FIG. 1C) to be stuck in its picked up position. Subsequently, when the polar line circuit for the stretch of single track to the east of switch location SW11 is returned to its normal polar code pulsing condition wherein positive (+) polar code pulses are transmitted in alternate directions through the line circuit, the relay 11ED in FIG. 1H would be returned to its normal picked up position. Therefore, assuming that lock relay 11L has also been returned to its normal picked up position (as illustrated), the reverse switch control relay 11RWZ in FIG. 1H would be energized to call for operation of track switch SW11 to its reverse position, by a circuit including front contact 143 of distant relay 11ED, wire 263 between FIGS. 1H and 1G, back contact 266 of approach relay 11AWA (which detects that a westbound vehicle is occupying the siding track stretch partially shown in FIGS. 1A through 1H), back contact 267 of direction stick relay 11AWS, front contact 268 of directional stick relay 11WS, wire 239 between FIGS. 1G and 1H, and front contact 240 of lock relay 11L. Therefore, the switch machine SM11 in FIG. 1G would be supplied with the proper polarity of energization over wires 56 and 57 in FIG. 1G for causing operation of the track switch SW11 to its reverse position to permit the eastbound vehicle to exit over the reversed track switch SW11.

With the switch SW11 now in its reversed position (correspondence relay 11RWC picked up), the eastbound traffic stick relay 11EFS in FIG. 1H is provided with a pick up circuit including wire 203 in FIGS. 1H and 1G, front contact 269 of correspondence relay 11RWC, back contact 270 of approach relay 11AWA, back contact 271 of direction stick relay 11AWS, wire 206 between FIGS. 1G and 1H, and front contacts 207 and 208 of relays PR1 and 11AGZ respectively.

With the eastbound traffic stick relay 11EFS in FIG. 1H now picked up, and assuming that the track coding in the stretch of single track to the east of track switch SW11 has been reversed so that the track code rates are now being transmitted in a westerly direction through the rails of the various track sections of this single track stretch (so that home relay 12EH in FIG. 1C would be picked up to close its front contact 220 in FIG. 1G), the code control relay 11AEG would then be energized to cause a proceed command to be communicated to the eastbound vehicle on the passing siding track permitting the vehicle to move to the east over the track switch SW11 in its reversed position. More specifically, the energizing circuit by which the code control relay 11AEG in FIG. 1G would thus be picked up extends from (+) in FIG. 1H and includes front contact 216 of the eastbound traffic stick relay 11EFS, front contact 217 of approach stick relay 11WAS, back contact 218 of lock relay 11L (which checks that the track switch SW11 has been locked in its reversed position), wire 219 between FIGS. 1H and 1G, front contacts 220 and 221 of relays 12EH and 11TR respectively, back contact 223 of correspondence relay 11NWC, and front contact 222 of correspondence relay 11RWC.

In accordance with this picking up of code control relay 11AEG, the right-hand end of the siding track section 10AT in FIG. 1B is thus supplied with a 120 code rate in accordance with the 120 code rate energization of the code repeater relay 10AECP over a circuit extending from (+) in FIG. 1D, through front contact 183 of detector track relay 11TR, front contact 272 of code transmitter 120CT, front contact 273 of code control relay 11AEG, back contact 274 of directional stick relay 11AWS, wire 275 between FIGS. 1C and 1B, back contact 276 of home relay 10AWH, back contact 277 of traffic stick relay 11AWFS, back contact 278 of track repeater relay 10AWTFP, and to (−). Thus, this 120 code rate energization of code repeater relay 10AECP in FIG. 1B causes this relay to operate its front contact 279 at a 120 code rate and thereby apply the 120 code rate to the right-hand end of track section 10AT. In a manner similar to that previously discussed, the reception of this 120 code rate at the left-hand end of track section 10AT, by track relay 10AET, causes the 120 code rate to be repeated into track sections 9AT and 8AT in a westerly direction so as to command the eastbound vehicle waiting on the siding track stretch to proceed at its nominal medium speed over the track switch SW11 in its reversed position.

For reasons previously considered, when the code control relay 11AEG is picked up to cause a proceed control to be communicated to this eastbound vehicle, the relay LAEGS in FIG. 1C would be picked up, to cause the 120 code rate to be applied to the wayside loop LA (for communicating the proceed command to the vehicle while travelling over the detector track section 11T), by a circuit including front contact 280 of relay 11AEG (see FIG. 1C) and front contact 281 of home relay 12EH. With reference to FIG. 2, the reception of this 120 code rate aboard the unmanned railway vehicle waiting on the siding track stretch would cause energization of the MEDIUM SPEED control wire so that the automated railway vehicle would now proceed at its nominal medium speed which might be, for example, fifteen miles per hour.

In view of the foregoing discussions, it will thus be noted that the illustrated embodiment of the present invention not only permits the automated railway vehicles to approach clear their own routes through the single track railroad layout assumed for this illustrated embodiment, but, also provides for the automatic arrangement of meets between these unmanned or automated trains; i.e. the track switches at both ends of a passing siding are properly and automatically operated to completely arrange the automatic meet, and, the vehicle command signals indicative of the desired operation of the automated trains are communicated from the wayside to the vehicles at the proper times so as to cause automatic, yet safe operation of all of the vehicles concerned.

Furthermore, although this illustrated embodiment of FIGS. 1A through 1H has been discussed, assuming unmanned or automated railway vehicles, it should be obvious that the track control system provided by the present invention is equally well adapted to controlling vehicles equipped with conventional cab signalling apparatus. More specifically, the various track code rates employed in this embodiment could be utilized, if desired, to control the cab signalling display aboard any manned vehicles also utilizing the track layout equipped in accordance with the present invention, in manner obvious to persons skilled in the art.

*Operation of the programmer shown in FIG. 1H*

As previously pointed out, the illustrated embodiment of the present invention includes a programmer shown in FIG. 1H whereby the stretch of single track extending between the ends of spaced passing sidings can be made to accept trains either on a first come, first serve basis (as just described), or, on an alternate direction basis; i.e. if one train travels over the stretch of single track in an eastbound direction, the programmer automatically requires that the next train utilizing the single track stretch must be travelling in a westbound direction. Obviously, this sort of programming would lead to the most efficient use of the single track stretch dependent upon the manner in which the railway vehicles were normally presented to the track stretch.

With reference now to FIG. 1H, it has previously been assumed that the program switch PS included in this programmer apparatus is normally in its left-hand or illustrated position wherein it causes pick up of the programming relay PR1 so that the circuit apparatus in FIGS. 1A through 1H normally causes the track layout to provide automatic traffic control for the unmanned railway vehicles on a first come, first serve basis. However, if the program switch PS in FIG. 1H is now moved to its right-hand or dotted position, the circuit apparatus shown in FIGS. 1A through 1H automatically causes the stretch of single track to accept trains on an alternate direction basis. More specifically, with program switch PS in its right-hand or dotted position, it thereby completes an energizing circuit for program change relay PC extending over the switch PS in its right-hand position, the closed contact of program change push button PCPB, wire 282 between FIGS. 1H and 1G, front contact 283 of detector track relay 11TR, and along wire 284 between FIGS. 1G and 1H. In accordance with the resultant picking up of program change relay PC, the lower or knockdown winding of the magnetic stick relay BPC will now be energized by a circuit including front contact 285 of relay PC, and back contact 286 of magnetic stick relay APC.

With relay BPC now dropped away, it open its front contact 287 (see FIG. 1D) in the energizing circuit to the polar code repeater relay 11EPCP at the west end of line wires 10 and 11, and, closes its back contact 288 (see FIG. 1H) in the energizing circuit for the eastbound traffic stick relay 11EFS. Since programming relay PS1 is now also dropped away to open its front contact 289 in FIG. 1D, the opening of front contact 287 of relay BPC thereby interrupts the energizing circuit to polar code repeater relay 11EPCP in FIG. 1D and prevents transmission of positive (+) polar code pulses in an eastbound direction through the polar line circuit associated with the stretch of single track to the east of track switch SW11. For reasons previously mentioned, since no positive (+) polar code pulses can now be received at the switch location located at the east end of the single track stretch (switch location SW21 in FIG. 5A, for example), no westbound railway vehicle would be permitted to utilize the single track stretch; i.e. the westbound traffic stick relay at this end of the single track (relay 21WFS in FIG. 5A) could not be picked up. On the other hand, since the now closed back contact 288 of relay BPC is connected in multiple with the now opened front contact 207 of programming relay PR1, the eastbound traffic stick relay 11EFS for the switch location SW11, can be picked up when an eastbound train is approaching track switch SW11, to permit this eastbound vehicle to utilize the single track stretch. In this manner, the initial operation of program switch PS to its right-hand or dotted position as shown in FIG. 1H automatically conditions the circuitry to accept only an eastbound vehicle for movement over the single track stretch to the east of track switch SW11.

Assuming now that such an eastbound railway vehicle has entered the west approach to track switch SW11 so as to drop the approach relay 11WA in FIG. 1G, the eastbound traffic stick relay 11EFS would then be picked up, as previously described, to initiate the clearing of the eastbound route for this vehicle onto the stretch of single track; i.e. a 180 proceed track code rate would be automatically communicated to the eastbound train permitting it to enter at the west or left-hand end of the single track stretch.

However, as soon as this eastbound vehicle enters at the left-hand end of the detector track section 11T, it causes drop away of the detector track relay 11TR in FIG. 1C and thereby interrupts the energizing circuit for program change relay PC by the opening of its front contact 283 in FIG. 1G. The program change relay PC is therefore dropped away and now completes an energizing circuit for the upper or pick up winding of the magnetic stick relay APC extending over back contact 285 of relay PC and back contact 290 of magnetic stick relay BPC. Therefore, when the eastbound vehicle subsequently leaves the right-hand end of the detector track section 11T and the detector track relay 11TR is returned to its normal picked up position, the resultant picking up of program change relay PC now completes an energizing circuit to the upper or pick up winding of magnetic stick relay BPC extending over front contact 285 of relay PC and the now closed front contact 286 of relay APC. Consequently, the relay BPC becomes picked up to open its back contact 288 (in the energizing circuit for the eastbound traffic stick relay 11EFS), and closes its front contact 287 in the energizing circuit to the polar code repeater relay 11EPCP in FIG. 1D. As a result, when the eastbound vehicle utilizing the stretch of single track subsequently vacates the single track stretch (for example, upon passing switch location SW21 in FIG. 5A), so as to reestablish the westbound track coding in the various track sections of the single track stretch and thereby return the eastbound directional stick relay 11ES in FIG. 1H to its normal dropped away position as previously discussed, the polar code repeater relay 111EPCP in FIG. 1D is then permitted to initiate the transmission of positive (+) polar code pulses in an eastbound direction over the line circuit associated with the single track stretch. Under these conditions, the eastbound traffic stick relay 11EFS is thus prevented from being picked up so that no eastbound train can utilize the single track stretch; whereas, a westbound railway vehicle approaching at the opposite or east end of the single track stretch would be permitted to approach clear a westbound route over the single track stretch. Thus, the circuit apparatus shown in FIGS. 1A through 1H has now been conditioned so as to permit only westbound vehicle traffic over the illustrated stretch of single track.

Assuming now that such a westbound vehicle has utilized the stretch of single track and has entered at the right-hand end of the detector track section 11T, in FIG. 1C, so as to again drop away the detector track relay 11TR, the program change relay PC in FIG. 1H is again dropped away to complete an energizing circuit to the lower or knock-down winding of magnetic stick relay APC over the obvious circuit including back contact 285 of relay PC and front contact 290 of magnetic stick relay BPC. Therefore, when this assumed westbound vehicle subsequently clears the detector track section and returns relay 11TR to its normal picked up position, the resultant picking up of program change relay PC would cause energization of the lower or knock-down winding of magnetic stick relay BPC which would again open the energizing circuit to code repeater relay 11EPCP and thereby prevent subsequent westbound traffic on the single track stretch; whereas, the closure of back contact 288 of relay BPC would again permit the eastbound traffic stick relay 11EFS to be picked up when a subsequent eastbound vehicle enters the west approach to track switch SW11 and calls for eastbound travel over the single track stretch.

It should be noted in FIG. 1H that a program change pushbutton PCPB is provided for manually changing the permitted direction of vehicle travel over the single track stretch to the east of track switch SW11. More specifically, each time this pushbutton PCPB is depressed and subsequently released, the permitted direction of travel would be reversed; i.e. this operation of pushbutton PCPB is equivalent (as far as relay PC is concerned) to the passage of a vehicle over detector track section 11T.

In view of the above discussion, it will thus be readily apparent that a simple programming organization has been provided in accordance with the present invention whereby railway vehicles can be made to operate over the illustrated stretch of single track in alternate directions, while program switch PS is in its right-hand position. On the other hand, if the program switch PS is in its left-hand position (as illustrated), the programming relay PR1 would be picked up to close its front contacts 207 and 289 in FIGS. 1H and 1D respectively, and thereby return the circuit apparatus shown in FIGS. 1A through 1H to that operating condition wherein the stretch of single track automatically accepts the railway vehicles on a first come, first serve basis.

*Train movement diagrams of FIGS. 5A through 5M*

Having thus described the detailed operation of the circuit apparatus shown in FIGS. 1A through 1H for typical east and westbound train movements over the partial track layout shown in FIGS. 1A through 1H, a more generalized discussion of the automatic traffic control system provided in accordance with the present invention will now be considered by making use of the train movement diagrams of FIGS. 5A through 5M (except that FIG. 5I has been omitted).

Referring now to FIG. 5A of the accompanying drawings, a typical portion of a single track railroad layout is illustrated including a stretch of single track extending between the ends of spaced passing sidings "A" and "B." As previously mentioned, in order to provide automatic traffic control for such a portion of a single track railroad as is illustrated in FIG. 5A, the circuit apparatus shown in detail in FIGS. 1A through 1H of the accompanying drawings would be arranged as illustrated in arrangement diagram FIG. 4B.

Therefore, with the track layout of FIG. 5A unoccupied, the various illustrated track sections would be coded as shown in an eastbound direction; whereas, the various line circuits for each portion of the track layout would have positive (+) polar code pulse transmissions through them in alternate directions, as illustrated in FIG. 5A. Accordingly, each of the approach relays (for example, approach relays 11EA and 21EA) at both of the illustrated switch locations SW11 and SW21 would be in their normal picked up position.

Train movement diagram FIG. 5B illustrates the presence of a westbound vehicle WV approaching switch location SW21 so that the east approach relay 21EA is therefore dropped away and the westbound traffic stick relay at this switch location; i.e. relay 21WFS, would be picked up to terminate the westbound positive (+) polar code pulse transmission through the line circuit for the single track stretch, and, cause initiation of the negative (−) polar code pulse transmission in that portion of the line circuit adjacent the east approach to the switch location SW11 (line wires 10 and 11 in FIGS. 1D and 1E of the accompanying drawings). With the westbound vehicle WV in its illustrated position in FIG. 5B, it would then be receiving a 180 proceed code rate permitting it to enter at the east end of the single track stretch.

Train movement diagram FIG. 5C shows the westbound vehicle WV occupying the single track stretch and on the east approach to the track switch SW11 so that it terminates the transmission of the negative (−) polar code pulses in this approach section and thereby causes drop away of the east approach relay 11EA and pick up of the westbound traffic stick relay 11WFS, for switch location SW11. In accordance with the picking up of this traffic stick relay 11WFS, negative (−) polar code pulses could now be transmitted along the line circuit associated with the main track stretch between the ends of the passing siding "A," to give indication to the west end of passing siding "A" that a westbound vehicle has cleared its route onto the main line portion of siding "A." With reference to switch location SW21, the passage of the westbound vehicle onto the single track stretch returns the wayside apparatus at this location to its normal track and polar coding condition each of switch location SW21 so that approach relay 21EA is returned to its normal picked up position. Furthermore, the directional stick relay 21WS at this control location is furthermore picked up to register passage of the westbound vehicle WV to the west over track switch SW21.

FIG. 5D of the accompanying drawings shows the westbound vehicle WV occupying the main line stretch at passing siding "A," and therefore, the westbound directional stick relay at this location (relay 11WS) is now picked up. The single track stretch is thus now returned to its normal unoccupied condition; i.e. positive (+) polar code pulsing resumes in alternate directions through the line circuit for this single track stretch at the track rails on this stretch are now being coded in an eastbound direction at rates illustrated in FIG. 5D. Accordingly, the east approach relay 11EA at the west end of the single track stretch is returned to its normal picked up position and the westbound directional stick relay 21WS at the east end of the single track stretch is now returned to its normal dropped away position.

Train movement diagrams FIGS. 5E through 5H of the accompanying drawings illustrate the passage of an eastbound vehicle EV at a typical passing siding "A." As previously mentioned, the wayside circuits typically shown in FIGS. 1A through 1H would be arranged as shown in arrangement diagram FIG. 4A to provide the complete wayside apparatus for an entire passing siding as shown in FIG. 5E.

With the particularly reference now to FIG. 5E, an eastbound vehicle EV is shown approaching the west or left-hand end of the passing siding "A" (switch location SW5), in accordance with westbound track coding in the stretch of single track to the west of this switch location.

Subsequently, when this eastbound vehicle EV occupies a position as shown in train movement diagram FIG. 5F, it terminates transmission of the negative (−) polar code pulses in an eastbound direction towards the switch location SW5 and thereby causes drop away of the west approach relay 5WA and pick up of the east traffic stick relay 5EFS. Therefore, the track coding in the rails of the stretch of single track to the west of switch location SW5 would be changed to a 180 or proceed code rate to permit this eastbound vehicle EV to proceed over the track switch SW5 in its normal position. Furthermore, the picking up of eastbound traffic stick relay 5EFS would cause negative (−) polar code pulses to be transmitted in the main track line circuit at passing siding "A" to provide approach indications to the switch location SW11 that an eastbound vehicle is approaching, and, would furthermore reverse the direction of track code transmission in the various track sections forming the main line track stretch at passing siding "A"; i.e. track codes would now be transmitted in a westbound direction through the rails of the main line track sections 6T through 10T.

With reference now to FIG. 5G, when the eastbound vehicle EV has passed switch location SW5 and thereby terminated the transmission of negative (−) polar code pulses in an eastbound direction towards switch location SW11, the west approach relay 11WA would then be dropped away and the eastbound traffic stick relay 11EFS picked up to approach clear an eastbound route onto the single track stretch to the east of switch location SW11; i.e. a 180 proceed code rate would now be transmitted to the eastbound vehicle EV permitting it to enter at the west or left-hand end of this single track stretch.

FIG. 5H of the accompanying drawings shows this eastbound vehicle EV as now occupying the single track stretch to the east of switch location SW11 so that directional stick relay 11ES at this switch location is now picked up. Furthermore, with the eastbound vehicle EV now located as shown in FIG. 5H, the eastbound directional stick relay 5ES (at switch location SW5) would now be returned to its normal dropped away position, since the track sections forming the main line stretch at passing siding "A" would now be coded in a westbound direction as shown in FIG. 5H.

With reference to train movement diagrams FIGS. 5J through 5M the general operation of the illustrated embodiment of the present invention is diagrammatically illustrated for arranging an automatic meet between eastbound vehicle EV and westbound vehicle WV approaching at the opposite ends of a typical passing siding "A."

More specifically, FIG. 5J of the accompanying drawings shows the eastbound vehicle EV already occupying the approach to switch location SW5 (relay 5WA dropped away), whereas the westbound vehicle WV has not as yet reached a corresponding location on the stretch of single track to the east of track switch SW11 (east approach relay 11EA still picked up). Therefore, the east traffic stick relay 5EFS at the west switch location is now picked up and causes transmission of negative (−) polar code pulses along the line circuit associated with the main line stretch at passing siding "A," and furthermore, causes the main line stretch to receive track code rates transmitted in a westbound direction towards the oncoming eastbound vehicle EV, so that this eastbound vehicle EV may proceed over the track switch SW5 in its normal position.

Subsequently, when the westbound vehicle WV enters the approach to switch location SW11 (as shown in FIG. 5K), it drops the east approach relay 11EA. Since the main line stretch at passing siding "A" is now occupied, the track switch SW11 is now automatically operated to its reverse position, and subsequently, the westbound traffic stick relay 11AWFS is picked up to cause a 120 proceed code rate to be communicated to the westbound vehicle WV instructing it to enter the passing siding track at passing siding "A." In addition, the picking up of traffic stick relay 11AWFS causes the transmission of negative (−) polar code pulses along the line circuit associated with the siding track stretch for passing siding "A" (the line wires 33 and 34 shown in FIGS. 1A and 1B of the accompanying drawings), to provide approach indication to the west end of passing siding "A" (switch location SW5) that a westbound vehicle has cleared a route onto the siding track at passing siding "A."

Referring now to FIG. 5L, when this westbound vehicle WV subsequently occupies the siding track stretch at passing siding "A," the westbound transmission of (+) polar code pulses is resumed in the line circuit for the single track stretch to the east of switch location SW11, and, the track switch SW11 is then automatically returned to its normal position to line up the route for the waiting eastbound vehicle EV onto this single track stretch. As soon as the switch SW11 is in its normal position, the eastbound traffic stick relay 11EFS is permitted to pick up and thereby causes a 180 proceed code rate to be communicated to the vehicle EV permitting it to enter the west or left-hand end of the single track stretch. Similarly, when eastbound transmission of (+) polar code pulses is resumed in the line circuit for the single track stretch to the west of switch location SW5, this track switch is automatically operated to its reverse position to line up the route for westbound vehicle WV from the siding stretch. As soon as this track switch SW5 has been reversed, the westbound traffic stick relay 5WFS is permitted to pick up and a proceed command is automatically communicated to the westbound vehicle WV permitting it to enter at the east or right-hand end of the single track stretch to the west of switch location SW5.

Thus, an automatic meet between these two oppositely directed vehicles has been completed and the vehicles may then continue on their respective ways (as shown in FIG. 5M), leaving the passing siding "A" in the illustrated condition wherein track switch SW5 is reversed and track switch SW11 is in its normal position. Furthermore, the approach relays at each end of this passing siding "A" are now returned to their normal picked up position, and, the directional stick relays 11ES and 5WS at the east and west ends respectively of this passing siding are also picked up and will remain in these picked up positions until the vehicles EV and WV vacate the single track stretches to the east and west respectively of the passing siding "A."

It may happen, during automatic control of the traffic over the single track railroad on a first come, first serve basis, that two oppositely directed vehicles may be simultaneously approaching the opposite ends of a single track stretch. Accordingly, the automatic traffic control organization provided in accordance with the present invention must be able to safely handle such an operating condition so that two opposing trains cannot simultaneously enter at the opposite ends of a single track stretch.

More specifically, and with reference to the pick up circuit for the eastbound traffic stick relay 11EFS in FIG. 1H, it will be noted that this relay requires that the polar relay 11EPT in FIG. 1D close its positive (P) front contact 200 before this traffic stick relay can be picked up, when an eastbound vehicle is approaching the left or west end of the stretch of single track partially shown in FIGS. 1A through 1H. Similarly, and referring now to FIG. 5B of the accompanying drawings, when a westbound vehicle is approaching the east end of the single track stretch, the westbound traffic stick relay for this east end of the track stretch (relay 21WFS) can only be picked up if a positive (+) polar code pulse is received at the east end of the line circuit associated with the single track stretch.

Therefore, when two oppositely directed vehicles are simultaneously approaching the opposite ends of the single track stretch, either the west traffic stick relay at the east end of a track stretch or the eastbound traffic stick relay at the west end of the track stretch will be picked up dependent upon which end of the associated line circuit is then receiving a (+) polar code pulse; i.e. if the west end of the line circuit is receiving the (+) polar code pulse (at relay 11EPT in FIG. 1D, for example), the associated eastbound traffic stick relay 11EFS would be permitted to pick up and instantaneously terminate the transmission of (+) polar code pulses in an eastbound direction over the line circuit so that the westbound traffic stick relay associated with the opposite end of the line circuit could not be picked up. In this manner, the eastbound vehicle approaching the west end of the single track stretch would be given preference and allowed to proceed onto the single track stretch. On the other hand, if the east end of the line circuit were receiving a (+) polar code pulse, the westbound traffic stick relay for this end of the single track stretch (for example, relay 21WFS in FIG. 5D) would be permitted to pick up and instantaneously terminate the transmission of positive (+) polar code pulses to the west end of the line circuit so that the eastbound traffic stick relay (relay 11EFS) could not be picked up, and therefore, the westbound vehicle would be permitted to utilize the stretch of single track.

In view of the above discussion, it will be noted that the automatic traffic control system provided in accordance with the present invention readily handles the problem of two opposing vehicles simultaneously approaching the opposite ends of a single track stretch, and, that under no condition would two such oppositely directed vehicles be allowed to utilize the stretch of single track at the same time.

*Second embodiment shown in FIG. 6*

As previously mentioned, the automatic traffic control system provided in accordance with the present invention can be utilized for controlling the traffic of both manned or unmanned railway vehicles on a single track railroad layout so that the vehicles approach clear their own routes as they progress through the layout and cause automatic operation of advance track switches to arrange, for example, for the automatic meeting of two oppositely directed vehicles simultaneously approaching the opposite ends of a passing siding.

Referring now to FIG. 6 of the accompanying drawings, a typical portion of a single track railroad layout is illustrated for the east or right-hand end of a passing siding, wherein the traffic of conventional or manned railway vehicles is controlled by suitable wayside signals. This typical portion of a single track railroad includes a stretch of single track made up of track sections 8T through 12T which is connected, by track switch SW9, to a passing siding track section 8ST. The rails of track section 9T are included in a conventional detector track section surrounding the switch location SW9 equipped with a detector track relay 9TR which is normally maintained in its picked up position by a suitable track battery (not shown), only so long as the detector track section 9T is unoccupied.

In FIG. 6, the wayside signals 9EB and 9EA to the west of detector track section 9T control the movement of eastbound vehicles over the track switch SW9 from the siding and main track stretches respectively and will hereinafter be referred to as head block signals; the wayside signals 9WA and 9WB control the movement of westbound vehicles onto the main and siding track stretches of the passing siding respectively and will be referred to as leaving signals; and, the wayside signal 9AW serves as an approach signal to provide approach indication to the engineman aboard a westbound vehicle approaching switch location SW9 concerning the aspect of wayside signals 9WA and 9WB.

Since this second embodiment of the present invention is utilized for controlling conventional or manned railway vehicles on the right of way, the various polar code pulses employed in this second embodiment are applied directly to the track rails, thus obviating the necessity of providing line wires extending along the track stretch. More particularly, suitable code applying and receiving circuits AR are provided at each end of each track section (except detector track section 9T) along the main line of the single track railroad being controlled. For example, the code applying and receiving circuits 10WAR selectively apply and receive polar code pulses at the west end of track section 10T; whereas, the code applying and receiving circuits 10EAR are utilized to selectively apply and receive polar code pulses at the east or right end of the track section 10T.

For the purpose of simplifying the illustration of this second embodiment of the present invention, only the code applying and receiving circuits associated with the east or right-hand end of track section 8T is shown in detail and includes a polar code repeater relay 8ECP which selectively pole changes the connection of battery BA to the east end of track section 8T in accordance with the desired polarity of polar code pulse transmission, as selected by the code selecting circuits 8ECS for this east end of track section 8T. The various polar code pulses transmitted in an eastbound direction along track section 8T are received by a suitable polar track relay 8EPT which selectively operates its positive (P) and negative (N) armatures in accordance with the polarity of the received polar code pulses. A suitable current limiting resistor CLR is connected in series between the battery BA and the track rails of track section 8T for the purpose of permitting adjustment of the magnitude of the polar code pulses applied to the east end of track section 8T.

In FIG. 6, the various polarities of polar code pulses applied to each of the illustrated track sections is shown above and below these track sections with arrows to indicate the direction in which the polar code pulses are transmitted through the rails of the track sections. For example, it will be noted that (−), (+) and (−/+) polar code pulses are at various times transmitted through the rails of track section 8T in both an east and westbound direction. More particularly, a (−) polar code pulse transmission through track section 8T is utilized to provide a home indication to the opposite ends of the passing siding that no vehicles are approaching, and therefore, is shown as a (—H) transmission; a (+) polar code pulse transmission is utilized to provide indication to a siding end that a vehicle is approaching, and thus, is illustrated as a (+A) transmission; whereas, a (—/+) polar code pulse transmission is utilized as a distant indication to permit clearing of a wayside signal at a siding end when proper, and thus, is illustrated as a (—/+) transmission.

Similarly, the various polar code pulse transmissions through the rails of the track sections 10T, 11T and 12T on the single track stretch to the right or east of switch location SW9 are shown as (—H), (+D), and (—A) transmission to illustrate that these pulse transmissions are utilized to provide home, distant, and approach indications respectively, the purposes of which will be described in detail hereinafter.

Suitable decoding circuits EDC and WDC are provided at the east and west ends respectively of each polar coded track section (for example, decoding circuits 8EDC at the right-hand end of track section 8T) to decode the polar code pulse transmission being received by the polar track code relay PT at this track section end, and thereby provide indication concerning the location, direction of travel, and route for each vehicle utilizing the single track layout. The decoding circuits associated with the ends of a track section would include, for example, relays corresponding to the approach relays EA and WA, distant relays WD and ED, and home relays EH and WH previously considered when discussing the first embodiment of the present invention shown in detail in FIGS. 1A through 1H of the accompanying drawings.

As mentioned previously, the particular polar code pulse transmission applied to the rails of the various track sections shown in FIG. 6 are automatically selected by suitable code selective circuits (such as, circuits 8ECS for track section 8T), dependent upon existing track and traffic conditions on the single track railroad layout. More particularly, suitable traffic registration circuits 9TRC (shown in block form in FIG. 6) are associated with the east end of the passing siding, and would include, for example, directional stick relays ES and WS, traffic stick relays EFS and WFS and approach stick relays WAS and EAS operated in substantially the same manner as previously described when considering the detailed wayside circuitry shown in FIGS. 1A through 1H in the accompanying drawings; i.e. the traffic registration circuits 9TRC are responsive to the polarity of code pulses being received at the east end of track section 8T and at the west or lefthand end of the track section 10T (as decoded by decoding circuits 10WDC), and accordingly control the code selecting circuits 8ECS and 10WCS in substantially the same manner as the traffic registration circuit apparatus shown in FIGS. 1A through 1H controls the polar code pulse transmissions in the line circuits illustrated in FIGS. 1A through 1H.

Suitable polar coding and decoding apparatus is then provided along the length of the stretch of single track extending to the east of switch location SW9 for selectively coding the rails of these track sections included in this stretch of single track with polar pulses selected in accordance with the automatic traffic control to be provided. Thus, the polar code pulses applied to the west end of track section 10T are received at the east end of this track section by code applying and receiving circuits 10EAR; these polar codes are decoded at the decoding circuits 10EDC; and thereby control the polar code selected by code selecting circuits 11WCS for application to the west end of track section 11T.

Suitable signal control apparatus is provided for approach signal 9AW so that this approach signal is caused to display a proceed aspect only when a (+) polar code pluse transmission is occurring in an eastbound direction through the rails of track section 10T; it is controlled to display its approach aspect when the (—) polar code pulse transmission occurs through track section 10T in this eastbound direction; and, it is controlled to display its stop aspect when a no code transmission occurs in track section 10T in the eastbound direction.

Similarly, the traffic registration circuits 9TRC associated with the east end of the passing siding partially shown in FIG. 6 automatically controls the track switch SW9 in accordance with the desired routing of each vehicle approaching the siding end. More specifically, the switch control apparatus for track switch SW9 would include a suitable switch lock relay L, switch operating relays NWZ and RWZ, and suitable switch correspondence relays NWC and RWC operated in substantially the same manner as the corresponding switch control apparatus illustrated in FIGS. 1A through 1H of the accompanying drawings.

The wayside signals 9EB, 9EA, 9WA and 9WB at the east end of the illustrated passing siding are also controlled in accordance with the traffic registration provided by the circuit apparatus 9TRC. More specifically, this signal control apparatus, for example, signal clearing relays comparable to the code control relays EG and WG illustrated in FIGS. 1A through 1H of the accompanying drawings which are selectively operated in a similar manner in accordance with whether or not a proceed signal indication should be displayed to a given vehicle so that it may proceed over the track switch SW9.

Having thus described the typical apparatus provided at the east end of the passing siding partially shown in FIG. 6, it should be pointed out that the opposite or west end of this passing siding would be equipped with similar apparatus to that shown in FIG. 6, and furthermore, that the stretch of single track existing to the west of the passing siding would also be provided with polar coding and decoding apparatus substantially the same as that provided for the stretch of single track to the east of switch location SW9.

*Movement diagrams of FIGS. 7A through 7J*

In order to fully describe the operation of this second embodiment of the present invention, reference will now be made to the train movement diagrams FIGS. 7A through 7J (except that FIG. 7I has been omitted) which illustrate how this second embodiment of the present invention operates to automatically control traffic on a single track railroad layout, so that each vehicle approach clears its own route along the layout, and wherein, the track switches of the layout are automatically operated to arrange for automatic meets between oppositely directed vehicles simultaneously approaching the opposite ends of a given passing siding.

More particularly, train movement diagrams 7A through 7D are utilized to illustrate the typical system operation during passage of a westbound vehicle WV through a single track railroad layout comprising a stretch of main line track made up of track sections 4T through 16T, with passing sidings "A" and "B" located therealong. It should be of course understood at this time, that wayside control apparatus for a complete single track railroad layout to be controlled in accordance with the second embodiment of the present invention would be obtained by merely providing each portion of the layout with suitable apparatus similar to the typical apparatus shown in FIG. 6 of the accompanying drawings for a typical portion of the layout.

Figure 7A:
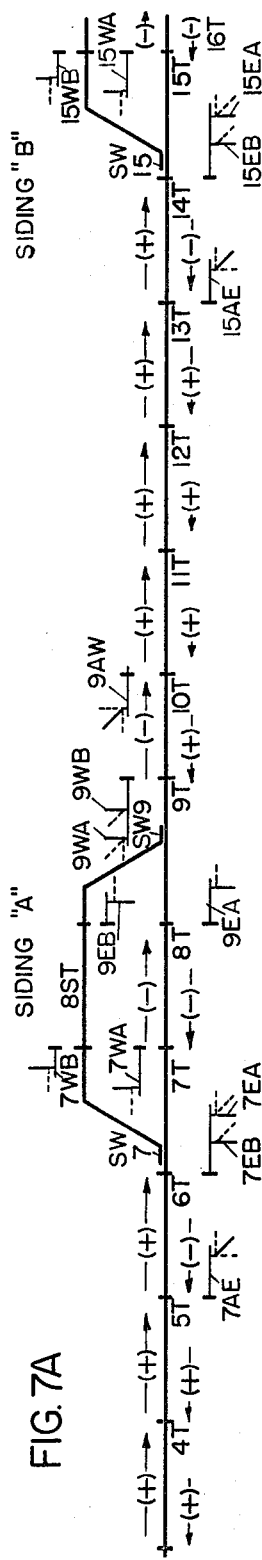

More specifically, FIG. 7A of the accompanying drawings shows the normal polar coding condition in the rails of each of the illustrated main line track sections when the track layout is unoccupied and further assuming that no railway vehicles are approaching at either end of the layout. Accordingly, the polar coding apparatus would be in a dependent coding condition wherein the rails of track section 10T would be supplied with eastbound negative polar code pulses so as to cause approach signal 9AW to display its approach aspect; whereas the rails of the remaining track sections of this single track stretch (track sections 11T, 12T, 13T and 14T) would be supplied in this eastbound direction with positive (+) polar code pulses to indicate to the switch location SW15 that the single track stretch is unoccupied. Similarly, the rails of track section 14T would be supplied with westbound negative (—) polar code pulses effective to cause approach signal 15AE to also display its caution aspect, and each of the remaining track sections of the single track stretch to the west of approach signal 15AE would be receiving (+) polar code pulses transmitted in their rails in a westbound direction so as to also provide indication to switch location SW9 that the single track stretch is unoccupied. Similarly, the stretch of single track to the west of switch location SW7 would also be in a polar coding condition exactly the same as that illustrated for the stretch of single track to the east of switch location SW9.

Under these assumed unoccupied traffic conditions, the opposite ends of the main track section 8T at passing siding "A," would be supplied with negative (—) polar code pulses effective to indicate to each end of a passing siding "A" that no railway vehicles are approaching at either end of this passing siding, and similarly, the main track section 16T partially shown at siding "B" would also have negative (—) polar code pulses transmitted through it in alternate directions to indicate the assumed unoccupied traffic conditions to both ends of siding "B."

Figure 7B:
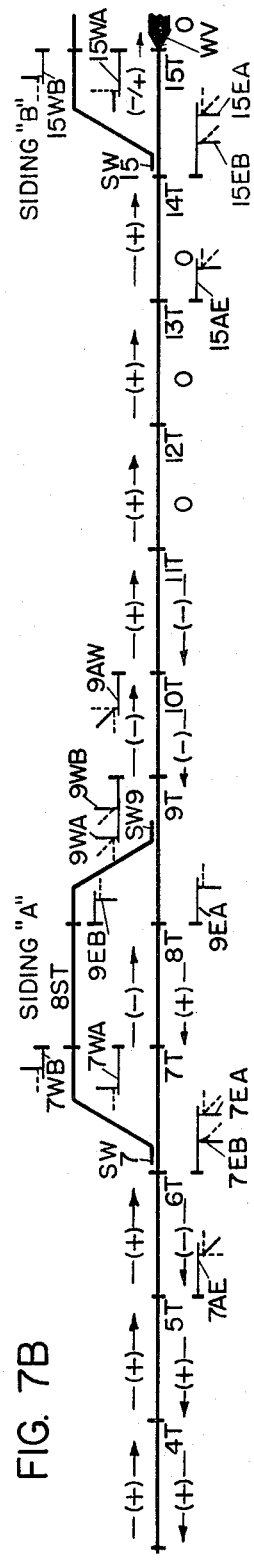

With reference to FIG. 7B, a westbound train WV is shown as approaching the switch location SW15. Therefore, it would terminate the dependent westbound coding in track section 14T, 13T and 12T of the stretch of single track to siding "A" (as shown in FIG. 7A) and would cause approach or (—) polar code pulse transmission in a westbound direction through the rails of track sections 11T and 10T, to provide indication to the switch location SW9 that the westbound vehicle has called for use of the single track stretch between passing sidings "B" and "A." In substantially the same manner as the code control relays are controlled in FIGS. 1A through 1H, the presence of the westbound vehicle WV at track section 16T (as shown in FIG. 7B) would cause the westbound traffic stick relay at switch location SW15 to be picked up to automatically cause clearing of the westbound head block signal 15WA to permit this westbound vehicle to enter the single track stretch at switch location SW15. Without attempting to limit the scope of the present invention, this clearing of a westbound route at switch location SW15 is initiated when the westbound vehicle WV is first selected at the approach to the east end (not shown) of passing siding "B." The manner in which this westbound route clearing is accomplished will be more fully discussed hereinafter, when considering train movement diagram FIG. 7C.

With switch location SW15 now cleared for the westbound vehicle WV, the resultant termination of the westbound (—) polar pulse transmission in track section 14T causes the opposing approach signal 15AE to be operated to its stop aspect; whereas, the fact that westbound head block signal 15WA has been cleared at switch location SW15 would obviously cause the opposing leaving signals 15EB and 15EA to continue to display stop aspects.

The reception of negative (—) or approach polar code pulses at the left or west end of track section 10T would cause the traffic registration circuits for switch location SW9 (see FIG. 6) to register that a westbound route has been cleared on the single track stretch and thereby prevent pick up of the opposing traffic stick relay EFS at this location and prevent clearing of the eastbound head block signals 9EB and 9EA. Furthermore, this reception of negative (—) approach polar code pulses at switch location SW9 causes an approach (+) polar code pulse transmission in a westbound direction through the rails of track section 8T to provide indication to switch location SW7 that a westbound train is approaching the east end of siding "A," for reasons to be described in detail hereinafter when considering the arrangement of an automatic meet between opposing trains.

Figure 7C:
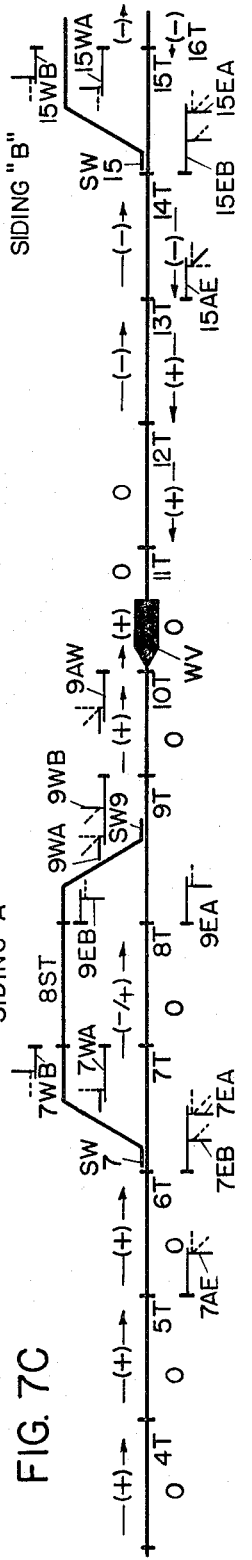
Figure 7D:
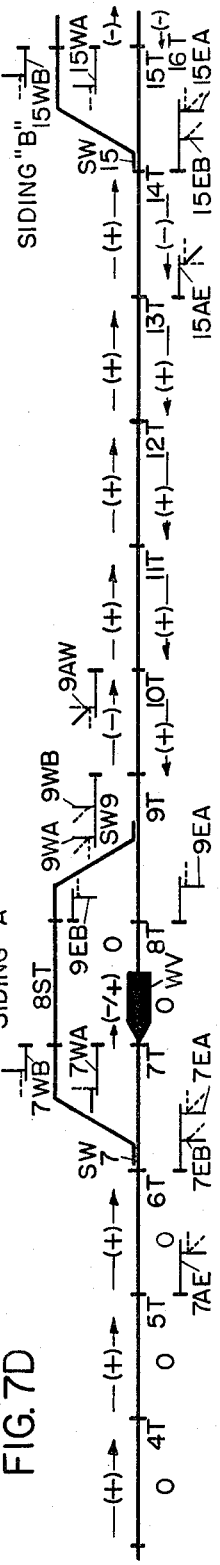

Train movement diagram FIG. 7C illustrates the westbound vehicle WV on the approach to track switch SW9 and terminating the transmission of negative (—) polar code pulses in the rail or track sections 11T and 10T. In substantially the same manner as this termination of approach polar pulse transmission automatically caused a proceed control track code to be communicated to an automated vehicle in the first embodiment shown in FIGS. 1A through 1H, the detection of the westbound vehicle WV on the approach to switch location SW9 (in FIG. 7C) causes automatic clearing of the wayside signals ahead of the vehicle, provided of course that no opposing eastbound vehicle is present.

More specifically, when the westbound vehicle WV first enters at the right-hand end of approach track section 11T, the leaving signal 9WA is automatically cleared to its approach aspect, provided that the track section 8T is being supplied with negative (—) polar code pulses transmitted in an eastbound direction. This clearing of signal 9WA to its approach aspect causes positive (+) polar code pulses to be transmitted in an eastbound direction through the rails of track section 10T so that approach signal 9AW is now controlled to display its proceed aspect. Furthermore, in accordance with the clearing of signal 9WA to its approach aspect, the transmission of positive (+) polar code pulses in a westbound direction through track section 8T is terminated so as to cause drop away of the eastbound approach relay EA for switch location SW7 and subsequent pick up of the westbound traffic stick relay WFS at switch location SW7.

In accordance with the picking up of the westbound traffic stick relay WFS at switch location SW7, the head block signal 7WA is now controlled to display its proceed aspect, provided that eastbound positive (+) polar code pulsing is present in track section 6T (as illustrated in FIG. 7C). As soon as head block signal 7WA clears to its proceed aspect, the eastbound polar coding in track section 8T is changed from (—) to (—/+) which causes leaving signal 9WA to then display its proceed aspect, as shown in FIG. 7C.

Since it has been assumed that track switches SW7 and SW9 are normally in their straight line or normal positions, no switch operation is necessary in order to clear the westbound route for vehicle WV at passing siding "A." However, and for example, if the track switch SW9 had been in its reverse position, it would have been automatically operated back to its normal position when the westbound vehicle WV first occupies the approach to switch location SW9, in a manner substantially the same as the automatic switch operation previously discussed, when considering the detailed circuit apparatus shown in FIGS. 1A through 1H of the accompanying drawings.

With a westbound route now cleared at switch locations SW7 and SW9, the westbound coding in track sections 6T, 5T and 4T is terminated to prevent clearing an eastbound route into switch location SW7, and, the transmission of negative (—) approach polar code pulses would now be initiated to the switch location west of track switch SW7 to inform it that a westbound vehicle has cleared a route onto the stretch of single track to the west of switch location SW7.

When the westbound vehicle WV now occupies the track stretch 8T at passing siding "A" (see FIG. 7D), the polar coding in the stretch of single track to the east of switch location SW9 would be returned to its normal condition wherein approach signals 9AW and 15AE are displaying their normal approach aspects and the head block and leaving signals such as 9EA and 9WA respectively for the single track stretch are all at stop.

The train movement diagrams of FIGS. 7E through 7J (except that FIG. 7I has been omitted) illustrate the manner by which the traffic control organization provided in accordance with the second embodiment of the present invention automatically arranges for the meeting of oppositely directed vehicles approaching the opposite ends of the typical passing siding "A."

Figures 7E, 7F, 7G, 7H, 7J:
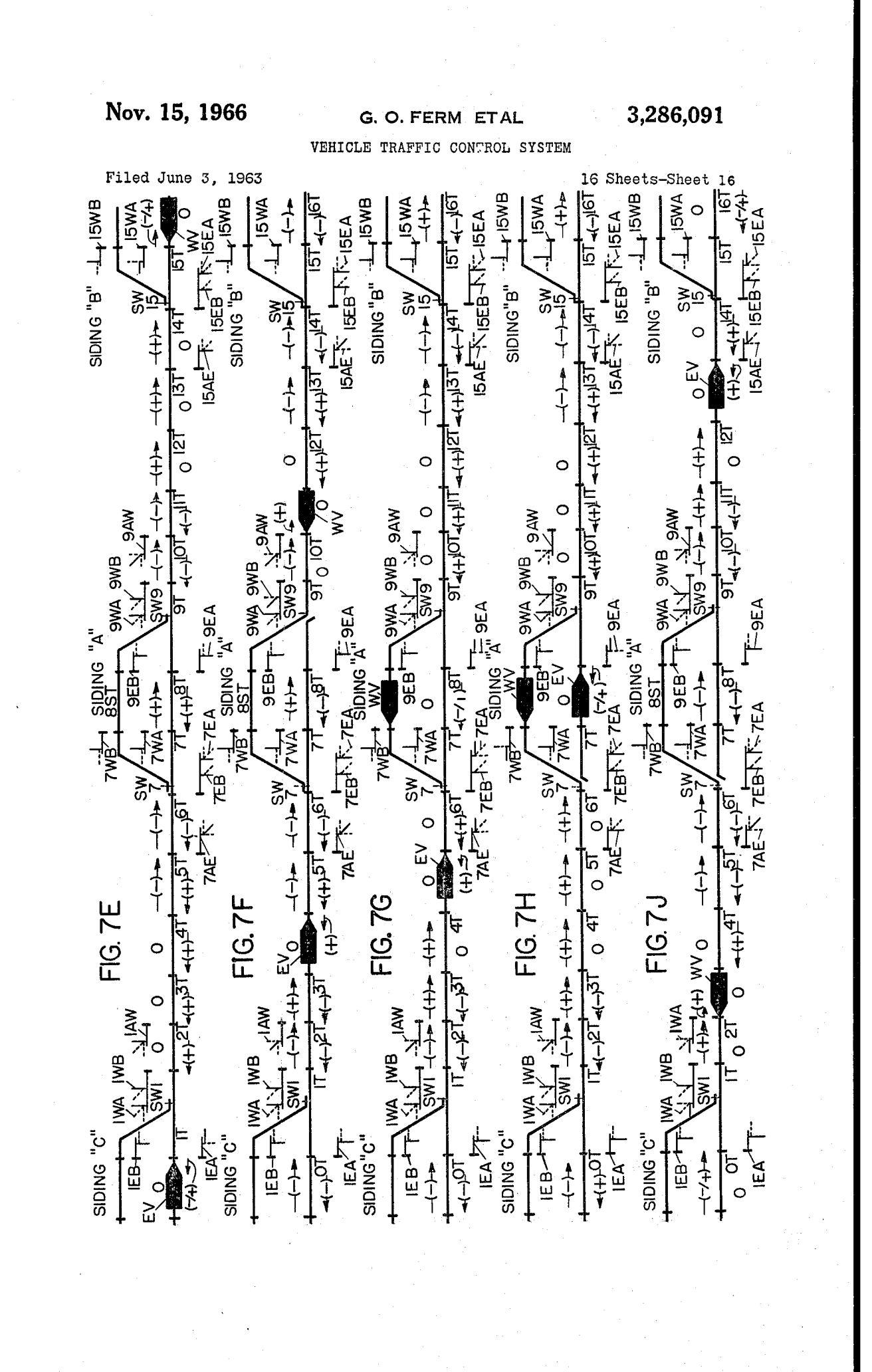

FIG. 7E of the accompanying drawings more particularly shows the coding condition for the track rails of each of the illustrated track sections, assuming that a westbound vehicle WV is about to pass switch location SW15 at siding "B" and eastbound vehicle EV is about to pass switch location SW1 at siding "C." As previously mentioned, with westbound vehicle WV so located, (−) or approach polar code pulses would be transmitted in a westbound direction through the rails of track sections 11T and 10T; whereas, similar approach or negative (−) polar code pulses would be transmitted in an eastbound direction through track sections 5T and 6T located at the west approach to switch location SW7. In accordance with the simultaneous reception of (−) polar code pulses at each end of siding "A," the traffic registration circuits for siding "A" would cause (+) or approach polar code pulses to be transmitted in alternate directions through the rails of track section 8T, to provide indication to each end that oppositely directed vehicles are simultaneously approaching the passing siding "A."

FIG. 7F of the accompanying drawings shows the westbound vehicle WV terminating the westbound (−) polar code pulse transmission towards switch location SW9 slightly before the eastbound vehicle EV hits the west approach to switch location SW7. In this second embodiment of the present invention, the entrance of the westbound vehicle onto the east approach to track switch SW9 slightly before the eastbound vehicle EV hits the west approach to switch location SW7 causes the track switch SW9 to be operated to its reverse position for routing the westbound vehicle WV into the passing siding track at siding "A," in a manner substantially the same as that previously described when considering the first embodiment illustrated by the detailed circuit apparatus of FIGS. 1A through 1H. However, it should be noted here that in this second embodiment, the first train to occupy the approach to a siding end is the one that is routed in to the siding track, when an oppositely directed train is detected approaching the opposite siding end, as opposed to the first one, first serve operation considered in the first embodiment of the present invention. Accordingly, although either train can be so routed into the siding, it would seem advantageous to route the first approaching train WV into the siding and allow the second train EV to hold the main line, since the first train WV could obviously be routed onto the siding with the least time being lost by either train to complete this automatic meet.

When the westbound vehicle WV has completed its siding move (as shown in FIG. 7G) so that it now occupies siding track section 8ST (track relay 8STR in FIG. 6 dropped away), the track switch SW9 is returned to its normal position and the rails of track section 8T are now supplied with clear or distant (−/+) polar code pulses in a westbound direction effective to clear wayside signals 7AE, 8EA and 9EA to provide aspects for permitting the eastbound vehicle EV to proceed over track switches SW9 and SW7 onto the stretch of single track between passing sidings "A" and "B."

Subsequently, when the eastbound vehicle EV has cleared the detector track section 7T (as shown in FIG. 7H) the track switch SW7 is now operated to its reverse position in substantially the same manner as the track switches were operated in the first embodiment illustrated in FIGS. 1A through 1H to complete a meet between trains, and, the wayside signal 7WB is subsequently cleared to permit the westbound vehicle WV to exit from the siding track of passing siding "A."

FIG. 7J of the accompanying drawings illustrates this automatic meet as having been completed with the westbound vehicle WV now occupying the stretch of single track between siding "A" and siding "C," and, the eastbound vehicle EV occupying the stretch of single track between passing siding "A" and passing siding "B."

In view of the foregoing discussion, it should thus be noted that the second embodiment of the present invention illustrated in FIG. 6 and FIGS. 7E through 7J of the accompanying drawings provides for the automatic operation of the various wayside signals and track switches found in a typical single track railroad layout in accordance with polar code pulses applied to the track rails of the layout, whereby each vehicle automatically clears its own route as it progresses through the track layout, and, wherein automatic meets are provided between two opposing vehicles simultaneously approaching the opposite ends of a given passing siding.

Although the second embodiment of the present invention has been shown and described only in general terms, it will be obvious to those skilled in the art that the traffic control organization typically illustrated in FIGS. 1A through 1H of the accompanying drawings will operate to provide automatic control over the railway vehicle traffic on a single track railroad layout, irrespective of whether the polar code pulse transmission occurs through a line circuit extending along the right-of-way (as was utilized in the first embodiment of the present invention for controlling unmanned or automated railway vehicle traffic), or, through the track rails of the layout (as in the second embodiment) when conventional or manned railway vehicle traffic is to be automatically controlled.

Having thus described an automatic traffic control system and one modification thereof as specific embodiments of the present invention, it is desired to be understood that these forms are selected to facilitate in the disclosure of the invention rather than to limit the number of forms which it may assume; and, it is to be further understood that various other modifications, adaptations and alterations may be applied to the specific forms shown to meet the requirements of practice, without in any manner departing from the spirit or scope of the present invention.

What we claim is:

1. In a system for controlling vehicular traffic on a right of way having a stretch of single track with spaced wayside control locations at respective passing sidings therealong, the combination of:
   (a) first communication circuits means interconnecting said wayside control locations for communicating information between said locations distinctive of traffic conditions along said right of way, said first communication circuit means comprising a line circuit extending along said track stretch to interconnect the ends of said passing sidings, said line circuit having pulses of predetermined polarities selected in accordance with traffic conditions along said track stretch transmitted therethrough between the ends of said passing sidings,
   (b) second communication means connecting the wayside to a vehicle on said right of way for communicating information to said vehicle distinctive of the desired performance of said vehicle on said right of way in accordance with the traffic distinctive information being received at said control locations over said first communication circuit means, said second communication means including coding apparatus for applying pulse code signals to the rails of said stretch of track in advance of a railway distinctive of the desired performance of said train and means on said train for receiving said pulse rate code signals, and
   (c) operating means on said vehicle responsive to the information communicated to said vehicle over said second communication means effective to cause said vehicle to perform as desired on said right of way.

2. In a system for controlling traffic of railway vehicles in two directions on a single track railroad layout including a stretch of single track with one or more passing sidings spaced therealong and connected at their respective ends to said single track stretch by track switches, the combination of:

(a) communication circuit means extending along said single track stretch for communicating information between the various switch locations distinctive of traffic conditions on said single track railroad layout, said communication circuit means including the rails of said stretch of track and transmitting means for transmitting pulses of predetermined polarities through said track rails, the polarity of said pulses being selected in accordance with traffic conditions existing on said track layout, and (b) switch operating means at each of said switch locations responsive to the information communicated to that switch location along said communication circuit means for selectively operating the track switch at that location dependent upon traffic conditions on said single track railroad layout.

3. In a system for controlling the traffic of railway vehicles in two directions on a single track railroad layout including a stretch of single track with one or more passing sidings spaced therealong and connected at their respective ends to said single track stretch by track switches, the combination of:

(a) communication circuit means extending along said single track stretch and including the rails of said stretch of track for communicating information between the various switch locations distinctive of traffic conditions on said single track railroad layout, (b) switch operating means at each of said switch locations reponsive to the information communicated to that switch location along said communication circuit means for selectively operating the track switch at that location dependent upon traffic conditions on said single track railroad layout, and (c) proceed control means at each of said switch locations responsive to the position of the track switch at that switch location and the information communicated to that switch location along said communication circuit means for selectively conveying proceed and stop control messages to a vehicle approaching said switch location dependent upon the position of said track switch and traffic conditions existing on said track layout in advance of said vehicle, said proceed control means having a wayside signal operable to display proceed or stop indications to an approaching vehicle dependent upon the position of the track switch at said switch location and traffic conditions existing in advance of said switch location along the route for said vehicle.

4. The combination specified in claim 3 wherein said proceed control means include communication means for selectively communicating a proceed or a stop control message from the wayside to an approaching vehicle instructing it to either proceed or stop respectively at said location dependent upon the position of the track switch at said switch location and existing traffic conditions in advance of said location along the route for said vehicle, and wherein said vehicle is provided with control apparatus responsive to said control messages communicated from the wayside effective to automatically operate said vehicle as instructed by said control message.

5. The combination specified in claim 4 wherein said communication means include:

(a) coding means for applying code pulses to the track rails in advance of a vehicle approaching a switch location, said pulses being selectively applied at either a first code rate distinctive of a stop command to said vehicle or at a second code rate distinctive of a proceed command to said vehicle dependent upon the position of said track switch and traffic conditions existing along said single track railroad layout, and (b) means carried on said vehicle including receiving means responsive to the rate at which said code pulses are applied to the track rails in advance thereof for providing a registration on said vehicle of whether said vehicle is to stop or proceed at said switch location.

6. A traffic control system for a single track railroad layout made up of a stretch of single track having its ends connected to spaced passing sidings by track switches comprising:

(a) circuit means extending along said stretch of single track between said spaced passing sidings, (b) transmitting means at each end of said circuit means responsive to the presence of trains within said track layout for transmitting pulses of predetermined polarities in alternate directions along said circuit means dependent upon traffic conditions within said track layout, (c) receiving means at each end of said circuit means for receiving the pulses transmitted from the opposite end of said circuit means, (d) first detecting means responsive to the presence of a train approaching said stretch of single track at one end thereof for rendering the transmitting means at the associated end of said circuit means ineffective to transmit said pulses towards the opposite end of said circuit means, (e) entrance control means at said one end of said track stretch rendered effective when a train is approaching said stretch of single track, as detected by said first detecting means, to permit said train to enter said stretch at said one end provided that said polar pulses are being received at the associated end of said circuit means, (f) second detecting means for registering the presence of said train at the approach to said opposite track stretch end, (g) switch operating means responsive to traffic conditions beyond said opposite track stretch end effective to operate the track switch at said opposite end to one or the other of two possible positions when said train is approaching, as detected by said second detecting means, so as to align one or the other of two possible routes at said opposite end dependent upon said traffic conditions, and (h) exit control means rendered effective after said track switch has been operated for permitting said train to travel over said track switch.

7. The combination specified in claim 6 wherein said entrance and exit control means include means for transmitting proceed control codes to said train at the respective ends of said stretch of single track, and wherein said train is provided with control means effective to cause said train to proceed at the ends of said stretch of single track only provided that a control code is being transmitted to said train.

8. The traffic control system specified in claim 6 wherein said entrance and exit control means include:

(a) track coding apparatus effective to transmit a proceed control to a train in the form of a predetermined current pulse rate code applied to the track rails in advance of said train, and (b) registration means on said train including receiver means responsive to said current pulse rate code for registering whether or not said train may proceed.

9. The traffic control system specified in claim 6 wherein said circuit means include the track rails of said single track stretch and wherein said entrance and exit control means are wayside signals for selectively providing a proceed indication to a railway train in accordance with the polarity of pulses being transmitted in the track rails of said single track stretch.

10. A traffic control system for a single track railroad layout made up of a stretch of single track having its ends connected to spaced passing sidings by track switches comprising:

(a) circuit means extending along said stretch of single track between said spaced passing sidings, (b) transmitting means at each end of said circuit means responsive to the presence of trains within said track layout for transmitting pulses of a first predetermined polarity in alternate directions along said circuit means when no trains are occupying said track layout, (c) receiving means at each end of said circuit means for receiving the polar pulses transmitted from the opposite end of said circuit means, (d) first detecting means responsive to the presence of a train approaching said single track stretch at one end thereof for rendering the transmitting means at the associated end of said circuit means ineffective to transmit pulses of said first predetermined polarity towards the opposite end of said circuit means and for initiating the transmission of pulses of a second predetermined polarity in a portion of said circuit means extending in approach to the opposite end of said single track stretch, (e) entrance control means at said one end of said track stretch rendered effective when said train is approaching said stretch of single track, as detected by said first detecting means, to permit said train to enter said stretch at said one end provided that pulses of said first predetermined polarity are being received at the associated end of said circuit means, said train being effective to terminate the transmission of pulses of said second predetermined polarity when said train enters the approach to the opposite end of said train stretch, (f) second detecting means responsive to the termination of transmission of said second polarity pulses for registering the presence of said train at the approach to said opposite track stretch end, (g) switch operating means responsive to traffic conditions beyond said opposite track stretch and effective to operate the track switch at said opposite end to one or the other of two possible positions when said train is approaching, as detected by said second detecting means, so as to align one or the other of two possible routes at said opposite end dependent upon said traffic conditions, and, (h) exit control means rendered effective after said track switch has been operated for permitting said train to travel over said track switch.

11. In a railway traffic control system for a track layout including a stretch of single track and a passing siding track stretch located therealong, said single track stretch being connected to the opposite ends of said passing siding track stretch by track switches, the combination of:

(a) circuit means extending along said stretch of single track and having predetermined time spaced pulses normally applied thereto when no trains are occupying said track layout, (b) code selecting means responsive to the presence of each train within said track layout for selectively altering the time spaced pulses applied to said circuit means in accordance with both the location of each train within said track layout and the direction in which each train is travelling within said track layout, and (c) switch control means responsive to the time spaced pulses applied in said circuit means for selectively operating the track switches at the opposite ends of said passing siding to dissimilar positions so as to arrange for a meeting of oppositely directed trains occupying said single track stretch and approaching the respective ends of said passing siding.

12. The combination specified in claim 11 including proceed control means at said passing siding ends responsive to the position of each of said track switches for permitting said oppositely directed trains to enter respectively the passing siding track stretch and the portion of said single track between said track switches after said switches have been operated to said dissimilar positions by said switch control means.

13. The combination specified in claim 12 further including means rendered effective after said oppositely directed trains have moved respectively onto said passing siding track and said portion of single track between said track switches for then selectively operating each of said track switches to their opposite positions so as to align a route for each of said oppositely directed trains back onto said stretch of single track at each end of said passing siding and means responsive to the operation of said track switches to their said opposite positions for permitting said oppositely directed trains to travel over said track switches back onto said stretch of single track.

14. The combination specified in claim 11 wherein said circuit means includes the track rails of said stretch of single track.

15. In a railway traffic control system for a track layout including a stretch of single track and a passing siding track stretch located therealong, said single track stretch being connected to opposite ends of said passing siding track by track switches, the combination of:

(a) line circuit means extending along each of said stretch of single track and said passing siding track, (b) means for selectively transmitting time spaced pulses throughout each of said line circuits having polarities dependent upon both the location and direction of travel of each train occupying either said stretch of single track or said passing siding track, (c) switch control means responsive to the polarity of the pulses transmitted in said line circuit means for selectively operating the track switches at the opposite ends of said passing siding so as to permit the passing of oppositely directed train occupying said single track stretch and approaching the opposite ends of said passing siding, (d) coding means responsive to the positions of said track switches and the polarity of said line circuit pulses for transmitting train control codes to said trains through the rails of said track layout in advance of said trains, said train control codes having code rates distinctive of the desired performance for each of said trains on said track layout, and (e) registration means on each of said trains including receiver means responsive to said transmitted train control track codes for providing a registration aboard said train of the desired performance for said train.

16. The combination specified in claim 15 including control means on said train responsive to the actual train performance and the desired train performance registered by said registering means for causing agreement between said actual and desired train performances.

17. The combination specified in claim 16 wherein the registration provided by said registering means is indicative of the desired train speed and wherein said train carried control means are effective to operate throttle and brake mechanisms of said train so as to cause the actual speed of said train to agree with said desired train speed.

18. In a system for controlling vehicular traffic in two directions over a stretch of single lane right of way between spaced entrance control locations, the combination of:

(a) traffic control circuit means effective to permit the entrance of vehicles at said entrance control locations onto said stretch of single lane right of way in accordance with the desired traffic direction on said stretch of right of way, (b) first desired direction selective means responsive to the presence of vehicles approaching said entrance control locations of said stretch of single lane right of way for selecting said desired traffic direction over said stretch of right of way on the first come, first serve basis, (c) second desired direction selecting means responsive to the passage of each vehicle over said stretch of single lane right of way for alternately selecting first one and then the other of said two directions to be the desired traffic direction, and (d) programming means for rendering said traffic control circuit means selectively responsive to said first or second desired direction selecting means in accordance with the desired sequence of vehicular traffic over said stretch of single lane right of way.

19. The combination specified in claim 18 wherein said programming means is manually operated.

20. In a system for controlling vehicular traffic in two directions on a stretch of right of way, the combination of:

(a) code communication circuit means extending between the ends of said stretch of right of way, (b) transmitting means at the ends of said communication circuit means for transmitting a predetermined code signal in alternate directions through said circuit means to the opposite ends of said circuit means, (c) entrance control means at each end of said right of way stretch for controlling entrance of vehicles onto said stretch at the ends thereof, the entrance control means at each end of said right of way including means for receiving the predetermined code signal transmitted to the associated end of said circuit means and being operably rendered effective to permit an approaching vehicle to enter at the associated end of said right of way by said received code signal being transmitted from the opposite end of said communication circuit means, and (d) programming means responsive to the entrance of each vehicle onto said right of way stretch for selectively rendering the code signals transmitted from the ends of said communication circuit means alternately effective to operate the entrance control means at the opposite ends of said right of way stretch, whereby said right of way is made to repeatedly accept said vehicles in alternate directions.

21. The combination specified in claim 20 wherein:

(a) the entrance control means at each end of said stretch of right of way includes a traffic stick relay which must be picked up for a predetermined time to permit entrance of each vehicle at said right of way stretch, the pick up circuit for said traffic stick relay being completed upon approach of a vehicle provided only that said predetermined code signal is being received at the associated end of said code communication circuit, and wherein (b) said programming means is effective to prevent pick up of the traffic stick relay at a given end of said stretch of right of way if the last vehicle to occupy said right of way stretch had entered at said given end of said stretch.

22. The combination specified in claim 20 wherein said programmer means include manually operated means for permitting manual selection of the permitted entrance end of said stretch of right of way.

23. In a system for controlling railway vehicle traffic in two directions on a stretch of single track extending between passing sidings, the combination of:

(a) a track circuit formed at one end of said single track stretch including a normally energized track relay which becomes dropped while a vehicle is occupying said track circuit to register passage of each vehicle over said track circuit, (b) a magnetic stick type relay having two operating positions and arranged to change its operating position each time said track relay registers passage of a railway vehicle over said track circuit, and (c) traffic control means responsive to the operating position of said magnetic stick relay for permitting railway vehicle entrance onto said stretch of single track alternately at the opposite ends thereof.

References Cited by the Examiner

UNITED STATES PATENTS

| | | | |
|---|---|---|---|
| 2,681,984 | 6/1954 | Van Tassel | 246—34 X |
| 2,800,579 | 7/1957 | Martin | 246—134 X |
| 3,064,126 | 11/1962 | Jachino | 246—134 X |
| 3,072,785 | 1/1963 | Hailes | 246—187 |
| 3,214,038 | 10/1965 | Davison et al. | 246—187 |

ARTHUR L. LA POINT, *Primary Examiner.*

S. B. GREEN, *Assistant Examiner.*